United States Patent [19]
Bando et al.

[11] Patent Number: 5,965,295
[45] Date of Patent: Oct. 12, 1999

[54] ALKALINE SECONDARY BATTERY, PASTE TYPE POSITIVE ELECTRODE FOR ALKALINE SECONDARY BATTERY, METHOD FOR MANUFACTURING ALKALINE SECONDARY BATTERY

[75] Inventors: Naomi Bando; Tetsuya Yamane, both of Kawasaki; Masayoshi Hiruma, Yokohama; Makoto Wakabayashi, Atsugi; Kunihiko Miyamoto, Tokyo; Takeshi Fukuju, Yokosuka; Ken Komiyama, Tokyo; Hiroshi Kaneko; Ken-ichi Kanno, both of Yokohama, all of Japan

[73] Assignee: Toshiba Battery Co., Ltd., Tokyo, Japan

[21] Appl. No.: 08/874,406

[22] Filed: Jun. 13, 1997

[30] Foreign Application Priority Data

| Jun. 14, 1996 | [JP] | Japan | 8-154324 |
| Sep. 13, 1996 | [JP] | Japan | 8-243559 |
| Sep. 24, 1996 | [JP] | Japan | 8-251146 |
| Sep. 24, 1996 | [JP] | Japan | 8-251147 |
| Oct. 18, 1996 | [JP] | Japan | 8-276150 |

[51] Int. Cl.$^6$ ........................... H01M 4/32
[52] U.S. Cl. ........................... 429/223; 429/233; 429/241; 429/242; 29/623.1
[58] Field of Search ........................... 429/223, 233, 429/241, 242; 29/623.1

[56] References Cited

U.S. PATENT DOCUMENTS

| 5,132,177 | 7/1992 | Kawano et al. | 429/206 |
| 5,441,833 | 8/1995 | Furukawa | 429/223 |
| 5,506,076 | 4/1996 | Miyamoto et al. | 429/220 |

FOREIGN PATENT DOCUMENTS

| 4-212269 | 8/1992 | Japan . |
| 5-275082 | 10/1993 | Japan . |
| 5-314983 | 11/1993 | Japan . |
| 7-22027 | 1/1995 | Japan . |
| 7-57734 | 3/1995 | Japan . |
| 8-106906 | 4/1996 | Japan . |

Primary Examiner—Bruce F. Bell
Attorney, Agent, or Firm—Oblon, Spivak, McClelland, Maier & Neustadt, P.C.

[57] ABSTRACT

An alkaline secondary battery comprising a positive electrode, a negative electrode, and an alkaline electrolyte, wherein the positive electrode comprises a conductive substrate and a mixture held by the conductive substrate, the mixture containing nickel hydroxide and a conductive cobalt compound, and the positive electrode has pores, substantially all of the pores each having a diameter with a range of 0.0001 $\mu$m to 10 $\mu$m.

31 Claims, 7 Drawing Sheets

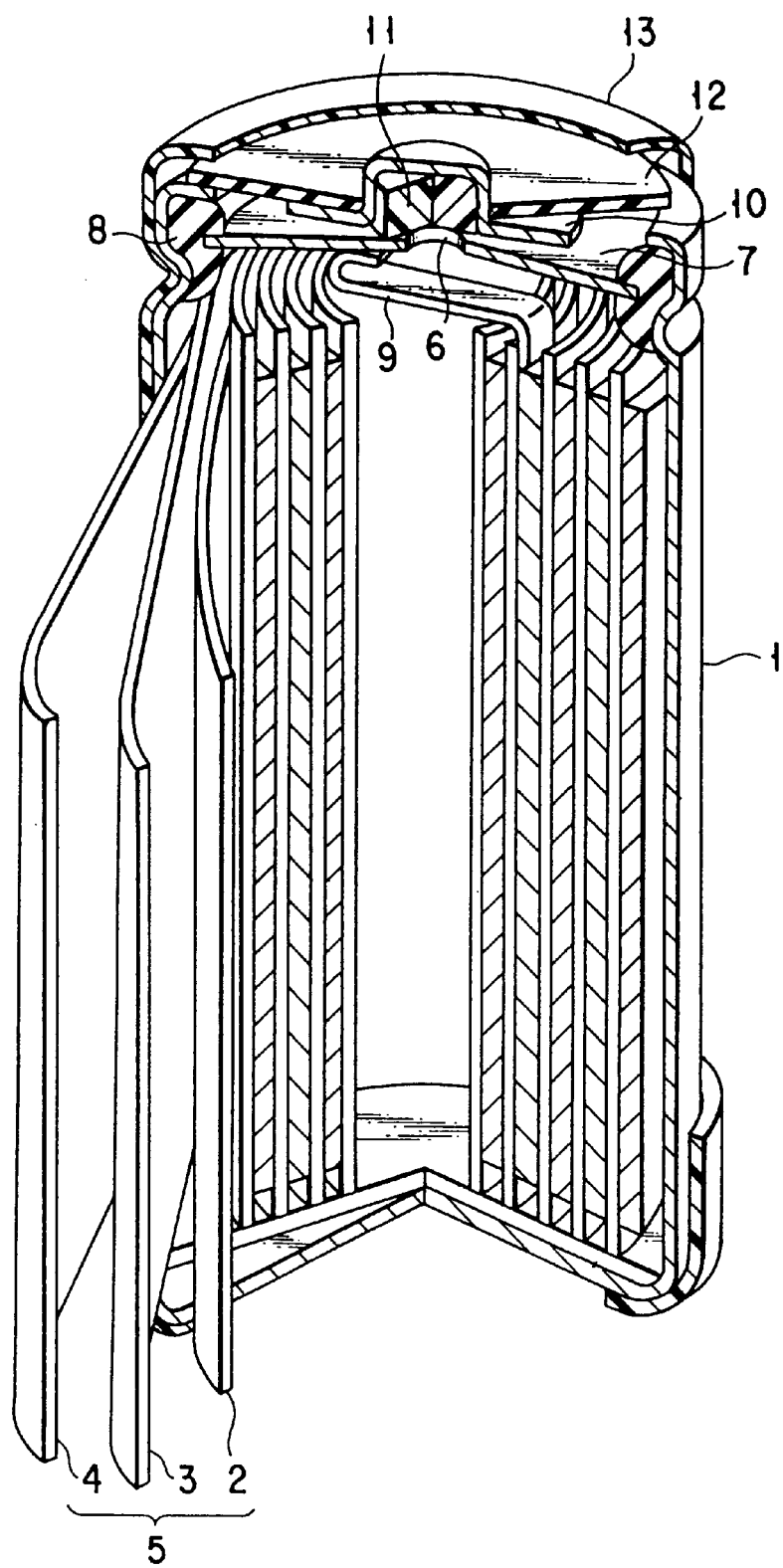
F I G. 1

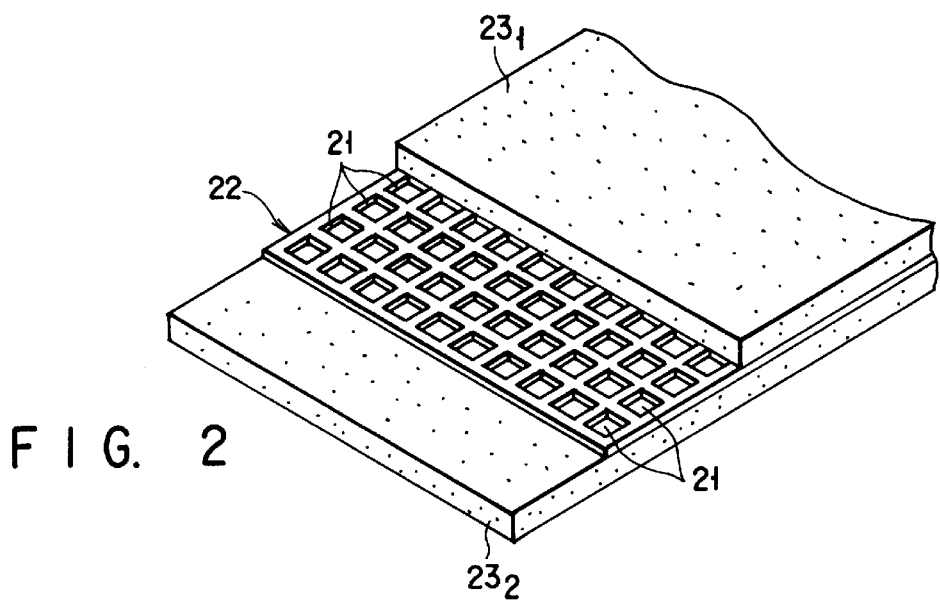
F I G. 2
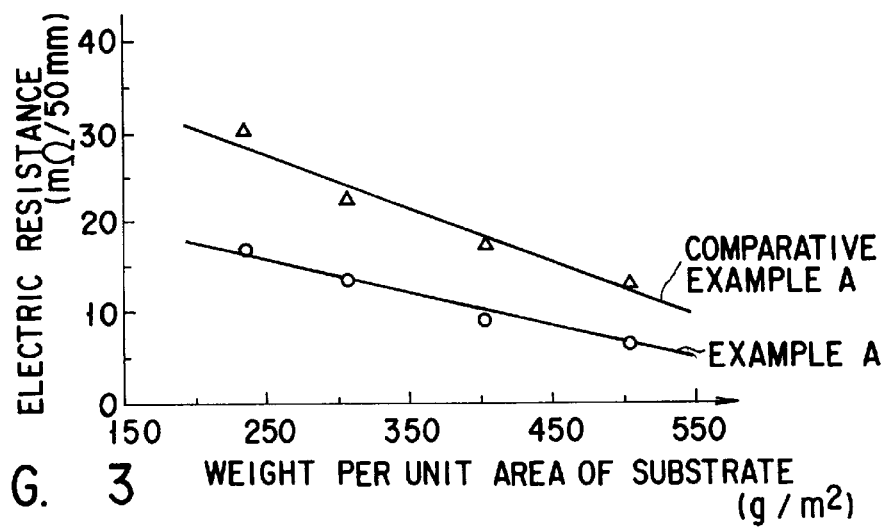
F I G. 3
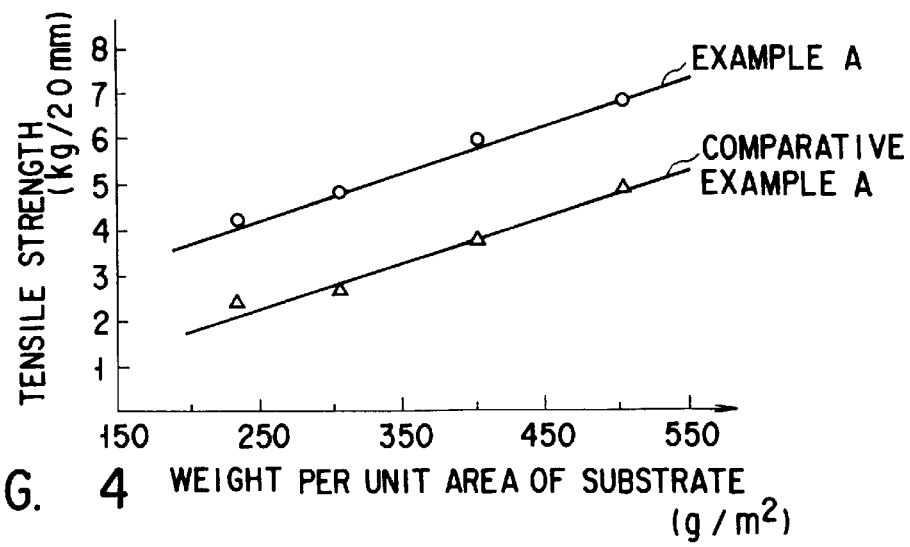
F I G. 4

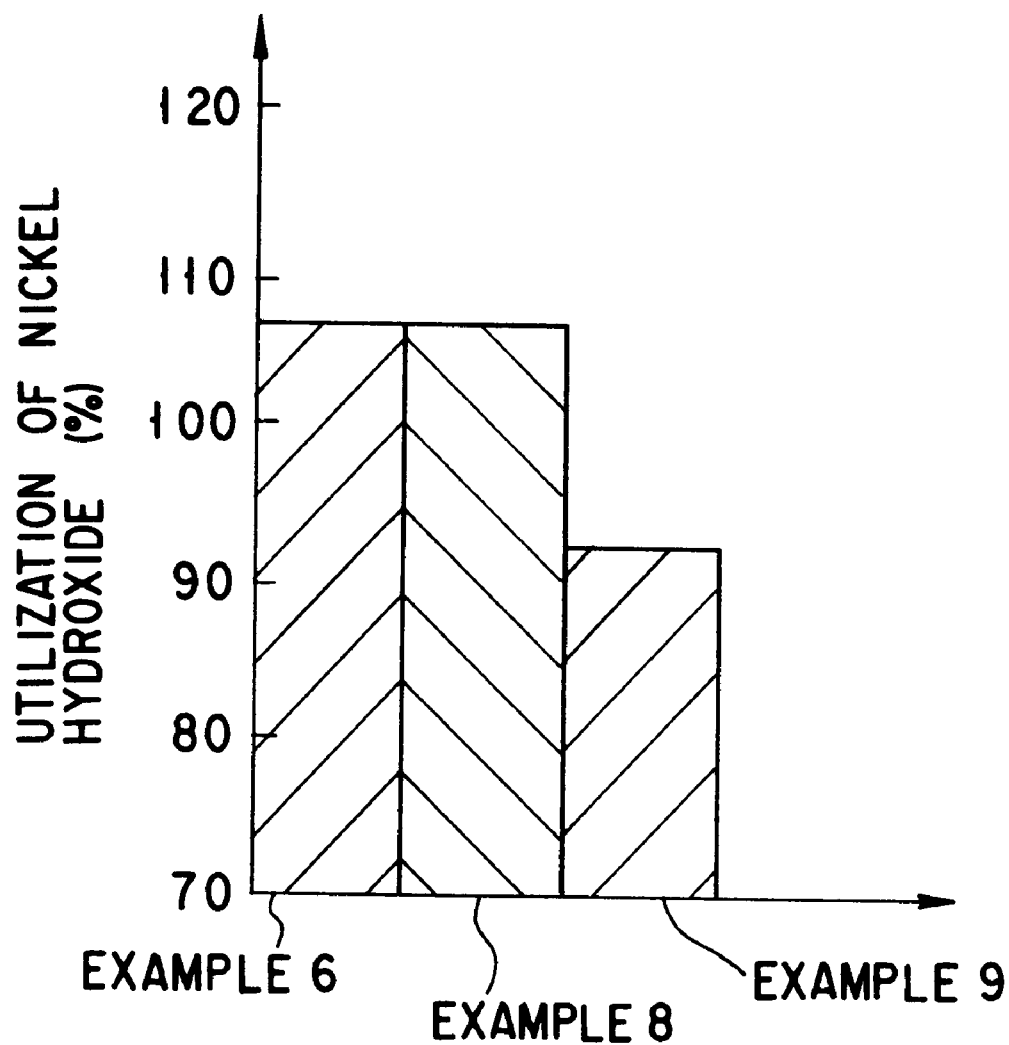
F I G. 10

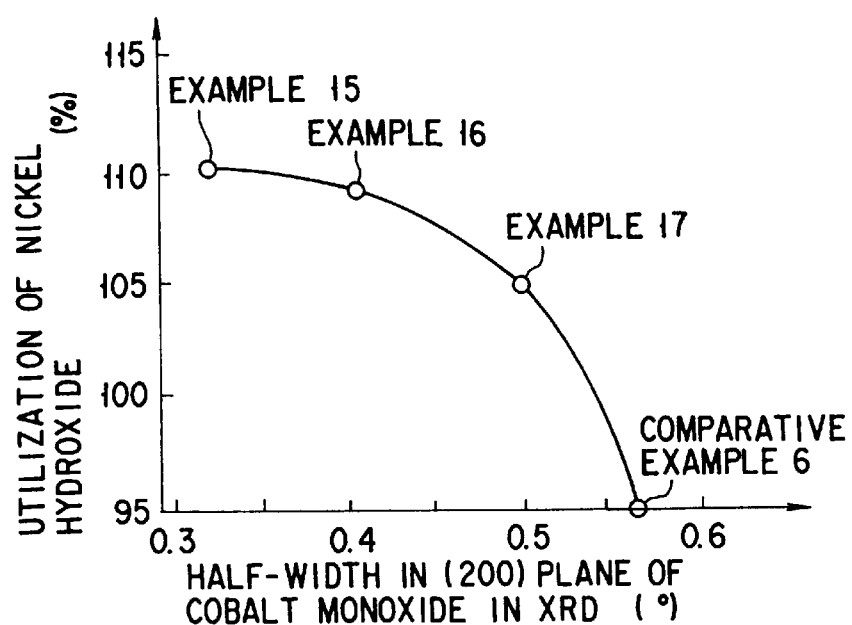
F I G. 11
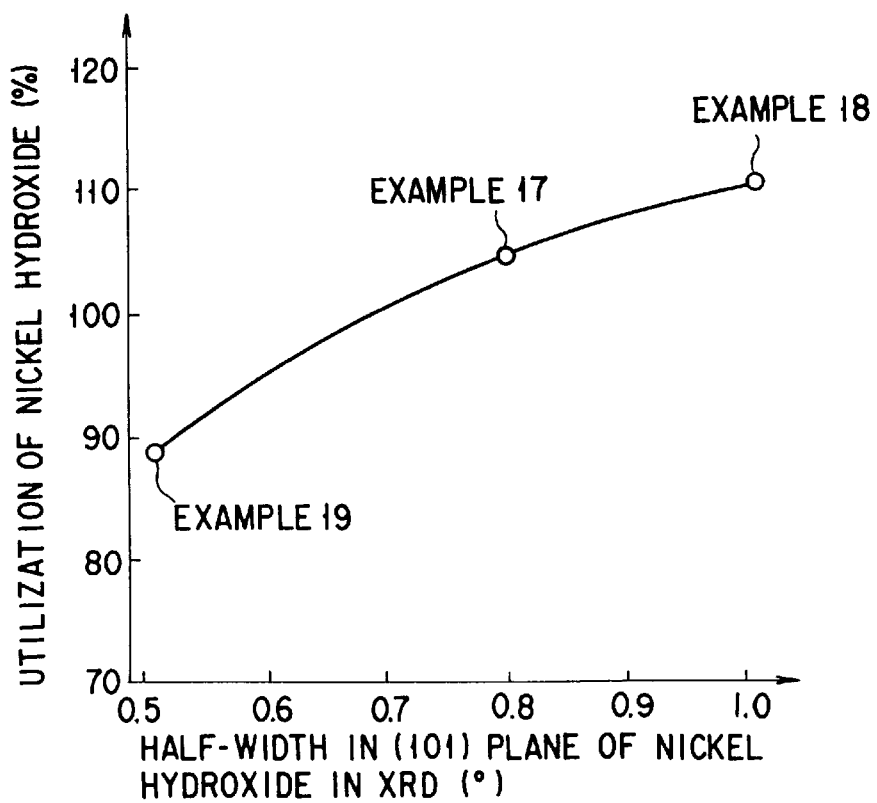
F I G. 12

ALKALINE SECONDARY BATTERY, PASTE TYPE POSITIVE ELECTRODE FOR ALKALINE SECONDARY BATTERY, METHOD FOR MANUFACTURING ALKALINE SECONDARY BATTERY

BACKGROUND OF THE INVENTION

This invention relates to an alkaline secondary battery, to a paste type positive electrode for alkaline secondary battery, and to a method for manufacturing an alkaline secondary battery.

The positive electrode for alkaline secondary battery can be generally classified into two types, i.e. a sintered type and a paste type. In view of enhancing the capacity of battery, a paste type positive electrode wherein a paste containing nickel hydroxide particles as an active material is filled in or coated on an electronic collector has been predominantly employed. It is imperative for this paste type positive electrode to ensure a sufficient electric contact between the particulate active material and the electronic collector so as to improve the utilization of the particulate active material. With a view to realize the aforementioned sufficient electric contact, various methods haven been adopted, e.g. a method wherein cobalt metal or a cobalt compound is added as a conductivity assistant to a paste and then converting the cobalt metal or compound into a high-order cobalt oxide of high conductivity by subjecting it to an initial charging, or a method wherein cobalt hydroxide is first formed on the surface of particulate nickel hydroxide, which is then subjected to a heat treatment in the presence of alkali so as to form a high order cobalt oxide of high conductivity on the surface of the particulate nickel hydroxide.

Although an alkali secondary battery provided with the aforementioned paste type positive electrode is effective in improving the utilization of the active material, the alkali secondary battery becomes poor in over-discharge property so that the lowering of capacity recovery ratio becomes prominent when the alkali secondary battery is stored for a long period of time or under a high temperature environment.

By the way, it is disclosed by Oshitani et al in J. Electrochem. Soc., 136 (1989) on page 1590 that a high order cobalt oxide formed as a conductive network on a paste type nickel electrode can be stably kept remained during the ordinary charging/discharging. Further, DENKI KAGAKU 63, No.1 (1995) describes on page 952 that if an alkali secondary battery provided with a paste type nickel positive electrode is left for a long period of time or under a high temperature environment, the battery voltage would be lowered and the capacity recovery of the battery at occasion of re-charging would be deteriorated.

Meanwhile, Japanese Patent Unexamined Publication Hei/5-314983 discloses a method of performing an initial charge of an alkali secondary battery wherein a calcium compound is added to the positive electrode and then the initial charging is performed in an atmosphere heated to 40 to 70° C. This initial charging is intended to accelerate the dissolution of the calcium compound in the positive electrode thereby to obtain an alkali secondary battery exhibiting a stable initial performance.

On the other hand, Japanese Patent Unexamined Publication Hei/5-275082 discloses a method of manufacturing a nickel-hydrogen secondary battery which is provided with a nickel positive electrode and a negative electrode containing an $AB_2$-based hydrogen-absorbing alloy, wherein the initial charging is performed in an atmosphere heated up to 50 to 70° C. so as to lower the charging efficiency of the positive electrode and to enhance the initial performance of the negative electrode.

However, it has been still difficult, in spite of this initial charging, to sufficiently enhance the capacity recovery ratio, once the battery is left for a long period of time or under a high temperature environment.

BRIEF SUMMARY OF THE INVENTION

Accordingly, one object of the present invention is to provide an alkaline secondary battery having an improved over-discharge property.

Another object of the present invention is to provide a method for manufacturing an alkaline secondary battery having an improved over-discharge property.

Another object of the present invention is to provide a paste type positive electrode for an alkaline secondary battery, which has an improved utilization.

Another object of the present invention is to provide a method for manufacturing an alkaline secondary battery having an improved utilization.

Another object of the present invention is to provide an alkaline secondary battery which is capable of maintaining a practical capacity retention in a charging/discharging cycle (cycle life) and at the same time capable of improving a charging efficiency at a high temperature condition so as to provide the alkaline secondary battery with a sufficient actual capacity (discharge capacity).

Further object of the present invention is to provide an alkaline secondary battery provided with a paste type positive electrode and/or a paste type negative electrode, which is provided with a conductive substrate comprising a porous two-dimensional substrate having a thickness of 60 $\mu$m or less and a pair of three-dimensional substrates superimposed respectively on the opposed surfaces of the two-dimensional substrate thereby enabling the paste type positive and negative electrodes to have an increased paste-filling density in conformity with a trend of decreasing a weight per unit area of the conductive substrate, to have an enhanced tensile strength and to have a high current collection efficiency in conformity with a trend of lowering the electric resistance of the conductive substrate.

Namely, according to the present invention, there is provided an alkaline secondary battery comprising:

a positive electrode;

a negative electrode; and an alkaline electrolyte;

wherein the positive electrode comprises a conductive substrate and a mixture held by the conductive substrate, the mixture containing nickel hydroxide and a conductive cobalt compound, and the positive electrode has pores, substantially all of the pores each having a diameter with a range of 0.0001 $\mu$m to 10 $\mu$m.

According to the present invention, there is further provided a method of manufacturing an alkaline secondary battery comprising the steps of:

preparing a secondary battery unit including a positive electrode, a negative electrode and an alkaline electrolyte containing lithium hydroxide of 0.5 mol/$\ell$ or more, the positive electrode comprising a conductive substrate and a mixture held by the conductive substrate, the mixture containing a cobalt compound and nickel hydroxide; and performing an initial charging of the secondary battery unit at a temperature of 40 to 100° C. so as to form pores in the positive electrode, the pores being 0.0001 µm to 10 µm in diameter.

According to the present invention, there is further provided a paste type positive electrode for an alkaline secondary battery, which comprises a conductive substrate, a cobalt compound and nickel hydroxide:

wherein the cobalt compound contains β type cobalt hydroxide having a half-width of less than 0.40° of a peak in the (001) plane as measured by X-ray powder diffraction (2θ) using Cu-Kα ray as an X-ray source.

According to the present invention, there is further provided a paste type electrode for an alkaline secondary battery, which comprises a conductive substrate, a cobalt compound and nickel hydroxide:

wherein the cobalt compound contains cobalt monoxide having a half-width of 0.50° or less of a peak in the (200) plane as measured by X-ray powder diffraction (2θ) using Cu-Kα ray as an X-ray source.

According to the present invention, there is further provided a method of manufacturing an alkaline secondary battery comprising the steps of:

preparing a secondary battery unit including a positive electrode, a negative electrode and an alkaline electrolyte, the positive electrode comprising a conductive substrate, a cobalt compound and nickel hydroxide; and performing an initial charging of the secondary battery unit at a temperature of 40 to 100° C.;

wherein the cobalt compound contains β type cobalt hydroxide having a half-width of less than 0.40° of a peak in the (001) plane as measured by X-ray powder diffraction (2θ) using Cu-Kα ray as an X-ray source.

According to the present invention, there is further provided a method of manufacturing an alkaline secondary battery comprising the steps of:

preparing a secondary battery unit including a positive electrode, a negative electrode and an alkaline electrolyte, the positive electrode comprising a conductive substrate, a cobalt compound and nickel hydroxide; and performing an activation of the secondary battery unit;

wherein said cobalt compound contains cobalt monoxide having a half-width of 0.50° or less of a peak in the (200) plane as measured by X-ray powder diffraction (2θ) using Cu-Kα ray as an X-ray source.

According to the present invention, there is further provided an alkaline secondary battery comprising a positive electrode containing nickel hydroxide, a negative electrode and an alkaline electrolyte;

wherein the nickel hydroxide has a half-width of 0.8° or more of a peak in the (101) plane as measured by X-ray powder diffraction (2θ) using Cu-Kα ray as an X-ray source; and the alkaline electrolyte contains 2.0 to 6.0 mol/ℓ potassium hydroxide, 2.0 to 5.0 mol/ℓ sodium hydroxide, and 0.5 to 1.5 mol/ℓ lithium hydroxide.

According to the present invention, there is further provided an alkaline secondary battery comprising a paste type positive electrode comprising a conductive substrate and a mixture held by the conductive substrate and containing an active material, and a paste type negative electrode comprising a conductive substrate and a mixture held by the conductive substrate and containing a hydrogen-absorbing alloy;

wherein the conductive substrate of the positive electrode comprises a porous two-dimensional substrate having a thickness of 60 µm or less which is obtained by molding metal powder by way of powder rolling method, and two three-dimensional substrates superimposed respectively on the opposed surfaces of the porous two-dimensional substrate.

According to the present invention, there is further provided an alkaline secondary battery comprising a paste type positive electrode comprising a conductive substrate and a mixture held by the conductive substrate and containing an active material, and a paste type negative electrode comprising a conductive substrate and a mixture held by the conductive substrate and containing a hydrogen-absorbing alloy;

wherein the conductive substrate of the negative electrode comprises a porous two-dimensional substrate having a thickness of 60 µm or less which is obtained by molding metal powder by way of powder rolling method, and two three-dimensional substrates superimposed respectively on the opposed surfaces of the porous two-dimensional substrate.

According to the present invention, there is further provided an alkaline secondary battery comprising a paste type positive electrode comprising a conductive substrate and a mixture held by the conductive substrate and containing an active material, and a paste type negative electrode comprising a conductive substrate and a mixture held by the conductive substrate and containing a hydrogen-absorbing alloy;

wherein each of the conductive substrates of the positive and negative electrodes comprises a porous two-dimensional substrate having a thickness of 60 µm or less which is obtained by molding metal powder by way of powder rolling method, and two three-dimensional substrates superimposed respectively on the opposed surfaces of the porous two-dimensional substrate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a partially sectioned perspective view of a cylindrical alkaline secondary battery illustrating one embodiment of alkaline secondary battery of the present invention;

FIG. 2 is a partially sectioned perspective view of a conductive substrate to be used for a paste type positive electrode and/or a paste type negative electrode of the alkaline secondary battery of this invention;

FIG. 3 is a graph showing the relationship between the weight per unit area and the electric resistance in the conductive substrate (Example A) and in the conductive substrate of the prior art (Comparative Example A);

FIG. 4 is a graph showing the relationship between the weight per unit area and the tensile strength in the conductive substrate (Example A) and in the conductive substrate of the prior art (Comparative Example A);

FIG. 10 is a graph showing the utilization of nickel hydroxide in the secondary batteries of Examples 6, 8 and 9;

FIG. 11 is a graph showing the relationship between the half-width of a peak in the (200) plane of the cobalt monoxide as measured by X-ray powder diffraction and the utilization of nickel hydroxide in the secondary batteries of Examples 15 to 17 and of Comparative Example 6;

FIG. 12 is a graph showing the relationship between the half-width of a peak in the (101) plane of the nickel hydroxide as measured by X-ray powder diffraction and the utilization of nickel hydroxide in the secondary batteries of Examples 17 and 19;

DETAILED DESCRIPTION OF THE INVENTION

Figure 5:
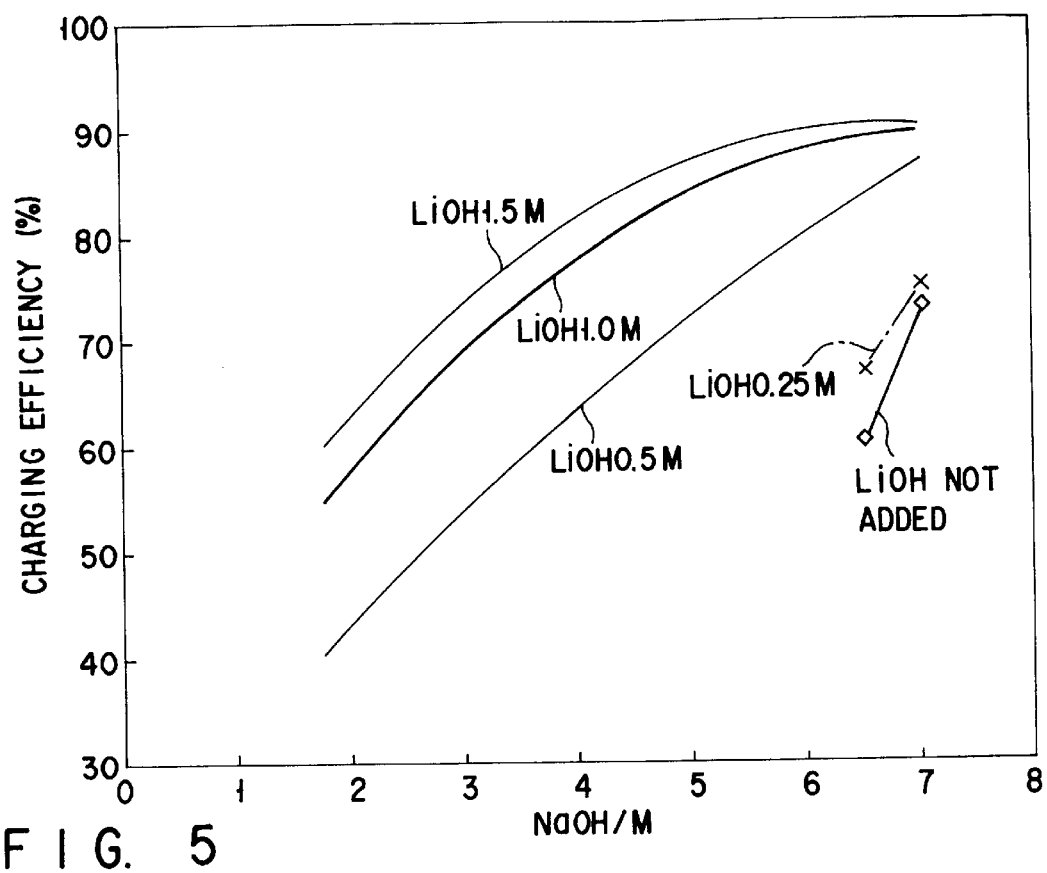
FIG. 5 is a graph showing the relationship between the composition of the alkaline electrolyte and the charging efficiency in the secondary battery of Example 1.

The alkaline secondary battery according to a first embodiment of this invention comprises a positive electrode containing nickel hydroxide, a negative electrode and an alkaline electrolyte; which is featured in that the nickel hydroxide has a half-width of 0.8° or more of a peak in the (101) plane as measured by X-ray powder diffraction (2θ) using Cu-Kα ray as an X-ray source, and that the alkaline electrolyte contains 2.0 to 6.0M (mol/ℓ) potassium hydroxide, 2.0 to 5.0M (mol/ℓ) sodium hydroxide, and 0.5 to 1.5M (mol/ℓ) lithium hydroxide.

This alkaline secondary battery according to a first embodiment of this invention will be further explained with reference to FIG. 1 as follows.

Referring to FIG. 1, a closed-end cylindrical case 1 is accommodated therein with an electrode group 5 which has been manufactured by spirally winding a positive electrode 2, a separator 3 and a negative electrode 4. The negative electrode 4 is disposed at the outermost periphery of the electrode group 5 so as to electrically contact with the cylindrical case 1. The cylindrical case 1 contains an alkaline electrolyte. A first sealing plate 7 formed of a disk having an opening 6 at the center is disposed on the upper opening of the cylindrical case 1. An insulating gasket 8 having a ring-like shape is interposed between the periphery of the first sealing plate 7 and the inner wall of the opening of the cylindrical case 1. The peripheral fringe portion of the opening of the cylindrical case 1 is caulked inward so that the first sealing plate 7 is hermetically fixed via the gasket 8 to cylindrical case 1. The positive lead 9 is connected through its one end to the positive electrode 2 and through its other end to the lower surface of the first sealing plate 7. A positive terminal 10 having a hat-like shape is mounted over the sealing plate 7 in such a manner as to cover the opening 6. A rubber safety valve 11 is disposed in a space surrounded by the sealing plate 7 and the positive terminal 10 in such a manner as to seal the opening 6. A holding plate 12 formed of an insulating disk having an opening at the center is disposed over the positive electrode terminal 10 in such a manner that the projected portion of the positive terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The positive electrode 2

This positive electrode 2 can be manufactured by a method wherein a paste comprising particles consisted mainly of nickel hydroxide, a conductive material, a binder and water is prepared, and then the paste is filled in a conductive substrate (alkali-resistant metallic porous body), the resultant conductive substrate being subsequently dried and press-molded to obtain the positive electrode 2. The nickel hydroxide has a value of 0.8° or more in the half-width of a peak in the (101) plane thereof as measured by X-ray powder diffraction (2θ) using Cu-Kα ray as an X-ray source.

The reason for confining the half-width of a peak in the (101) plane of the nickel oxide as measured by X-ray powder diffraction is as follows. Namely, if the half-width is less than 0.8°, the alkaline secondary battery provided with a positive electrode containing nickel hydroxide powder would exhibits a lowering of charge/discharge efficiency in relative to the alkaline electrolyte to be discussed below. This lowering of charge/discharge efficiency will be recognized not only at a high temperature region but also at a low temperature region. By the way, the half-width of the nickel hydroxide should preferably be in the range of 0.9 to 1.0°.

As for the particles consisting mainly of nickel hydroxide, particles of consisting of nickel hydroxide, or nickel hydroxide particles comprising zinc and/or cobalt which is co-precipitated together with nickel can be used. The positive electrode containing the latter nickel hydroxide particles is capable of further improving the charging efficiency under high temperature conditions.

The content of nickel hydroxide in the aforementioned particles consisting mainly of nickel hydroxide should preferably be in the range of 70 to 100% by weight.

The aforementioned particles consisting mainly of nickel hydroxide should preferably be spherical or nearly spherical in shape.

The aforementioned particles consisting mainly of nickel hydroxide should preferably be 5 to 30 μm in average diameter and 1.8 g/cm³ or more in tap density.

The aforementioned particles consisting mainly of nickel hydroxide should preferably have a specific surface area ranging from 8 to 25 m²/g.

As for the conductive materials, cobalt compounds such as cobalt monoxide and dicobalt trioxide, or cobalt hydroxide can be used.

The binder may be polytetrafluoroethylene, carboxymethyl cellulose, methyl cellulose, sodium polyacrylate or polyvinyl alcohol.

The alkaline metallic porous body may be formed of a sponge-like, fibrous or felt-like metallic porous body which is made from a metal such as nickel and stainless steel, or nickel-coated resin.

(2) The negative electrode 4

This negative electrode 4 can be manufactured by a method wherein a paste comprising an active material for negative electrode, a conductive material, a binder and water is first prepared, and then the resultant paste is filled into an conductive substrate, the resultant conductive substrate being subsequently dried and press-molded into a predetermined shape.

As for the active material for the negative electrode, cadmium compounds such as metallic cadmium and cadmium hydroxide; and hydrogen can be employed. As for the host matrix for hydrogen, a hydrogen-absorbing alloy can be employed.

The employment of a hydrogen-absorbing alloy is more preferable than the cadmium compounds, since the capacity of the secondary battery can be improved by the employment of a hydrogen-absorbing alloy. As for the hydrogen-absorbing alloy, there is no limitation, and any kinds of hydrogen-absorbing alloy can be employed as far as it is capable of absorbing hydrogen gas generated electrochemically in an alkaline electrolyte and readily releasing the hydrogen gas thus absorbed at the time of discharge. Examples of the hydrogen-absorbing alloy are $LaNi_5$, $MmNi_5$, (Mm is a misch metal), $LmNi_5$, (Lm represents at least one element selected from the rare earth elements including La), a multi-element system wherein a portion of Ni of the above mentioned compounds is substituted by an element such as Al, Mn, Co, Ti, Cu, Zn, Zr, Cr and B, or TiNi- or TiFe-based alloys. Among them, a hydrogen-absorbing alloy having a general formula, $LmNi_wCo_xMn_yAl_z$ (wherein w, x, y and z are number whose total value meets the equation of $5.00 < w + x + y + z < 5.50$) can be preferably employed, since it is capable of suppressing the pulverization thereof in the process of charge/discharge cycle thereby to improve the charge/discharge cycle life of the battery.

As for the conductive material, carbon black and graphite can be employed.

As for the binder, polyacrylate such as sodium polyacrylate and potassium polyacrylate; fluorine-based resin such as polytetrafluoroethylene (PTFE) and carboxymethyl cellulose (CMC) can be employed.

As for the conductive substrate, a two-dimensional substrate such as a punched metal, expanded metal and a nickel net, or a three-dimensional substrate such as a felt-like porous metallic substrate, or a sponge-like porous metallic substrate can be employed.

(3) The separator 3

The separator 3 may be formed of a polyamide nonwoven fabric, or a polyolefin (such as polypropylene) nonwoven fabric attached with a hydrophilic functional group.

(4) Alkaline electrolyte

This alkaline electrolyte comprises 2.0 to 6.0M (mol/ℓ) potassium hydroxide (KOH), 2.0 to 5.0M (mol/ℓ) sodium hydroxide (NaOH), and 0.5 to 1.5M (mol/ℓ) lithium hydroxide (LiOH).

In this case, the higher the concentration (M) of the NaOH and LiOH, in particular the concentration (M) of LiOH in this alkaline electrolyte comprising (KOH), (NaOH) and (LiOH), the higher the oxygen-generation voltage becomes in the following formula (1), thus making it possible to improve a high temperature charging efficiency. On the other hand, the higher the concentration (M) of the KOH in this alkaline electrolyte, the capacity retention during the charge/discharge cycle of the alkaline secondary battery containing the electrolyte can be further improved.

$$4OH^- \rightarrow 2H_2O + O_2\uparrow + 4e^- \qquad (1)$$

The reasons for limiting the concentrations of these KOH, NaOH and LiOH will be discussed below.

KOH

This KOH is employed for enhancing the conductivity of the electrolyte. If the concentration of KOH is less than 2.0M, the conductivity of the electrolyte would be decreased thereby lowering the capacity retention during the charge/discharge cycle of the secondary battery provided with such an electrolyte. On the other hand, if the concentration of KOH exceeds over 6.0M, the solubility of NaOH and LiOH, which are additives to the KOH, in the electrolyte would be lowered. Namely, the concentration of these alkali components would be relatively lowered, thereby lowering the high temperature charging efficiency. Therefore, a preferable range of concentration (M) of KOH is from 2.5 to 5.5.

NaOH

This NaOH functions to enhance the oxygen-generation voltage in the formula (1) at the occasion of high temperature charging. If the concentration of NaOH is less than 2.0M, it becomes difficult to improve the high temperature charging efficiency. On the other hand, if the concentration of NaOH exceeds over 5.0M, the concentration of KOH in the electrolyte would be relatively lowered, thereby deteriorating the conductivity of the electrolyte. Therefore, a preferable range of concentration (M) of NaOH is from 3.0 to 5.0.

LiOH

This LiOH functions to further enhance the oxygen-generation voltage in the formula (1) at the occasion of high temperature charging. If the concentration of LiOH is less than 0.5M, it becomes difficult to improve the high temperature charging efficiency. On the other hand, if the concentration of NaOH exceeds over 1.5M, the concentration of KOH in the electrolyte would be relatively lowered, thereby deteriorating the conductivity of the electrolyte. Moreover, since the solubility of LiOH is relatively low, it would be difficult to dissolve the LiOH to such a degree to exceed over 1.5M. Therefore, a preferable range of concentration (M) of LiOH is from 0.5 to 1.2.

The concentration in total (total concentration) of KOH, NaOH and LiOH should preferably be 7.5 to 9.5M. If this total concentration is less than 7.5M, the charge/discharge efficiency of the battery may be deteriorated. On the other hand, if this total concentration exceeds over 9.5M, the charge/discharge cycle property of the battery may be deteriorated.

Since the charging efficiency and the degree of capacity degradation during the storage are considered as being very important for a battery to be used under high temperature environment, it is preferable to employ, among the aforementioned alkaline electrolytes, an alkaline electrolyte whose main component is constituted by NaOH. By the expression that an alkaline electrolyte whose main component is constituted by NaOH, it means an electrolyte wherein the concentration of NaOH is the highest among those of NaOH, KOH and LiOH.

Preferable examples of this electrolyte are those having a composition where the total concentration of NaOH, KOH and LiOH is in the range of 7.5 to 9.5M, the concentration of NaOH is in the range of 4.0 to 5.0M, and the concentration of LiOH is in the range of 0.5 to 1.2M.

If the concentration of NaOH in the electrolyte is less than 4.0M in the battery to be employed in a high temperature environment in particular, it may become difficult to expect any effective improvement in charging efficiency and in storage property. On the other hand, if the concentration of NaOH in the electrolyte exceeds over 5.0M, the conductivity of the electrolyte would be deteriorated.

If the concentration of LiOH in the electrolyte is less than 0.5M in the battery to be employed in a high temperature environment in particular, it may become difficult to expect any substantial improvement in charging efficiency and in storage property. On the other hand, if the concentration of LiOH in the electrolyte exceeds over 1.2M, the conductivity of the electrolyte would be extremely deteriorated, thereby causing the deterioration of capacity retention during the charge/discharge cycle of the battery. Therefore, a preferable range in concentration (M) of LiOH is from 0.7 to 1.1.

The alkaline secondary battery according to a second embodiment of this invention comprises a paste type positive electrode comprising a conductive substrate and a mixture held by the conductive substrate and containing an active material, and a paste type negative electrode comprising a conductive substrate and a mixture held by the conductive substrate and containing a hydrogen-absorbing alloy; wherein the conductive substrate of either one of positive electrode and negative electrode, or the conductive substrates of both of positive and negative electrodes comprises a porous two-dimensional substrate having a thickness of 60 $\mu$m or less which is obtained by molding metal powder by way of powder rolling method, and two three-dimensional substrates superimposed respectively on -the opposed surfaces of the porous two-dimensional substrate.

By the expression that molding metal powder by the powder rolling method, it means a method comprising the steps of: compressing metal powder to obtain a metal sheet having pores; and sintering the metal sheet.

The mixture of the positive electrode means a mixture (material) containing an active material as a main component. The mixture of the negative electrode means a mixture (material) containing a hydrogen-absorbing alloy as a main component.

This alkaline secondary battery according to a second embodiment of this invention will be further explained as follows.

The secondary battery according to the second embodiment of this invention can be applied to a cylindrical alkaline secondary battery as shown in FIG. 1, wherein a closed-end cylindrical case is accommodated therein with an electrode group which has been manufactured by spirally winding a positive electrode, a negative electrode and a separator, and with an alkaline electrolyte. Alternatively, the secondary battery according to the second embodiment of this invention may be applied to a rectangular alkaline secondary battery, wherein a closed-end rectangular case is accommodated therein with an electrode group consisting of a laminated body comprising positive electrodes and negative electrodes which are alternately superimposed one upon another with a separator being interposed therebetween, and with an alkaline electrolyte.

Next, the details of the positive electrode, the negative electrode, the separator and the electrolyte will be explained.
(1) The positive electrode This positive electrode can be manufactured by a method wherein a paste comprising particles consisted mainly of nickel hydroxide, a conductive material, a binder and water is prepared, and then the paste is filled in a conductive substrate, the resultant conductive substrate being subsequently dried and press-molded to obtain the positive electrode.

As for the particles consisting mainly of nickel hydroxide, particles of consisting of nickel hydroxide, or nickel hydroxide particles comprising zinc and/or cobalt which is coprecipitated together with nickel can be used. The positive electrode containing the latter nickel hydroxide particles is capable of further improving the charging efficiency under high temperature conditions.

The content of nickel hydroxide in the aforementioned particles consisting mainly of nickel hydroxide may be same as in the case of the aforementioned alkaline secondary battery of the first embodiment.

The shape, average particle diameter, tap density and specific surface area of the particle consisting mainly of nickel hydroxide may be same as in the case of the aforementioned alkaline secondary battery of the first embodiment.

The nickel hydroxide should preferably have a half-width of 0.8° or more of a peak in the (101) plane as measured by X-ray powder diffraction (2θ) using Cu-Kα ray as an X-ray source. The alkaline secondary battery provided with a positive electrode containing the aforementioned nickel hydroxide would be effective in improving the charge/discharge efficiency. The half-width of the nickel hydroxide should preferably be in the range of 0.9 to 1.0°.

As for the conductive materials and the binder, the same materials as illustrated with reference to the alkaline secondary battery of the aforementioned first embodiment may be employed.

The conductive substrate useful in this case may be manufactured by a method wherein a porous two-dimensional substrate 22 having a thickness of 60 $\mu$m or less is manufactured by molding metal powder by way of powder rolling method to obtain a plate having a large number of rectangular openings 21, and subsequently, a pair of three-dimensional substrates $23_1$ and $23_2$ are superimposed respectively on the opposed surfaces of the two-dimensional substrate 22 as shown in FIG. 2.

The two-dimensional substrate 22 may be manufactured from nickel for instance. If the thickness of the two-dimensional substrate 22 exceeds over 60 $\mu$m, the volume occupied by the two-dimensional substrate 22 in the conductive substrate may become excessive thereby lowering the filling ratio of the paste, thus making it difficult to improve the capacity of the paste type positive electrode provided with such a conductive substrate. Therefore, a preferable range of the thickness of the two-dimensional substrate is from 10 to 50 $\mu$m.

The opening ratio of the pores 21 in the two-dimensional substrate 22 should preferably be in the range of 30 to 80%. The shape of the pores 21 is not confined to be rectangular, but may be circular or elliptical.

The three-dimensional substrates $23_1$ and $23_2$ are formed of a sponge-like nickel porous body for instance. This three-dimensional substrates $23_1$ and $23_2$ may be formed of a felt-like nickel porous body. The thickness of the three-dimensional substrates $23_1$ and $23_2$ should preferably be 0.7 to 1.1 mm. Further, each of the three-dimensional substrates $23_1$ and $23_2$ should preferably be 90% or more in void ratio (or porosity), and 50 g/m$^2$ to 300 g/m$^2$ in weight per unit area. If the void ratio of these three-dimensional substrates is less than 90%, the filling volume of the paste may be prominently decreased. If the weight per unit area of these three-dimensional substrates is less than 50 g/m², not only the mechanical strength of the conductive substrate may be deteriorated, but also the electric resistance of the conductive substrate may be increased. On the other hand, if the weight per unit area of these three-dimensional substrates exceeds over 300 g/m², the filling volume of the paste may be undesirably decreased.

The aforementioned conductive substrate can be manufactured by the following method for instance.

Step 1

First of all, metallic powder such as nickel powder is fed from a hopper onto a belt conveyer made of a high rigid material, and allowed to pass through a doctor blade disposed downstream in the transferring direction of the belt conveyer thereby to form a metallic powder layer having a desired thickness on the surface of the belt conveyer. Then, the metallic powder layer on the belt conveyer is compressed with a desired pressure which is effected by a pair of rolls, i.e. an embossed roll having a large number of protrusions and disposed over the belt conveyer and a counter roll disposed beneath the belt conveyer, whereby forming a green compact sheet having a large number of pores corresponding to the emboss of the embossed roll. If it is found impossible to form satisfactory pores in the green compact sheet in this step, any countermeasure may be taken, e.g. a surfactant may be added together with water to the metallic powder in advance so as to form a slurry of high fluidity, which is then allowed to be compressed as mentioned above, or the shape of the protrusions of the embossed roll may be suitably changed. Subsequently, the green compact sheet is transferred together with the belt conveyer to a sintering furnace, in which the green compact sheet is sintered to form a sintered metallic sheet having a thickness of 60 µm or less and a large number of pores, i.e. a two-dimensional substrate.

The metallic powder to be employed in this case should preferably be 2 µm or less in average particle diameter.

Step 2

A foamed resin sheet (for instance, urethane foam sheet) is adhered on both surfaces of the two-dimensional substrate by making use of an adhesive. Then, the urethane foam sheets adhered onto the both surfaces of the two-dimensional substrate are allowed to be compressed by making use of a pair of rolls so as to coat and impregnate a nickel powder-containing solution containing nickel powder and a binder into the urethane foam sheets. Thereafter, any excessive quantity of the nickel powder-containing solution is removed from the urethane foam sheets. Then, the resultant composite body is subjected to sintering in a sintering furnace filled with a reducing atmosphere thereby to thermally decompose and remove the urethane foam sheets, the adhesive and the binder. Thereafter, the foaming nickel thin films formed on both surfaces of the two-dimensional substrate are allowed to be sintered in the reducing atmosphere, whereby manufacturing a conductive substrate comprising the two-dimensional substrate and the three-dimensional nickel substrates formed integrally on both surfaces of the two-dimensional substrate. If an oxide is formed on the surface of the conductive substrate in the process of sintering the foaming nickel thin film, any suitable measures to remove the oxide may be taken.

If a laminate structure comprising the two-dimensional substrate and the three-dimensional substrates superimposed on both surfaces of the two-dimensional substrate (for example, a structure shown in FIG. 2) is employed as a conductive substrate of the negative electrode, a two-dimensional substrate such as an expanded metal and a punched steel plate; or a three-dimensional substrate such as a fibrous metallic porous body that will be formed by making use of a chatter cutting vibrasion (non-plating type), a sponge-like porous metallic substrate and a felt-like porous metallic substrate (plating type) can be employed as a conductive substrate of the positive electrode.

(2) The negative electrode

This negative electrode can be manufactured by a method wherein hydrogen-absorbing alloy powder, a conductive material, a binder and water are kneaded to prepare a paste, and then the resultant paste is filled into an conductive substrate, the resultant conductive substrate being subsequently dried and press-molded into a predetermined shape.

As for the hydrogen-absorbing alloy, the conductive material and the binder, the same materials as illustrated with reference to the alkaline secondary battery of the aforementioned first embodiment may be employed.

As for the conductive substrate, the same structure as explained with reference to the aforementioned positive electrode, i.e. a structure comprising a two-dimensional substrate and two three-dimensional substrates superimposed respectively on the opposed surfaces of the two-dimensional substrate as shown in FIG. 2 may be employed.

If a laminate structure comprising the two-dimensional substrate and the three-dimensional substrates superimposed on both surfaces of the two-dimensional substrate (for example, a structure shown in FIG. 2) is employed as a conductive substrate of the positive electrode, the conductive substrate of the negative electrode may be formed from a two-dimensional substrate such as an expanded metal and a punched steel plate; or from a three-dimensional substrate such as a fibrous metallic porous body (non-plating type) that can be formed by making use of a chatter cutting vibrasion, a sponge-like porous metallic substrate (plating type) and a felt-like porous metallic substrate.

(3) The separator

As for the separator, the same materials as illustrated with reference to the alkaline secondary battery of the aforementioned first embodiment may be employed.

(4) Alkaline electrolyte

This alkaline electrolyte may be composed only of potassium hydroxide (KOH), or composed of a mixture comprising potassium hydroxide and at least one kind of hydroxide selected from sodium hydroxide (NaOH) and lithium hydroxide (LiOH). It is also possible to employ the same composition of alkaline electrolyte as explained with reference to the alkaline secondary battery according to the first embodiment, i.e. an alkaline electrolyte which comprises 2.0 to 6.0M potassium hydroxide (KOH), 2.0 to 5.0M sodium hydroxide (NaOH), and 0.5 to 1.5M lithium hydroxide (LiOH).

Next, the details of the paste type positive electrode for an alkaline secondary battery according to the first embodiment of this invention will be described below.

This paste type positive electrode comprises a conductive substrate and a mixture held by the conductive substrate and containing nickel hydroxide and β type cobalt hydroxide having a half-width of less than 0.40° of a peak in the (001) plane as measured by X-ray powder diffraction (2θ) using Cu-Kα ray as an X-ray source.

The mixture means a powder mixture containing nickel hydroxide as a main component.

This positive electrode can be manufactured by the following methods (1) and (2).

(1) Particles consisting mainly of nickel hydroxide, particles consisting mainly of β type cobalt hydroxide having the above-defined half-width, and a binder are kneaded in the presence of water to prepare a paste. This paste is then filled into the aforementioned conductive substrate and dried. Subsequently, the resultant conductive substrate is roll-pressed to obtain the aimed paste-type positive electrode.

The nickel hydroxide should preferably have a half-width of 0.8° or more of a peak in the (101) plane as measured by X-ray powder diffraction (2θ) using Cu-Kα ray as an X-ray source. If the half width of a peak in the (101) plane of the nickel hydroxide as measured by X-ray powder diffraction (2θ) is less than 0.8°, the utilization of nickel hydroxide (active material) may be decreased. Therefore, the half-width of the nickel hydroxide should preferably be not less than 0.95°.

As for the particles consisting mainly of nickel hydroxide, the same materials as explained with reference to the positive electrode of the alkaline secondary battery according the second embodiment can be employed. The content of nickel hydroxide in the aforementioned particles consisting mainly of nickel hydroxide may be same as explained with reference to the positive electrode of the alkaline secondary battery according the first embodiment.

The shape, average particle diameter, tap density and specific surface area of the particle consisting mainly of nickel hydroxide may be same as explained with reference to the positive electrode of the alkaline secondary battery according the first embodiment.

The discharge capacity and the cycle life decreases if the half-width of the peak in the (001) plane of the β-type cobalt hydroxide, as measured by X-ray powder diffraction, 0.40° or more. Namely, if the half-width of the peak is 0.40° or more, particles of the β-type cobalt hydroxide will be low in crystallinity. Therefore, the particles will have a large specific surface area. In a paste containing β-type cobalt hydroxide particles, the particles use up a greater part of the water contained in the paste, making the paste more viscous or less viscous than desired to be filled in the conductive substrate. The filling density of the paste in the substrate therefore decreases. This is why the half-width of the peak must be less than 0.40°. Therefore, a preferable range of this half-width is 0.35° or less. A more preferable range of this half-width is 0.25° or less.

The aforementioned particles made mainly of β type cobalt hydroxide may contain a little amount of dicobalt trioxide ($Co_2O_3$) or tricobalt tetraoxide ($Co_3O_4$)

The average particle diameter of the β type cobalt hydroxide should preferably be 5.0 μm or less, more preferably 2.0 μm or less.

The mixing amount of the β type cobalt hydroxide should preferably be in the range of 5 to 10% by weight based on the amount of the particles consisting mainly of nickel hydroxide.

As for the conductive substrate, the same structure as explained with reference to the aforementioned alkaline secondary battery according to the first embodiment, or a structure comprising a two-dimensional substrate and two three-dimensional substrates superimposed respectively on the opposed surfaces of the two-dimensional substrate as shown in FIG. 2 may be employed. If a laminate structure comprising a two-dimensional substrate superimposed on its both surfaces by two three-dimensional substrates is employed, the electron conductivity between the particles composed mainly of nickel hydroxide and the conductive substrate can be prominently improved, thus improving the utilization of the nickel hydroxide.

As for the binder, the materials as explained with reference to the positive electrode of the alkaline secondary battery according to the first embodiment may be employed.

(2) Composite nickel hydroxide particles and a binder are kneaded in the presence of water to prepare a paste. This paste is then filled into the aforementioned conductive substrate and dried. Subsequently, the resultant conductive substrate is roll-pressed to obtain the aimed paste-type positive electrode.

The composite nickel hydroxide particles are composed mainly of nickel hydroxide, each particle having on the surface a cobalt compound layer. The layer contains β type cobalt hydroxide having the above-defined half-width. The composite particles may be manufactured by making use of a precipitation method. As for the particles consisting mainly of nickel hydroxide, the same material as explained in the aforementioned method (1) may be employed.

The positive electrode comprising the composite nickel hydroxide particles can increase the utilization of nickel hydroxide. A preferable range of this half-width is 0.35° or less. A more preferable range of this half-width of 0.25° or less.

The cobalt compound layer may be coated on the particles consisting mainly of nickel hydroxide preferably at a ratio of 1.0% by weight or more (calculated as metallic cobalt) based on the composite particles. If the ratio of the cobalt compound layer is less than 1.0% by weight (calculated as metallic cobalt), the utilization of the nickel hydroxide may not be sufficiently improved.

This cobalt compound layer may contain a little amount of a cobalt oxide such as dicobalt trioxide ($Co_2O_3$) or tricobalt tetraoxide ($Co_3O_4$).

As for the binder and the conductive substrate, the materials as explained with reference to the aforementioned manufacturing method (1) of the positive electrode may be employed.

Among these manufacturing methods (1) and (2) of the positive electrode, the method (2) may be advantageous in that the positive electrode obtainable from the method (2) will exhibit more uniform distribution of the conductive cobalt compound so that the utilization of nickel hydroxide can be prominently improved.

Next, the details of the paste type positive electrode for an alkaline secondary battery according to the second embodiment of this invention will be described below.

This paste type positive electrode comprises a conductive substrate and a mixture held by the substrate and containing nickel hydroxide and cobalt monoxide having a half-width of 0.50° or less of a peak in the (200) plane as measured by X-ray powder diffraction (2θ) using Cu-Kα ray as an X-ray source.

The mixture means a powder mixture containing nickel hydroxide as a main component.

This positive electrode can be manufactured by a method wherein particles consisting mainly of nickel hydroxide, particles consisting mainly of cobalt monoxide having the above-defined half-width and a binder are kneaded in the presence of water to prepare a paste, and, after this paste is filled into the aforementioned conductive substrate and dried, the resultant conductive substrate is roll-pressed thereby to obtain the aimed paste-type positive electrode.

The nickel hydroxide should preferably have a half-width of 0.8° or more of a peak in the (101) plane as measured by X-ray powder diffraction (2θ) using Cu-Kα ray as an X-ray. If the aforementioned half-width of the nickel hydroxide is less than 0.8°, the utilization of nickel hydroxide may be decreased. Therefore, the half-width of the nickel hydroxide should preferably be not less than 0.95°.

As for the particles consisting mainly of nickel hydroxide, the same materials as explained with reference to the positive electrode of the alkaline secondary battery according the second embodiment can be employed. The content of nickel hydroxide in the aforementioned particles consisting mainly of nickel hydroxide may be same as explained with reference to the positive electrode of the alkaline secondary battery according the first embodiment.

All of the shape, average particle diameter, tap density and specific surface area of the particle consisting mainly of nickel hydroxide may be same as explained with reference to the positive electrode of the alkaline secondary battery according the first embodiment.

The discharge capacity and the cycle life decreases if the half-width of the peak in the (200) plane of the cobalt monoxide, as measured by X-ray powder diffraction, exceeds 0.50°. Namely, if the half-width of the peak is greater than 0.50°, particles of the cobalt monoxide will be low in crystallinity. Therefore, the particles will have a large specific surface area. In a paste containing cobalt monoxide particles, the particles use up a greater part of the water contained in the paste, making the paste more viscous or less viscous than desired to be filled in the conductive substrate. The filling density of the paste in the substrate therefore decreases. This is why the half-width of the peak must be 0.50° or less. Therefore, a preferable range of this half-width is 0.3° or less.

The cobalt monoxide particles having the aforementioned half-width should preferably be such that it has cobalt (II) ion (for example, blue complex ion ($HCoO_2^-$)) in a concentration of 4 mg/l or more when 0.35 g of cobalt monoxide particles having the aforementioned half-width are immersed in 50 ml of a 6M aqueous solution of potassium hydroxide at a temperature of 25° C. and the resultant solution is then left to stand for 30 minutes. The concentration of cobalt (II) ion can be calculated as explained below. Namely, 0.35 g of cobalt monoxide particles having the aforementioned half-width is put in a 100 ml beaker to which 50 ml of a 6M aqueous solution of potassium hydroxide which has been deoxidized by means of bubbling using nitrogen gas is gently added using a transfer pipette. Then, after the aqueous solution of potassium hydroxide is kept away from air so as to prevent the aqueous solution of potassium hydroxide from absorbing oxygen, the aqueous solution of potassium hydroxide is left in a constant-temperature water bath whose temperature is maintained at 25° C.±1° C. for 30 minutes. Subsequently, most of the aqueous solution is transferred to a centrifugal separation tube and centrifuged, and then 1 ml of the supernatant liquid is dispensed and quantified by making use of a 50 ml measuring flask. Thereafter, the concentration of cobalt (II) ion in this quantified solution is determined by means of atomic absorption photometry or by means of inductive coupling plasma emission spectral analysis. If the concentration of cobalt (II) ion thus measured is assumed to be A mg/l, the concentration of cobalt (II) ion (X mg/l) in the aqueous solution, that would be resulted as 0.35 g of cobalt monoxide particles having the aforementioned half-width is immersed in 50 ml of a 6M aqueous solution (6M) of potassium hydroxide at a temperature of 25° C. and then left to stand for 30 minutes, can be calculated by the following expression.

$$X = A \times 50 \times 50 \div 10^3 \qquad (I)$$

Cobalt monoxide particles exhibiting less than 4 mg/l in concentration of cobalt (II) ion would be dissolved in an alkaline electrolyte at a very low dissolution rate. Therefore, the secondary battery provided with such a positive electrode may indicate a shortage in amount of conductive cobalt compound in the positive electrode, thereby making it difficult to sufficiently improve the utilization of nickel hydroxide. Therefore, a preferable range of the concentration of cobalt (II) ion would be 6 to 10 mg/l.

The content of 3 valent cobalt compounds (for example, dicobalt trioxide) in the cobalt monoxide particles exhibiting the aforementioned half-width that can be determined by a potassium permanganate back titration should preferably be in the range of 0 to 12% by weight. This potassium permanganate back titration is performed by the method prescribed in JIS M 8233.4. The principle of this potassium permanganate back titration can be explained as follows. Namely, when cobalt monoxide particles containing 3 valent cobalt compounds is dissolved in an aqueous solution of iron (II) sulfate exhibiting a sulfuric acidity, cobalt (II) ions originating from the cobalt monoxide as well as cobalt (III) ions originating from the 3 valent cobalt compounds are generated, and the cobalt (III) ions are reduced by iron (II) ions as illustrated by the following reaction formula (II).

$$Fe^{2+} + Co^{3+} \rightarrow Fe^{3+} + Co^{2+} \qquad (II)$$

Since the cobalt (III) ions can be indirectly quantified by the quantification of iron (III) ions generated in this reduction reaction by making use of an aqueous solution of potassium permanganate, the content of 3 valent cobalt compounds in cobalt monoxide particles can be determined.

The dissolution rate of this dicobalt trioxide in an alkaline electrolyte is relatively low as compared with that of cobalt monoxide. Accordingly, if the content of dicobalt trioxide in the cobalt monoxide particles exhibiting the aforementioned half-width is more than 12% by weight as measured by means of the potassium permanganate back titration, the dissolution rate in an alkaline electrolyte of the particles becomes so low that it would be difficult to sufficiently improve the utilization of nickel hydroxide. Therefore, the concentration of dicobalt trioxide should preferably be as low as possible The average particle diameter of the cobalt monoxide particles exhibiting the aforementioned half-width should preferably be 5.0 µm or less, more preferably 2.0 µm or less.

The mixing amount of the cobalt monoxide should preferably be in the range of 5 to 10% by weight based on the amount of the particles consisting mainly of nickel hydroxide.

As for the binder, the materials as explained with reference to the positive electrode of the alkaline secondary battery according to the first embodiment may be employed.

As for the conductive substrate, the same structure as explained with reference to the aforementioned positive electrode according to the first embodiment may be employed. Among them, the employment of a structure comprising a two-dimensional substrate and two three-dimensional substrates superimposed respectively on the opposed surfaces of the two-dimensional substrate as illustrated with reference to the alkaline secondary battery according to the second embodiment (for example, one shown in FIG. 2) is preferably in view of improving the electron conductivity between the particles mainly composed of nickel hydroxide and the conductive substrate, thus making it possible to further improve the utilization of the nickel hydroxide.

The followings are explanations on the method of manufacturing the alkaline secondary battery according to the first embodiment of this invention, and on the method of manufacturing the alkaline secondary battery according to the second embodiment of this invention.

1. Method of manufacturing the alkaline secondary battery according to the first embodiment This manufacturing method is featured in that it comprises the steps of:

preparing a secondary battery unit by a process wherein an electrode group comprising the paste type positive electrode according to the first embodiment and a negative electrode with a separator being interposed therebetween is prepared at first, and then the electrode group is placed together with an alkaline electrolyte in a case to be sealed therein; and performing an initial charging of the secondary battery unit at a temperature of 40 to 100° C.

As for the negative electrode and the separator, the same materials as illustrated with reference to the alkaline secondary battery according to the first embodiment may be employed. As for the electronic collector of the negative electrode, the conductive substrate (one where a two-dimensional substrate is sandwiched between two three-dimensional substrates) as illustrated with reference to the alkaline secondary battery according to the second embodiment may be employed.

This alkaline electrolyte may be composed only of potassium hydroxide (KOH), or composed of a mixture comprising potassium hydroxide and at least one kind of hydroxide selected from sodium hydroxide (NaOH) and lithium hydroxide (LiOH). It is also possible to employ the same composition of alkaline electrolyte as explained with reference to the alkaline secondary battery according to the first embodiment, i.e. an alkaline electrolyte which comprises 2.0 to 6.0M potassium hydroxide (KOH), 2.0 to 5.0M sodium hydroxide (NaOH), and 0.5 to 1.5M lithium hydroxide (LiOH). If this latter alkaline electrolyte is employed, it would be possible to manufacture an alkaline secondary battery exhibiting an improved charging efficiency at high temperature and an improved charge/discharge cycle life. In particular, if an alkaline electrolyte consisting mainly of sodium hydroxide is employed, the storage property under a high temperature environment and the charging efficiency at high temperature can be further improved, thereby making it possible to provide a secondary battery excellent in discharge property under a high temperature environment.

By the expression of the "initial charging", it is meant a charging that is performed for the first time after the preparing an alkaline secondary battery unit and before the shipment of an alkaline secondary battery as a product. An aging may be performed before this initial charging is performed.

This initial charging should preferably be performed at a temperature ranging from 40 to 100° C. because of the following reasons. Namely, if the initial charging is performed at a temperature of lower than 40° C., the dissolution rate in an alkaline electrolyte of the β type cobalt hydroxide becomes too slow, so that the amount in generation of conductive cobalt compound such as oxyhydroxide cobalt (CoOOH) becomes insufficient, thereby lowering the utilization of nickel hydroxide. On the other hand, if the initial charging is performed at a temperature of exceeding over 100° C., the component members constituting the secondary battery such as a negative electrode may be thermally deteriorated. Therefore, a preferable range of the initial charging would be from 70 to 90° C.

This manufacturing method according to the first embodiment can be applied to a cylindrical alkaline secondary battery (such as the one shown in FIG. 1) as well as to a rectangular alkaline secondary battery.

Next, the method of manufacturing the alkaline secondary battery according to the second embodiment of this invention will be explained.

2. Method of manufacturing the alkaline secondary battery according to the second embodiment This manufacturing method is featured in that it comprises the steps of:

preparing a secondary battery unit by a process wherein an electrode group comprising the paste type positive electrode according to the second embodiment and a negative electrode with a separator being interposed therebetween is prepared at first, and then the electrode group is placed together with an alkaline electrolyte in a case to be sealed therein; and performing an activation of the secondary battery unit.

As for the negative electrode and the separator, the same materials as illustrated with reference to the alkaline secondary battery according to the first embodiment may be employed. As for the electronic collector of the negative electrode, the conductive substrate (one where a two-dimensional substrate is sandwiched between two three-dimensional substrates) as illustrated with reference to the alkaline secondary battery according to the second embodiment may be employed.

This alkaline electrolyte may be composed of the same compositions as illustrated in reference to the manufacturing method according to the first embodiment. Further, because of the same reason as illustrated above, an alkaline electrolyte comprising 2.0 to 6.0M potassium hydroxide (KOH), 2.0 to 5.0M sodium hydroxide (NaOH), and 0.5 to 1.5M lithium hydroxide (LiOH), or alkaline electrolyte composed of these three components and consisted mainly of the aforementioned sodium hydroxide may be preferable for use.

The aforementioned activation can be effected by the initial charging for instance.

An alkaline secondary battery according to a third embodiment of this invention is featured in that it comprises a positive electrode, a negative electrode and an alkaline electrolyte; wherein said positive electrode comprises a conductive substrate and a mixture held by the substrate and comprising nickel hydroxide and a conductive cobalt compound, and has pores. Substantially all of the pores each has a diameter with a range of 0.0001 $\mu$m to 10 $\mu$m.

This alkaline secondary battery according to a third embodiment of this invention will be further explained as follows.

The secondary battery according to the third embodiment of this invention can be applied to a cylindrical alkaline secondary battery as shown in FIG. 1, wherein a closed-end cylindrical case is accommodated therein with an electrode group which has been manufactured by spirally winding a positive electrode, a negative electrode and a separator, and with an alkaline electrolyte. Alternatively, the secondary battery according to the third embodiment of this invention may be applied to a rectangular alkaline secondary battery, wherein an electrode group consisting of a laminated body comprising positive electrodes and negative electrodes which are alternately superimposed one upon another with a separator being interposed therebetween is prepared at first, and then this electrode group is housed together with an alkaline electrolyte in a closed-end rectangular case thereby fabricating the rectangular alkaline secondary battery.

As for the negative electrode and the separator, the same materials as illustrated with reference to the alkaline secondary battery according to the first embodiment may be employed.

Next, the positive electrode and the alkaline electrolyte to be employed in this embodiment will be explained.

(1) The positive electrode

This positive electrode comprises a conductive substrate and a mixture held by the substrate. The mixture contains particles composed mainly of nickel hydroxide and a conductive cobalt compound. The positive electrode has pores, substantially all of the pores each having a diameter with a range of 0.0001 μm to 10 μm.

The pores of the positive electrode can be measured by a pore distribution measuring apparatus (a trade name; Autopore 9200, Shimazu Seisakusho Inc.).

The mixture means a mixture (material) containing nickel hydroxide as a main component.

The half-width of the nickel hydroxide should preferably be 0.8° or more because of the same reason as illustrated with reference to the secondary battery according to the second embodiment. A more preferable range of the nickel hydroxide is from 0.9° to 1.0°.

As for the particles consisting mainly of nickel hydroxide, the same materials as explained with reference to the positive electrode of the alkaline secondary battery according the second embodiment can be employed. The content of nickel hydroxide in the aforementioned particles consisting mainly of nickel hydroxide may be same as explained with reference to the positive electrode of the alkaline secondary battery according the first embodiment.

All of the shape, average particle diameter, tap density and specific surface area of the particle consisting mainly of nickel hydroxide may be same as explained with reference to the positive electrode of the alkaline secondary battery according the first embodiment.

As for the conductive cobalt compound, cobalt oxyhydroxide (CoOOH) may be employed. This cobalt compound should preferably be existed on the surface of the particles consisting mainly of nickel hydroxide. In particular, substantially all of the particles consisting mainly of nickel hydroxide should preferably have on the surface a layer containing the conductive cobalt compound.

As for the current collector, the same materials as explained with reference to the positive electrode of the alkaline secondary battery according to the first embodiment can be employed.

The ratio of pores ranging from 0.0001 μm to 10 μm in diameter to all the pores should preferably be 80% or more. A more preferable ratio of the pores is 90% or more. A most preferable ratio of the pores is 99% or more.

When the diameter of the pores of the positive electrode is confined to the aforementioned range, the conductive cobalt compound can be uniformly dispersed in relative to the nickel hydroxide. Namely, if the positive electrode has many pores exceeding over 10 μm in diameter, voids may be formed at a space between the particles consisting mainly of nickel hydroxide or at a space between the particles and the conductive substrate. In other words, in the positive electrode, a region devoid of or insufficient of the conductive cobalt compound is formed at a space between the particles or at a space between the particles and the conductive substrate. The conductivity of particles surrounding the void would be extremely deteriorated as the battery comprising the positive electrode is left for a long period of time or under high temperature conditions, thus extremely deteriorating the utilization of the active material. The smaller the diameter of the pores is, the more it becomes easy to uniformly disperse the conductive cobalt compound in relative to the particles consisting mainly of nickel hydroxide. However, if the positive electrode has a large number of pores of less than 0.0001 μm in diameter, the electrolyte can be hardly permeated into the positive electrode, resulting in insufficiency in retention of the electrolyte in the positive electrode.

In the positive electrode provided with pores, substantially all of the pores whose diameter is distributed within the range of 0.0001 μm to 10 μm . the average diameter of the pores should preferably be 0.035 μm or less. The average diameter in this case means a diameter (median diameter) at the frequency of 50 in the cumulative frequency distribution. The positive electrode having 0.035 μm or less in the average diameter is capable of further improving the over discharge property. This effect is assumed to be brought about by the fact that the surfaces of the nickel hydroxide particles are densely and uniformly covered by a layer containing the conductive cobalt compound. Furthermore, since the positive electrode is large in specific surface area, the contacting area thereof with the electrolyte can be increased, thus making it possible to improve the charge/discharge reaction efficiency. Therefore, it is possible to provide an alkaline secondary battery which is extremely improved in capacity recovery efficiency even when the battery is left for a long period of time or under a high temperature environment and in discharge capacity. In view of assuring a sufficient retention of alkaline electrolyte by the positive electrode, the average diameter of the pores should preferably be 0.025 μm or more.

The positive electrode provided with pores 0.035 μm or less in average diameter, and substantially all of the pores each having a diameter with a range of 0.0001 μm to 10 μm should preferably have a porosity of 30 to 40%. This limitation of porosity is based on the following reasons. If the porosity is less than 30%, the quantity of electrolyte that can be retained by the positive electrode may become insufficient. On the other hand, if the porosity exceeds over 40%, the filling density of the nickel hydroxide in the positive electrode would be lowered, thus making it difficult to attain a high energy density. Therefore, the limitation of porosity to the aforementioned range is appropriate in extremely improving the discharge capacity of the alkaline secondary battery.

The positive electrode provided with pores, substantially all of the pores 0.0001 to 10 μm in distribution of diameter should preferably be such that not less than 50% of the total volume of void therein is occupied by pores having a diameter ranging from 0.0001 to 0.01 μm. The positive electrode having such a feature is effective in further improving the over discharge property thereof. This effect is assumed to be brought about by the fact that the surfaces of the nickel hydroxide particles are densely and uniformly covered by a layer containing the conductive cobalt compound.

In view of further improving the over discharge property of the secondary battery, tricobalt tetroxide ($Co_3O_4$) should preferably be contained in the material. The content of tricobalt tetroxide in this case should preferably be 10% by weight or less based on the weight of the particles consisting mainly of nickel hydroxide. If the content of the tricobalt tetroxide is more than 10% by weight, the effect for improving the over discharge property of the battery by the addition of tricobalt tetroxide may not be achieved.

(2) Alkaline electrolyte

The alkaline electrolyte may be composed only of potassium hydroxide (KOH), or composed of a mixture comprising potassium hydroxide and at least one kind of hydroxide selected from sodium hydroxide (NaOH) and lithium hydroxide (LiOH). It is also possible to employ the same composition of alkaline electrolyte as explained with reference to the alkaline secondary battery according to the first embodiment, i.e. an alkaline electrolyte which comprises 2.0 to 6.0M potassium hydroxide (KOH), 2.0 to 5.0M sodium hydroxide (NaOH), and 0.5 to 1.5M lithium hydroxide (LiOH). If this latter alkaline electrolyte is employed, it would be possible to manufacture an alkaline secondary battery exhibiting an improved charge/discharge cycle life and an improved charging efficiency at high temperature. In particular, if an alkaline electrolyte consisting mainly of sodium hydroxide is employed, both of the storage property under a high temperature environment and the charging efficiency at high temperature can be further improved, thereby making it possible to provide a secondary battery excellent in discharge property under a high temperature environment.

The alkaline secondary battery according to the third embodiment may be manufactured by the method which has been explained with reference to the aforementioned first embodiment, by the method which has been explained with reference to the aforementioned second embodiment, or by the following method.

Method of manufacturing alkaline secondary battery according to the third embodiment (1) Steps of manufacturing the positive electrode (unactivated positive electrode)

This positive electrode can be manufactured by the following methods (a) or (b).

(a) Particles consisting mainly of nickel hydroxide, cobalt-based particles as a conductivity assistant, a binder and water are kneaded to prepare a paste. This paste is then filled into the conductive substrate and dried. Subsequently, the resultant substrate is compression-molded to prepare a positive electrode wherein a mixture containing particles consisting mainly of nickel hydroxide and a cobalt compound is held by the conductive substrate.

As for the cobalt compound constituting the cobalt-based particles, it is possible to employ at least one compound selected from the group consisting of metallic cobalt (Co), cobalt monoxide (CoO) and cobalt hydroxide $\{Co(OH)_2\}$. This cobalt-based particles may contain a little amount of dicobalt trioxide $(Co_2O_3)$ or tricobalt tetraoxide $(Co_3O_4)$.

As for the binder, the materials as explained with reference to the positive electrode of the alkaline secondary battery according to the first embodiment may be employed.

(b) composite nickel hydroxide particles, a binder and water are kneaded to prepare a paste. This paste is then filled into the conductive substrate and dried. Subsequently, the resultant conductive substrate is compression-molded to prepare a positive electrode wherein a mixture containing particles consisting mainly of nickel hydroxide particles and a cobalt compound is held by the conductive substrate.

The composite nickel hydroxide particles are composed mainly of nickel hydroxide, and have on the surface a cobalt compound layer as a conductivity assistant.

The layer containing the cobalt compound may be selected from those containing metallic cobalt (Co), containing cobalt monoxide (CoO), containing cobalt hydroxide $\{Co(OH)_2\}$, containing cobalt monoxide and cobalt hydroxide, or containing cobalt oxyhydroxide (CoOOH). Among these layers, a layer containing cobalt hydroxide is most preferable. This cobalt compound layer may contain a little amount of dicobalt trioxide $(Co_2O_3)$ or tricobalt tetraoxide $(Co_3O_4)$.

The composite nickel hydroxide particles may be manufactured by making use of a precipitation method. Namely, the particles consisting mainly of nickel hydroxide is immersed in a solution containing only cobalt ions of predetermined concentration and then stirred for a predetermined period of time so as to sufficiently impregnate the fine pores of the nickel hydroxide particles with cobalt ions. Subsequently, this solution is dripped into an aqueous solution of sodium hydroxide forming a convection. As a result, a cobalt hydroxide layer is formed on the surface of the nickel hydroxide particles, thereby manufacturing the aforementioned composite nickel hydroxide particles. By the way, it is possible, through a sintering of the resultant composite nickel hydroxide in an oxygen atmosphere, to obtain a composite nickel hydroxide particles having a layer containing cobalt monoxide, a layer containing both cobalt monoxide and cobalt hydroxide, or a layer containing a high-order cobalt oxide.

As for the binder, the materials as explained with reference to the positive electrode of the alkaline secondary battery according to the first embodiment may be employed.

(2) Preparing of the battery unit

First of all, an electrode group is fabricated by interposing the separator between the positive electrode and the negative electrode, and then the resultant electrode group is placed together with an alkaline electrolyte in a case to be sealed therein, thus preparing a secondary battery unit.

As for the alkaline electrolyte, one containing LiOH of 0.5M or more is employed. If the concentration of LiOH is less than 0.5M, it would be difficult to form pores having a diameter of 0.0001 to 10 μm in the positive electrode by the initial charging treatment. By the way, a preferable upper limit of the concentration of LiOH is 1.5M. If the concentration of LiOH exceeds over 1.5M, the conductivity of the electrolyte may be deteriorated whereby lowering the charge/discharge cycle life. Moreover, since the LiOH is relatively low in solubility, it would be difficult to dissolve the LiOH in an amount exceeding 1.5M. Even if the LiOH is dissolved in an amount exceeding 1.5M, it may be precipitated at a lower temperature region. Therefore, a preferable concentration (M) of LiOH is in the range of 0.5 to 1.2.

(3) Initial charging

This initial charging is performed at a temperature ranging from 40 to 100° C. so as to provide the positive electrode with pores, substantially all of the pores each having a diameter with a range of 0.0001 μm to 10 μm.

If the initial charging is performed at a temperature falling outside the aforementioned range, it would be difficult to form the pores having a distribution of diameter falling within the aforementioned range. Therefore, a preferable range of temperature for performing the initial charging would be from 70 to 90° C.

The charging current and the charging time in the initial charging are set in such a manner that the pores having a distribution of diameter falling within the aforementioned range can be formed in the positive electrode.

The effects as illustrated below will be obtained by the alkaline secondary batteries according the first, second and third embodiments, by the method of manufacturing the alkaline secondary batteries according the first, second and third embodiments, and by the paste type positive electrodes for use in the alkaline secondary batteries according to the first and second embodiment.

Namely, since the alkaline secondary battery of the first embodiment of this invention is featured in that it comprises a positive electrode containing nickel hydroxide having a half-width of 0.8° or more of a peak in the (101) plane as measured by X-ray powder diffraction (2θ) using Cu-Kα ray as an X-ray source; and an alkaline electrolyte containing 2.0 to 6.0M (mol/ℓ) potassium hydroxide, 2.0 to 5.0M (mol/ℓ) sodium hydroxide, and 0.5 to 1.5M (mol/ℓ) lithium hydroxide, it is possible to keep a practical capacity retention during the charge/discharge cycle of the battery and at the same time to improve the high temperature charging efficiency.

Namely, since the alkaline secondary battery comprises a positive electrode containing nickel hydroxide having a specific half-width of a peak in the (101) plane thereof as measured by x-ray powder diffraction, and an alkaline electrolyte containing KOH, NaOH and LiOH each alkaline component having a specific concentration, it is possible to enhance the oxygen overvoltage of the positive electrode during the high temperature charging. As a result, the charging reaction of the nickel hydroxide at high temperature conditions as shown in the following formula (2) can be preferentially proceeded, so that the amount of NiOOH would be increasingly generated, thereby improving the charging efficiency of the positive electrode. Accordingly, it is possible to provide an alkaline secondary battery which is capable of maintaining a practical capacity retention in a charging/discharging cycle and at the same time has a high actual capacity (discharge capacity).

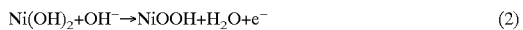

$$Ni(OH)_2 + OH^- \rightarrow NiOOH + H_2O + e^- \quad (2)$$

Of these electrolytes, one having a composition having NaOH as a main component effectively improves both charging efficiency and storage property of the alkaline secondary battery for use at high temperatures.

The charging efficiency of the positive electrode is much improved since NaOH in the electrolyte enhances the oxygen overvoltage of the positive electrode while the battery is being charged at high temperature. The storage property of the battery is improved probably because the self-discharge in the battery is suppressed for three reasons. First, the electrolyte has low conductivity since its main component is NaOH. Second, the cobalt in the positive electrode assumes a specific configuration by the electrolyte. Third, the hydrogen-absorbing alloy, i.e., the material of the negative electrode, has high corrosion resistance by the electrolyte.

If the electrolyte contains lithium hydroxide in a higher concentration, it will have higher conductivity to further improve the storage property of the battery.

Therefore, the alkaline secondary battery comprising an alkaline electrolyte containing 2.0 to 6.0M potassium hydroxide, 2.0 to 5.0M sodium hydroxide and 0.5 to 1.5M lithium hydroxide, the sodium hydroxide being contained as a main component, is capable of ensuring a practical capacity retention during the charge/discharge cycle of the battery and at the same time capable of effectively improving the charging efficiency and storage property under a high temperature environment.

The alkaline secondary battery according to the second embodiment of this invention is featured in that the conductive substrate constituting either the paste type positive electrode or the paste type negative electrode, or both of the electrodes is formed of a porous two-dimensional substrate 22 having a thickness of 60 μm or less and a large number of rectangular pores 21, which is manufactured by molding metal powder by way of powder rolling method, and of a pair of three-dimensional substrates $23_1$ and $23_2$ superimposed respectively on the opposed surfaces of the two-dimensional substrate 22, for example, one shown in FIG. 2.

This conductive substrate is constructed such that, since the lowering of the electric resistance and the improvement of the tensile strength are ensured by the two-dimensional substrate disposed at the middle, the weight per unit area of the three-dimensional substrates to be superimposed on both surfaces of the two-dimensional substrate is minimized so as to increase the filling density of the paste, i.e. the low electric resistance and high mechanical strength are retained while the porosity is increased.

FIG. 3 illustrates the relationship between the weight per unit area and the electric resistance in the conductive substrate (Example A) where a three-dimensional substrate consisting of a sponge-like metallic porous body is superimposed on the opposed surfaces of a two-dimensional substrate having a large number of pores and a thickness of 30 μm, and also the relationship between the weight per unit area and the electric resistance in the conductive substrate of the prior art which is formed only of a sponge-like metallic porous body (Comparative Example A). On the other hand, FIG. 4 illustrates the relationship between the weight per unit area and the tensile strength in the conductive substrate (Example A) and also in the conductive substrate of the prior art (Comparative Example A). The weight per unit area in the case of the conductive substrate of this invention is measured taking into account of not only the three-dimensional substrate but also the pores of the two-dimensional substrate. The weight per unit area in the case of the conductive substrate of this invention is altered by using various kinds of three-dimensional substrates. It can be seen from these FIGS. 3 and 4 that the conductive substrate according to this invention is low in electric resistance and high in tensile strength with a lower weight per unit area as compared with the conductive substrate of the prior art consisting only of a sponge-like metallic porous body.

It is possible, by filling a paste for positive or negative electrode in the conductive substrate formed of a two-dimensional substrate and two three-dimensional substrates superimposed respectively on the opposed surfaces the two-dimensional substrate, to obtain a paste type positive electrode and/or a paste type negative electrode which is high in current collecting efficiency and in paste filling density, i.e. high in capacity.

Accordingly, an alkaline secondary battery comprising the aforementioned paste type positive electrode and/or a paste type negative electrode of high capacity can improve the charge/discharge cycle life of the battery.

Further, it is possible, by limiting the thickness of the two-dimensional substrate having a large number of pores and being interposed between two the three-dimensional substrates made for example of a sponge-like nickel porous body to 60 μm or less, to obtain a flexible conductive substrate. As a result, it is possible, by employing a paste type electrode comprising such a conductive substrate as a positive electrode and spirally winding the positive electrode and a negative electrode with a separator being interposed therebetween, to form an electrode group of low porosity, thus making it possible to place the electrode group of high capacity in a bottomed cylindrical case. Therefore, an alkaline secondary battery which is high in capacity and excellent in charge/discharge cycle life can be obtained.

The paste type positive electrode for an alkaline secondary battery according to the first embodiment of this invention is featured in that it comprises a conductive substrate, nickel hydroxide and a cobalt compound, wherein the cobalt compound includes a β type cobalt hydroxide having a half-width of less than 0.40° of a peak in the (001) plane as measured by X-ray powder diffraction (2θ) using Cu-Kα ray as an X-ray source. This positive electrode helps provide an alkaline secondary battery having a large capacity and a long cycle life.

The utilization of nickel hydroxide can be further enhanced if the half-width of the peak in the (101) plane of the nickel hydroxide, as measured by X-ray powder diffraction using Cu-Kα as the X-ray source, is set at 0.8° or more.

Since the aforementioned laminate structure comprising a two-dimensional substrate and two three-dimensional substrates which are superimposed on both surfaces of the two-dimensional substrate is employed as a conductive substrate for the positive electrode, the electron conductivity between the nickel hydroxide particles and the conductive substrate can be prominently improved, thus further improving the utilization of the nickel hydroxide. At the same time, this positive electrode is capable of increasing the filling quantity of paste, i.e. the filling quantity of nickel hydroxide, while assuring low electric resistance and excellent tensile strength. Therefore, it is possible to further improve the discharge capacity and charge/discharge cycle life of the battery.

The method of manufacturing an alkaline secondary battery according to the first embodiment of this invention comprises the steps of; preparing a secondary battery unit including the aforementioned paste type positive electrode of the first embodiment, a negative electrode and an alkaline electrolyte; and performing an initial charging of the secondary battery unit at a temperature of 40 to 100° C. In this method, that part of the cobalt hydroxide having the above-specified half values which remains not reacted can be reduced. As a result, it is possible to provide, at low cost, an alkaline secondary battery which is improved in discharge capacity and in cycle life.

It is possible, with the employment of alkaline electrolyte comprising 2.0 to 6.0M potassium hydroxide, 2.0 to 5.0M sodium hydroxide and 0.5 to 1.5M lithium hydroxide, to improve the charging efficiency of the battery at high temperatures. In particular, if an alkaline electrolyte which includes sodium hydroxide as a main component is employed among the electrolytes having these compositions, the lowering of capacity during the storage of the battery in a high temperature environment can be suppressed. At the same time, the charging efficiency of the battery at high temperature can be improved. Accordingly, it is possible to further improve the discharge property in a high temperature condition.

The paste type positive electrode for an alkaline secondary battery according to the second embodiment of this invention is featured in that it comprises a conductive substrate, nickel hydroxide and a cobalt compound. In this case, the cobalt compound contains cobalt monoxide having a half-width of 0.50° or less of a peak in the (200) plane as measured by X-ray powder diffraction (2θ) using Cu-Kα ray as an X-ray source.

This positive electrode helps provide an alkaline secondary battery having a large capacity and a long cycle life.

The utilization of nickel hydroxide can be further enhanced if the half-width of the peak in the (101) plane of the nickel hydroxide, as measured by X-ray powder diffraction using Cu-Kα as the X-ray source, is set at 0.8° or more.

If the cobalt monoxide is present in the form of particles, the particles should preferably have cobalt (II) ion in a concentration of 4 mg/l or more when 0.35 g of the particles are immersed in 50 ml of a 6M aqueous solution of potassium hydroxide at a temperature of 25° C. and left to stand for 30 minutes. Accordingly, the dissolution rate into an alkaline electrolyte of the cobalt monoxide can be suitably controlled, thereby making it possible to sufficiently generate the conductive cobalt compound. Therefore, it is possible to further improve the discharge capacity and charge/discharge cycle life of the secondary battery.

If the cobalt monoxide is present in the form of particles, the particles should preferably contain 0 to 12% by weight of 3 valent cobalt compounds as determined by a potassium permanganate back titration. Accordingly, the dissolution rate into an alkaline electrolyte of the cobalt monoxide can be suitably controlled, thereby making it possible to sufficiently generate the conductive cobalt compound. Therefore, it is possible to further improve the discharge capacity and charge/discharge cycle life of the secondary battery.

Since the aforementioned laminate structure comprising a two-dimensional substrate and two three-dimensional substrates which are superimposed on both surfaces of the two-dimensional substrate is employed as a conductive substrate for the positive electrode, the electron conductivity between the nickel hydroxide particles and the conductive substrate can be prominently improved, thus further improving the utilization of the nickel hydroxide. At the same time, this positive electrode is capable of increasing the filling quantity of nickel hydroxide, while assuring a low electric resistance and an excellent tensile strength. Therefore, it is possible to further improve the discharge capacity and charge/discharge cycle life of the battery.

The method of manufacturing an alkaline secondary battery according to the second embodiment of this invention comprises the steps of; preparing a secondary battery unit including the aforementioned paste type positive electrode of the second embodiment, a negative electrode and an alkaline electrolyte; and performing an activation of the secondary battery unit. According to this method, it is possible to provide an alkaline secondary battery which is improved in discharge capacity and in cycle life.

It is possible, with the employment of alkaline electrolyte comprising 2.0 to 6.0M potassium hydroxide, 2.0 to 5.0M sodium hydroxide and 0.5 to 1.5M lithium hydroxide, to improve the charging efficiency of the secondary battery at high temperatures. In particular, if an alkaline electrolyte which includes sodium hydroxide as a main component is employed among the electrolytes having these compositions, the storage property and the charging efficiency in a high temperature environment can be improved, thereby making it possible to further improve the discharge capacity and charge/discharge cycle life of the battery in a high temperature condition.

The alkaline secondary battery according to the third embodiment of this invention is featured in that it comprises a positive electrode comprising a conductive substrate and a mixture held by the substrate; a negative electrode; and an alkaline electrolyte. The mixture contains nickel hydroxide and a conductive cobalt compound. This positive electrode has pores, substantially all of the pores each having a diameter with a range of 0.0001 μm to 10 μm. Since this positive electrode is capable of improving the utilization of the active material (nickel hydroxide), it is possible to improve the discharge capacity and the charge/discharge cycle life of the battery. At the same time, it is possible to provide an alkaline secondary battery which is extremely improved in capacity recovery efficiency when the battery is stored for a long period of time or under a high temperature environment.

When an alkaline secondary battery is stored for a long period of time or under a high temperature environment, the battery voltage is decreased and the lowering of capacity recovery ratio is recognized at the occasion of re-charging. This phenomenon is assumed to be ascribed to the facts that the conductive cobalt compound (such as CoOOH having a high conductivity) is reduced during the storage thereby diminishing the conductivity thereof and hence the utilization the active material is lowered. If this positive electrode has a large number of pores exceeding over 10 μm in diameter, the distribution of the conductive cobalt compound in relative to the particles consisting mainly of nickel hydroxide becomes non-uniform so that portions where the conductive cobalt compound exists only in a little or trace amount are considered to be distributed in the positive electrode. If the reduction reaction of the conductive compound has taken place during the storage of the battery, the aforementioned portions where the conductive cobalt compound can hardly exist are extremely damaged in conductivity so that the electron conductivity of the particles would be deteriorated as compared with other portions. Therefore, the secondary battery comprising such a positive electrode having many pores exceeding over 10 μm in diameter would be suffered from a prominent lowering of utilization of active material during the storage thereof and hence from a prominent lowering of capacity recovery ratio after the storage.

The positive electrode which has pores, substantially all of the pores each having a diameter with a range of 0.0001 to 10 μm has few large pores and is characterized by a uniform dispersion of the conductive cobalt compound in relative to the particles consisting mainly of nickel hydroxide as well as by a dense covering of the cobalt compound on the surfaces of the particles. Therefore, it is possible to prevent the occurrence of the portion in the positive electrode where the degree of deterioration of conductivity is extremely prominent as compared other portions that might be resulted when the battery is stored under a high temperature environment or for a long period of time. Therefore, it is possible to improve the over discharge property of the battery. At the same time, since it is possible with this positive electrode to increase the energy density because of the improvements in density thereof and to increase the utilization, the discharge capacity and charge/discharge cycle life of the battery can be improved.

By the way, the nickel hydroxide can be changed into β type nickel oxyhydroxide by means of charging, and then into γ type nickel oxyhydroxide if the charging is further performed. Since this γ type nickel oxyhydroxide uptakes an alkaline metal or water therein as this γ type nickel oxyhydroxide is produced, the positive electrode is caused to swell, thereby promoting the degradation of the positive electrode. However, since the positive electrode according to this invention is high in density, it is possible to prevent any excessive amount of alkaline metal or water from entering into the positive electrode, thus making it possible to improve the charge/discharge cycle life of the alkaline secondary battery.

When the active material of the positive electrode contains tricobalt tetroxide, it is possible to suppress the reduction reaction of the conductive cobalt compound during the storage of the battery, since this tricobalt tetroxide is low in solubility in an alkaline electrolyte and stable as compared with the conductive cobalt compound such as cobalt oxyhydroxide. Moreover, this positive electrode containing tricobalt tetroxide is capable of decreasing the quantity of cobalt compound of bi- or less valency which may become a nucleus at the occasion of the aforementioned reduction reaction. Accordingly, the secondary battery comprising this positive electrode is effective in further promoting the over discharge property. The aforementioned effect of suppressing the reduction reaction by the presence of tricobalt tetroxide can be most effectively manifested when this tricobalt tetroxide is existed in the positive electrode in such a manner that the surfaces of the particles consisting mainly of nickel hydroxide are covered by a layer in which tricobalt tetroxide and a conductive cobalt compound are co-existed (eutectic).

It is possible, with the employment of alkaline electrolyte comprising 2.0 to 6.0M potassium hydroxide, 2.0 to 5.0M sodium hydroxide and 0.5 to 1.5M lithium hydroxide, to improve the charging efficiency of the secondary battery at high temperatures. In particular, if an alkaline electrolyte which includes sodium hydroxide as a main component is employed among the electrolytes having these compositions, both of the storage property and the charging efficiency of the battery in a high temperature environment can be improved, thereby making it possible to improve the discharge capacity of the battery in a high temperature condition.

The method of manufacturing an alkaline secondary battery according to this invention is featured in that it comprises the steps of: preparing a secondary battery unit including a positive electrode, a negative electrode and an alkaline electrolyte containing lithium hydroxide of 0.5 mol/$\ell$ or more, the positive electrode comprising a conductive substrate and a mixture held by the conductive substrate, the mixture containing a cobalt compound and nickel hydroxide; and performing an initial charging of the secondary battery unit at a temperature of 40 to 100° C. so as to form pores in the positive electrode, the pores being 0.0001 μm to 10 μm in diameter. According to this method, the conductive cobalt compound can be uniformly generated throughout the positive electrode and unreacted cobalt compound is prevented from being left in the positive electrode, so that it is possible to manufacture an alkaline secondary battery comprising a positive electrode comprising a conductive substrate and a mixture held by the substrate and containing nickel hydroxide and a conductive cobalt compound. The positive electrode also has pores, substantially all of the pores each having a diameter with a range of 0.0001 μm to 10 μm. Accordingly, it is possible to provide an alkaline secondary battery which is improved in utilization of the active material and in over discharge property.

Since a conductive substrate filled therein with a paste containing a composite nickel hydroxide particles (which are obtained by means of precipitation for instance) is employed as the positive electrode of un-activated alkaline secondary battery, the distribution of the conductive cobalt compound can be made uniform in relative to the nickel hydroxide. As a result, the diametral distribution of the pores of the positive electrode becomes almost monodisperse and the porosity of the positive electrode can be minimized. Furthermore, since the cobalt compound can be made more uniform with lesser amount thereof as compared with a case where the cobalt compound is added in the form of powder, the amount of nickel hydroxide can be increased by the amount corresponding to the decreased amount of the cobalt compound, thus enhancing the capacity of the battery. As a result, the discharge capacity, over discharge property and utilization of nickel hydroxide of the battery can be further improved.

Next, examples of this invention will be explained in detail with reference to drawings.

EXAMPLE 1

First of all, to a mixed powder consisting of 90 parts by weight of nickel hydroxide powder having a value of 0.95° in the half-width of a peak in the (101) plane thereof as measured by X-ray powder diffraction (2θ) and 10 parts by weight of cobalt monoxide were added 0.2% by weight of carboxymethyl cellulose and 1.0% by weight of polytetrafluoroethylene to obtain a mixture, to which 30% by weight of water was further added and the resultant mixture was kneaded to prepare a paste. Then, this paste was filled in a nickel-plated fibrous substrate (a conductive substrate) having a porosity of 95% and dried. Then, the fibrous substrate was press-molded by making use of a roller press to manufacture a positive electrode. By the way, the X-ray powder diffraction was performed using Cu-Kα ray as an X-ray source and under the conditions of 40 kV in tube voltage, 30 mA in tube current, and 2.00° /min. in scanning speed.

On the other hand, to 95 parts by weight of hydrogen-absorbing alloy powder having the composition of $LaNi_{4.0}Co_{0.4}Mn_{0.3}Al_{0.3}$ were added 3 parts by weight of polytetrafluoroethylene, 1 part by weight of carbon powder, 1 part by weight of carboxymethyl cellulose (binder) and 50 parts by weight of water to obtain a mixture, which was then mixed to prepare a paste. This paste was then filled into a nickel net and press-molded to manufacture a negative electrode comprising a hydrogen-absorbing alloy.

A separator formed of polypropylene nonwoven fabric was disposed between the negative electrode and the positive electrode, and the resultant composite was spirally wound to prepare an electrode group. This electrode group was housed in a cylindrical bottomed case together with an alkaline electrolyte having a composition shown in the following Tables 1 to 5, thereby assembling 22 kinds of cylindrical nickel hydrogen secondary batteries each having a structure shown in FIG. 1 and a size of 4/3A (logical capacity: 2,800 mAh).

TABLE 1

| (LiOH; None) | | |
| --- | --- | --- |
|  | No. 1 | No. 2 |
| LiOH | None | None |
| NaOH | 6.5 M | 7.0 M |
| KOH | 2.0 M | 1.5 M |
| Total | 8.5 M | 8.5 M |

TABLE 2

| (LiOH; 0.25 M) | | |
| --- | --- | --- |
|  | No. 3 | No. 4 |
| LiOH | 0.25 M | 0.25 M |
| NaOH | 6.05 M | 7.00 M |
| KOH | 1.75 M | 1.25 M |
| Total | 8.50 M | 8.50 M |

TABLE 3

| (LiOH; 0.5M) | | | | | | |
| --- | --- | --- | --- | --- | --- | --- |
|  | No. 5 | No. 6 | No. 7 | No. 8 | No. 9 | No. 10 |
| LiOH | 0.5M | 0.5M | 0.5M | 0.5M | 0.5M | 0.5M |
| NaOH | 2.0M | 3.0M | 4.0M | 5.0M | 6.0M | 7.0M |
| KOH | 6.0M | 5.0M | 4.0M | 3.0M | 2.0M | 1.0M |
| Total | 8.5M | 8.5M | 8.5M | 8.5M | 8.5M | 8.5M |

TABLE 4

| (LiOH; 1.0M) | | | | | | |
| --- | --- | --- | --- | --- | --- | --- |
|  | No. 11 | No. 12 | No. 13 | No. 14 | No. 15 | No. 16 |
| LiOH | 1.0M | 1.0M | 1.0M | 1.0M | 1.0M | 1.0M |
| NaOH | 2.0M | 3.0M | 4.0M | 5.0M | 6.0M | 7.0M |
| KOH | 5.5M | 4.5M | 3.5M | 2.5M | 1.5M | 0.5M |
| Total | 8.5M | 8.5M | 8.5M | 8.5M | 8.5M | 8.5M |

TABLE 5

| (LiOH; 1.5M) | | | | | | |
| --- | --- | --- | --- | --- | --- | --- |
|  | No. 17 | No. 18 | No. 19 | No. 20 | No. 21 | No. 22 |
| LiOH | 1.5M | 1.5M | 1.5M | 1.5M | 1.5M | 1.5M |
| NaOH | 2.0M | 3.0M | 4.0M | 5.0M | 6.0M | 7.0M |
| KOH | 5.5M | 4.0M | 3.0M | 2.0M | 1.0M | 0M |
| Total | 8.5M | 8.5M | 8.5M | 8.5M | 8.5M | 8.5M |

Each secondary battery thus obtained was confirmed of standard capacity in the normal temperature (25° C.) charging wherein the secondary battery was subjected to a charge/discharge cycle: $-\Delta V$ control (a cut-off voltage of 10 mV) charging with 1 C at 25° C. and discharging with 1 C, 1 V cut at 25° C. Thereafter, each secondary battery was confirmed of the capacity in the 60° C. charging wherein the secondary battery was subjected to a charge/discharge cycle: $-\Delta V$ control (a cut-off voltage of 10 mV) charging with 1 C at 60° C., and discharging with 1 C, 1V cut at 25° C. Then, the ratio of capacity at 60° C. to the standard capacity at the normal temperature (25° C.) was calculated to measure the charging efficiency (%). The results of this measurement are shown in FIG. 5. The total concentration of the electrolyte shown in FIG. 5 was 8.5M, and hence the concentration of KOH was indicated by subtracting the total concentration of NaOH and LiOH from 8.5M at a given point in FIG. 5.

Figure 6:
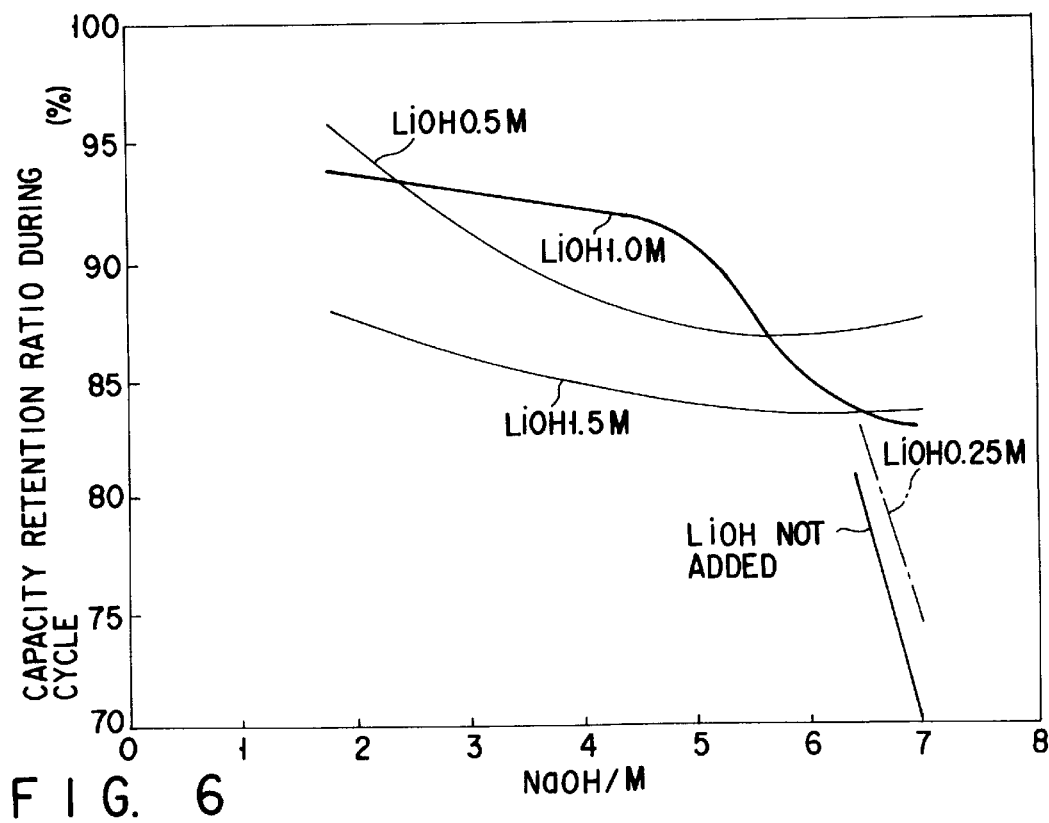
FIG. 6 is a graph showing the relationship between the composition of the alkaline electrolyte and the capacity retention at the occasion of charging/discharging cycle in the secondary battery of Example 1.

Additionally, each secondary battery was subjected to 400 cycles of charge/discharge at 25° C.: charging with 1 C, $-\Delta V$ and discharging with 1 C, 1V cut so as to measure a capacity retention ratio (%) after 400 cycles in relative to the initial capacity. The results are shown in FIG. 6. The total concentration of the electrolyte shown in FIG. 6 was 8.5M, and hence the concentration of KOH was indicated by subtracting the total concentration of NaOH and LiOH from 8.5M at a given point in FIG. 6.

As apparent from FIG. 5, in the case of the secondary battery comprising an alkaline electrolyte comprising KOH, NaOH and LiOH wherein the total concentration of the alkaline components is made constant (8.5M in this case), the larger the concentration of LiOH and of NaOH in the alkaline electrolyte is, the more prominent improvement in high temperature charging efficiency of the battery can be achieved.

As apparent from FIG. 6, in the case of the secondary battery comprising an alkaline electrolyte comprising KOH, NaOH and LiOH wherein the total concentration of the alkaline components is made constant (8.5M in this case), the smaller the concentration of LiOH and of NaOH in the alkaline electrolyte is, i.e. the larger the concentration of KOH in the alkaline electrolyte is, the higher the capacity retention ratio of the battery during the charge/discharge cycles becomes.

Therefore, in view of the relationship between the high temperature charging efficiency shown in FIG. 5 and the capacity retention during the charge/discharge cycles shown in FIG. 6, the secondary battery comprising an alkaline electrolyte comprising KOH, NaOH and LiOH wherein the total concentration of the alkaline components is made constant (8.5M for example), the concentration of LiOH being confined to 0.5 to 1.5M, the concentration of NaOH being confined to 2.0 to 5.0M (preferably 3 to 5.0M), the concentration of KOH being defined by subtracting the concentrations of LiOH and NaOH from the total concentration, is capable of improving the high temperature charging efficiency while ensuring a practical capacity retention after 400 times of charge/discharge cycle.

Reference Example

First of all, a cylindrical nickel hydrogen secondary battery having the same structure as in Example 1, i.e. a structure shown in FIG. 1 and a size of 4/3A (logical capacity: 2,800 mAh) was assembled by repeating the same procedures as illustrated in Example 1 except that nickel hydroxide particles having a value of 0.7° in the half-width of a peak in the (101) plane thereof as measured by x-ray powder diffraction (2θ) using Cu-Kα ray as an X-ray source was employed as an active material for the positive electrode, and a solution comprising 1.0M LiOH, 3.0M NaOH and 4.5M KOH was employed as the alkaline electrolyte.

The secondary battery thus obtained was investigated with regard to the high temperature charging efficiency and the capacity retention ratio during the charge/discharge cycles under the same conditions as illustrated in Example 1. As a result, the charging efficiency was found to be 53%, and the capacity retention ratio during the charge/discharge cycles was found to be 60%. Therefore, although the composition of this electrolyte was the same as that of this invention, the secondary battery of this reference example which comprises a positive electrode containing an active material exhibiting a value of 0.7°/2θ in the half-width of a peak in the (101) plane thereof as measured by X-ray powder diffraction was found inferior in the high temperature charging efficiency as well as in the capacity retention during the charge/discharge cycle as compared with the secondary battery of this invention which comprises a positive electrode comprising nickel hydroxide exhibiting a half-width of not less than 0.8°/2θ (Cu-Kα).

EXAMPLE 2

Alkaline secondary batteries, each provided with an alkaline electrolyte selected from No. 12 to 15 shown in Table 4, were measured regarding their storage property under high temperature environments.

Assembling of a Secondary Battery of Comparative Example 1

First of all, a cylindrical nickel hydrogen secondary battery having the same structure as in Example 1, i.e. a structure shown in FIG. 1 and a size of 4/3A (logical capacity: 2,800 mAh) was assembled by repeating the same procedures as illustrated in Example 1 except that a solution comprising 1.0M LiOH and 7.0M KOH was employed as the alkaline electrolyte.

Measurement of self-discharge ratio (capacity deterioration ratio) under a high temperature environment.

Each of the secondary batteries comprising an alkaline electrolyte selected from No. 12 to 15 in Table 4 and the secondary battery of Comparative Example 1 was confirmed of standard capacity in the normal temperature (25° C.) charging wherein the secondary battery was subjected to a charge/discharge cycle: charging with 1 C, −ΔV control (a cut-off voltage of 10 mV) charging at 25° C., and discharging with 1 C, 1V cut at 25° C. Thereafter, each secondary battery was further confirmed of the retention capacity after a storage under high temperature conditions wherein the secondary battery was subjected to a charge/discharge cycle: 1 C, −ΔV control (a cut-off voltage of 10 mV) charging at 25° C., a two-week storage at 45° C., followed by 1 C, 1V cut discharge at 25° C. Then, the ratio of self-discharge (%) was calculated by dividing the value of difference between the standard capacity at the normal temperature (25° C.) and the retention capacity by the value of aforementioned standard capacity. The results of this measurement are shown in Table 6.

TABLE 6

|  | Self-discharge ratio (%) |
| --- | --- |
| No. 12 | 24 |
| No. 13 | 22 |
| No. 14 | 20 |
| No. 15 | 18 |
| Comparative Example 1 | 27 |

As apparent from Table 6, the secondary battery comprising an alkaline electrolyte selected from No. 12 to 15 was low in self-discharge ratio as compared with the secondary battery of Comparative Example 1. Among these batteries, the secondary batteries comprising an alkaline electrolyte composed mainly of NaOH (Nos. 13 to 15) were more superior in suppressing the self-discharging during the storage under high temperature conditions and hence in improving the storage property at a high temperature as compared with the secondary battery comprising an alkaline electrolyte composed No. 12.

Therefore, in view of the relationship among the self-discharge ratio shown in Table 6, the high temperature charging efficiency shown in FIG. 5 and the capacity retention during the charge/discharge cycles shown in FIG. 6, the secondary battery comprising an alkaline electrolyte comprising KOH, NaOH and LiOH wherein the total concentration of the alkaline components is made constant (8.5M for example), the concentration of LiOH being confined to 0.5 to 1.5M, the concentration of NaOH being confined to 2.0 to 5.0M, the concentration of KOH being defined by subtracting the concentrations of LiOH and NaOH from the total concentration, and where the alkaline electrolyte contains NaOH as a main component is capable of more effectively improving the charging efficiency and storage property under high temperature environments while ensuring a practical capacity retention after 400 times of charge/discharge cycle.

Preparation of paste type positive electrode A

First of all, nickel powder 0.5 μm in average diameter was fed from a hopper onto a belt conveyer made of a high rigid material, and allowed to pass through a doctor blade disposed downstream in the transferring direction of the belt conveyer thereby to form a nickel powder layer on the surface of the belt conveyer. Then, the metallic powder layer on the belt conveyer was compressed by a pair of rolls, i.e. an embossed roll having a large number of protrusions and disposed over the belt conveyer and a counter roll disposed beneath the belt conveyer, whereby forming a green compact sheet having a large number of pores corresponding to the protrusions of the embossed roll. Subsequently, the green compact sheet was transferred together with the belt conveyer to a sintering furnace, in which the green compact sheet was sintered in an argon gas atmosphere and at a temperature of 1,000° C. to form a sintered nickel sheet, i.e. a two-dimensional substrate. This two-dimensional substrate was found to be 30 $\mu$M in thickness, 2 mm×2 mm in rectangular pore dimension, and 60% in opening ratio.

Then, a sponge-like three-dimensional substrate which was made of nickel was superimposed on the opposed surfaces of this two-dimensional substrate to prepare a conductive substrate. The three-dimensional substrate employed in this case was 0.8 mm in thickness, 98% in porosity and 100 g/m$^2$ in weight per unit area.

To a mixed powder consisting of 90 parts by weight of nickel hydroxide powder and 10 parts by weight of cobalt monoxide were added 0.2 part by weight of carboxymethyl cellulose and 1.0 parts by weight of polytetrafluoroethylene suspension (specific weight: 1.5, solid matters 60%) to obtain a mixture, to which 30 parts by weight of pure water was further added and the resultant mixture was kneaded to prepare a paste. Then, this paste was filled in the aforementioned conductive substrate, which was then dried and press-molded by making use of a roller press to manufacture a paste type positive electrode having a thickness of 0.7 mm.

Preparation of paste type positive electrode B

The same kind of paste employed in the preparation of the positive electrode A was filled in a conductive substrate formed of a sponge-like nickel porous body 1.7 mm in thickness and 100 g/m$^2$ in weight per unit area. Then, this conductive substrate was dried and press-molded by making use of a roller press to manufacture a paste type positive electrode having a thickness of 0.7 mm.

Preparation of a paste-type negative electrode A

A hydrogen-absorbing alloy having a composition of $LmNi_{4.0}Co_{0.4}Mn_{0.3}Al_{0.3}$ was prepared by making use of lanthanum-rich misch metal Lm, which is available in the market, Ni, Co, Mn and Al, and by making use of a high frequency furnace. This hydrogen-absorbing alloy was then pulverized by a mechanical means, and the pulverized material was sieved through a 200 mesh sieve. 95 parts by weight of the hydrogen-absorbing alloy powder thus sieved was mixed with 1.0 part by weight of carboxymethyl cellulose (CMC), 3.0 parts by weight (measured as solid portion) of the dispersion of polytetrafluoroethylene (specific gravity: 1.5, solid portion: 60 wt %), 1.0 part by weight of carbon powder (a conductive material) and 50 part by weight of water thereby preparing a paste. This paste was coated and filled in the same kind of conductive substrate as employed in the preparation of the positive electrode A (a laminate structure comprising a two-dimensional substrate and a pair of three-dimensional substrates superimposed on both surfaces of the two-dimensional substrate), and after being dried, press-molded to form a paste-type negative electrode having a thickness of 0.4 mm.

Preparation of paste type negative electrode B

The same kind of paste employed in the preparation of the negative electrode A was filled in a conductive substrate formed of a punched nickel sheet 80 $\mu$m in thickness, 2 $\mu$m in pore diameter and 55% in porosity. Then, this conductive substrate filled with the paste was dried and press-molded to manufacture a paste type negative electrode having a thickness of 0.4 mm.

EXAMPLE 3

A separator formed of polyolefin nonwoven fabric and treated to make it hydrophilic was disposed between the paste type positive electrode A prepared as mentioned above and the paste type negative electrode A prepared as mentioned above, and the resultant composite was spirally wound to prepare an electrode group. This electrode group was housed in a cylindrical bottomed case together with an alkaline electrolyte comprising 7M KOH and 1M LiOH, thereby assembling a cylindrical nickel hydrogen secondary battery having a structure shown in FIG. 1 and a size of 4/3A (logical capacity: 2,800 mAh).

EXAMPLE 4

A separator formed of polyolefin nonwoven fabric and treated to make it hydrophilic was disposed between the paste type positive electrode A prepared as mentioned above and the paste type negative electrode B prepared as mentioned above, and the resultant composite was spirally wound to prepare an electrode group. This electrode group was housed in a cylindrical bottomed case together with an alkaline electrolyte comprising 7M KOH and 1M LiOH, thereby assembling a cylindrical nickel hydrogen secondary battery having a structure shown in FIG. 1 and a size of 4/3A (logical capacity: 2,800 mAh).

EXAMPLE 5

A separator formed of polyolefin nonwoven fabric and treated to make it hydrophilic was disposed between the paste type positive electrode B prepared as mentioned above and the paste type negative electrode A prepared as mentioned above, and the resultant composite was spirally wound to prepare an electrode group. This electrode group was housed in a cylindrical bottomed case together with an alkaline electrolyte comprising 7M KOH and 1M LiOH, thereby assembling a cylindrical nickel hydrogen secondary battery having a structure shown in FIG. 1 and a size of 4/3A (logical capacity: 2,800 mAh).

Comparative Example 2

A separator formed of polyolefin nonwoven fabric and treated to make it hydrophilic was disposed between the paste type positive electrode B prepared as mentioned above and the paste type negative electrode B prepared as mentioned above, and the resultant composite was spirally wound to prepare an electrode group. This electrode group was housed in a cylindrical bottomed case together with an alkaline electrolyte comprising 7M KOH and 1M LiOH, thereby assembling a cylindrical nickel hydrogen secondary battery having a structure shown in FIG. 1 and a size of 4/3A (logical capacity: 2,800 mAh).

Comparative Example 3

A punched nickel sheet 2 mm in pore diameter and 55% in porosity was prepared as a two-dimensional substrate by punching a 80 $\mu$m thick nickel sheet by making use of a punching apparatus. Then, a three-dimensional substrate formed of sponge-like nickel was superimposed on the opposed surfaces of the punched nickel sheet to prepare a conductive substrate. The three-dimensional substrate employed in this case was 0.8 mm in thickness, 98% in porosity and 100 g/m$^2$ in weight per unit area.

The same kind of paste employed in the preparation of the positive electrode A was filled in the above conductive substrate. Then, this conductive substrate filled with the paste was dried and press-molded to manufacture a paste type positive electrode having a thickness of 0.7 mm.

Further, the same kind of paste employed in the preparation of the negative electrode A was filled in the above conductive substrate. Then, this conductive substrate filled with the paste was dried and press-molded to manufacture a paste type negative electrode having a thickness of 0.4 mm.

Then, a separator formed of polyolefin nonwoven fabric and treated to make it hydrophilic was disposed between the paste type positive electrode prepared as mentioned above and the paste type negative electrode prepared as mentioned above, and the resultant composite was spirally wound to prepare an electrode group. This electrode group was housed in a cylindrical bottomed case together with an alkaline electrolyte solution comprising 7M KOH and 1M LiOH, thereby assembling a cylindrical nickel hydrogen secondary battery having a structure shown in FIG. 1 and a size of 4/3A (logical capacity: 2,800 mAh).

Each of the secondary batteries obtained in Examples 3 to 5 and Comparative Examples 2 and 3 was subjected to repeated cycles of charge/discharge: charging with 1 C, -ΔV and discharging with 1 C, 1V cut. The results on the relationship between the number charge/discharge cycle and the discharge voltage in each secondary battery are shown in FIG. 7, and the results on the relationship between the number charge/discharge cycle and the utilization of positive electrode are shown in FIG. 8.

Figure 7:
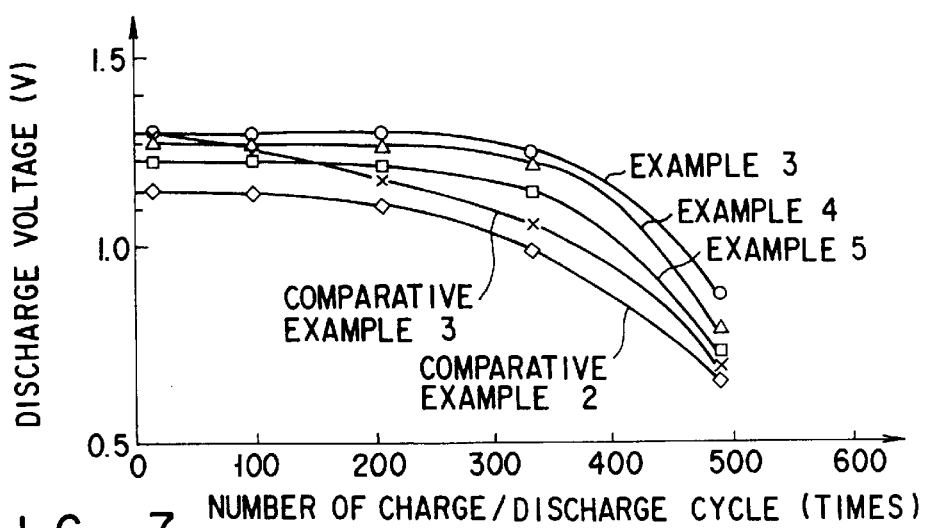
FIG. 7 is a graph showing the relationship between the number of charging/discharging cycle and the discharge voltage in the nickel hydrogen secondary batteries of Examples 3 to 5 and of Comparative Examples 2 and 3.

As apparent from FIG. 7, the nickel hydrogen secondary batteries in Examples 3 to 5 were capable of maintaining a higher discharge voltage even after the repetition of 500 times of charge/discharge cycle as compared with the battery of Comparative Example 2 where a punched nickel sheet was employed as a conductive substrate for the negative electrode. In particular, the secondary battery according to Example 3 where both of the positive and negative electrodes were formed of a porous two-dimensional substrate having a thickness of 60 μm or less which was obtained by molding metal powder by way of powder rolling method, and two three-dimensional substrates superimposed respectively on the opposed surfaces of the porous two-dimensional substrate was found capable of maintaining a higher discharge voltage as compared with the secondary batteries of Examples 4 and 5.

By contrast, the secondary battery according to Comparative Example 3 where both of the positive and negative electrodes were formed of a two-dimensional substrate formed of a 80 μm thick punched nickel sheet and two three-dimensional substrates superimposed respectively on the opposed surfaces of the two-dimensional substrate was found inferior in discharge voltage maintenance property as compared with the secondary batteries of Examples 3 to 5 though it indicated a superior discharge voltage maintenance property as compared with the secondary battery of Comparative Examples 2. This can be ascribed to the facts that since the secondary battery according to Comparative Example 3 employed a 80 μm thick punched nickel sheet accompanying burr and warpage as a conductive substrate for the positive and negative electrodes, the porosity in the electrode group may become higher as the electrode group formed of a spiral winding of the positive and negative electrodes and a separator was housed in the bottomed cylindrical case.

Figure 8:
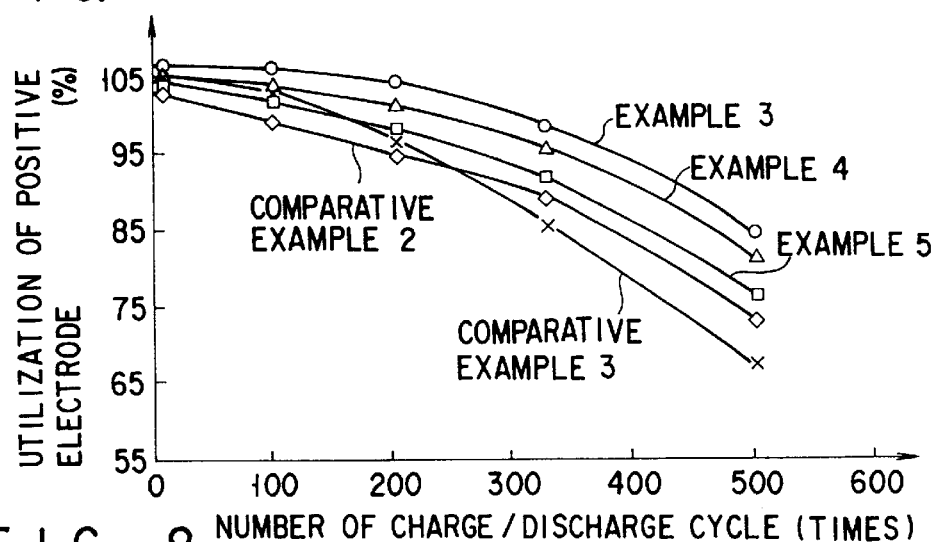
FIG. 8 is a graph showing the relationship between the number of charging/discharging cycle and the utilization of positive electrode in the nickel hydrogen secondary batteries of Examples 3 to 5 and of Comparative Examples 2 and 3.

As seen from FIG. 8, the secondary batteries according to Examples 3 to 5 indicated an improved utilization of the positive electrode as compared with the secondary batteries according to Comparative Examples 2 and 3.

EXAMPLE 6

Preparation of paste type positive electrode

To 90% by weight of nickel hydroxide particles exhibiting a value of 0.95° in the half-width of a peak in the (101) plane thereof as measured by X-ray powder diffraction (2θ) were added 10% by weight of β type cobalt hydroxide particles as a conductive agent, 0.2 part by weight of carboxymethyl cellulose, 1.0 parts by weight of polytetrafluoroethylene suspension (specific weight: 1.5, solid matters 60%) and 30 parts by weight of pure water, and the resultant mixture was kneaded to obtain a paste. Then, the paste thus obtained was filled in a nickel-plated metallic porous body having a weight per unit area of 300 g/m$^2$ and a thickness of 1.7 mm. After being subjected to drying, the metallic porous body was rolled to prepare a paste type positive electrode having a capacity of 2,800 mAh. The β type cobalt hydroxide particles employed in this example were pink in color, 0.25° in the half-width of a peak in the (001) plane thereof as measured by X-ray powder diffraction (2θ) and 1.0 μm in average particle diameter. By the way, the X-ray powder diffraction was performed using Cu-Kα ray as an X-ray source and under the conditions of 40 kV in tube voltage, 30 mA in tube current, and 2.00°/min. in scanning speed. On the other hand, the average particle diameter of cobalt hydroxide particles was measured by measuring at first the particle size distribution by means of known laser method and then obtaining a value at an accumulation of 50%.

Preparation of a paste-type negative electrode

Mm which is available in the market (a misch metal; a mixture of rare earth elements), Ni, Co, Mn and Al were weighed to adjust the ratio of these components to 4.0:0.4:0.3:0.3. Thereafter, these components were dissolved in a high frequency furnace and the resultant melt was allowed to cool thereby to obtain an alloy ingot having a composition of $MmNi_{4.0}Co_{0.4}Mn_{0.3}Al_{0.3}$. Then, this alloy ingot was pulverized by a mechanical means, and the pulverized material was sieved to obtain hydrogen-absorbing alloy powder having particle diameter of not more than 50 μm. 95 parts by weight of the hydrogen-absorbing alloy powder thus sieved was mixed with 1.0 part by weight of carboxymethyl cellulose (CMC), 3.0 parts by weight (measured as solid portion) of the dispersion of polytetrafluoroethylene (specific gravity: 1.5, solid portion: 60 wt %), 1.0 part by weight of carbon powder (a conductive material) and 50 part by weight of water thereby preparing a paste. This paste was coated on a punched metal and after being dried, press-molded to form a paste-type negative electrode.

A separator formed of polyolefin nonwoven fabric and treated to make it hydrophilic was disposed between the paste type positive electrode and the paste type negative electrode prepared as mentioned above, and the resultant composite was spirally wound to prepare an electrode group. This electrode group was housed in a cylindrical bottomed case and then an alkaline electrolyte comprising a 8.5M aqueous solution of KOH was introduced into the cylindrical bottomed case, thereby preparing a nickel hydrogen secondary battery having a structure shown in FIG. 1 and a nominal capacity of 2,800 mAh.

EXAMPLE 7

A nickel hydrogen secondary battery similar to that of Example 6 was prepared by following the same procedures as explained in Example 6 except that β type cobalt hydroxide particles exhibiting a value of 0.35° in the half-width of a peak in the (001) plane thereof as measured by X-ray powder diffraction (2θ) was substituted for the cobalt hydroxide particles of the positive electrode employed in Example 6.

Comparative Example 4

A nickel hydrogen secondary battery similar to that of Example 6 was prepared by following the same procedures as explained in Example 6 except that β type cobalt hydroxide particles exhibiting a value of 0.45° in the half-width of a peak in the (001) plane thereof as measured by X-ray powder diffraction (2θ) was substituted for the cobalt hydroxide particles of the positive electrode employed in Example 6.

Comparative Example 5

A nickel hydrogen secondary battery similar to that of Example 6 was prepared by following the same procedures as explained in Example 6 except that β type cobalt hydroxide particles exhibiting a value of 0.55° in the half-width of a peak in the (001) plane thereof as measured by X-ray powder diffraction (2θ) was substituted for the cobalt hydroxide particles constituting the conductive agent of the positive electrode employed in Example 6.

Figure 9:
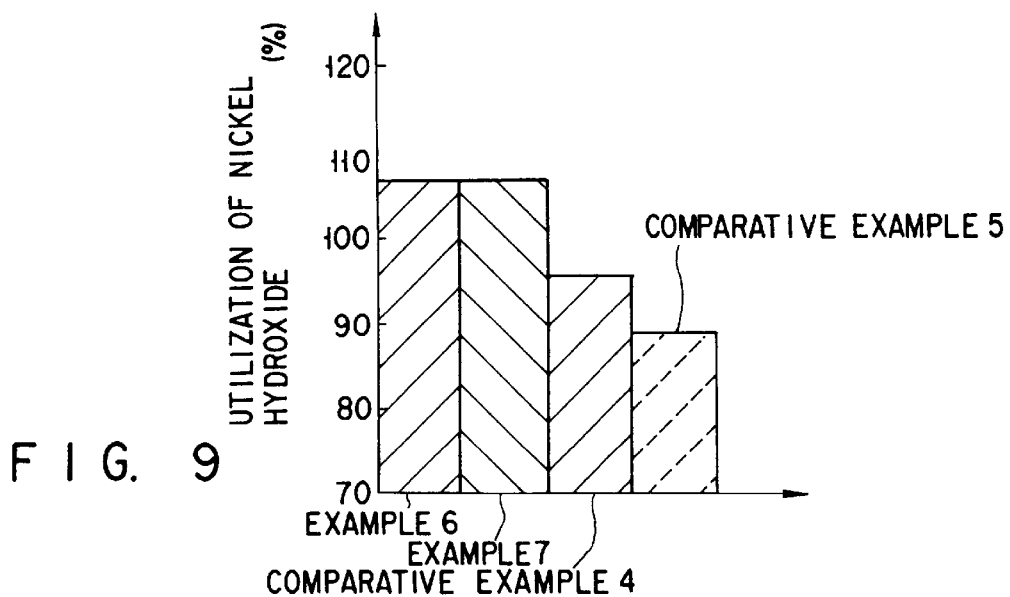
FIG. 9 is a graph showing the utilization of nickel hydroxide in the secondary batteries of Examples 6 and 7 and of Comparative Examples 4 and 5.

Ten pieces of secondary batteries were picked up from each of Examples 6 and 7 and Comparative Examples 4 and 5. After being aged for 24 hours at a temperature of 45° C., these batteries were subjected to the initial charging by performing the charging for 16 hours in a heated atmosphere of 45° C. with an electricity of 0.1 C thereby to manufacture a nickel hydrogen secondary battery. Then, after a 30 minute cut-off, the secondary battery was allowed to discharge in an atmosphere of 25° C. with 1.0 C until the battery voltage was decreased down to 1.0V thereby to measure the initial capacity from this discharge retention time. Additionally, the utilization of the nickel hydroxide was also measured from the initial capacity thus obtained, the results being shown in FIG. 9. The utilization shown in FIG. 9 represents an average value of the measured values obtained from 10 pieces of the batteries.

Ten pieces of secondary batteries were picked up from each of Examples 6 and 7 and Comparative Examples 4 and 5. After being aged under the same conditions as mentioned above, these batteries were subjected to the initial charging and the initial capacity thereof was confirmed as mentioned above. Subsequently, these batteries was subjected to 400 cycles of charge/discharge at 25° C.; charging for 16 hours with 1 C and discharging with 1 C, 1V cut so as to measure a capacity retention ratio (%) after 400 cycles in relative to the initial capacity. The results being shown in Table 7. This capacity retention ratio shown in Table 7 represents an average value of the measured values obtained from 10 pieces of the batteries.

TABLE 7

|  | Half-width of Co(OH)$_2$ (°) | Half-width of Ni(OH)$_2$ (°) | Capacity retention ratio during the cycle (%) |
| --- | --- | --- | --- |
| Example 6 | 0.25 | 0.95 | 83 |
| Example 7 | 0.35 | 0.95 | 83 |
| Comparative Example 4 | 0.45 | 0.95 | 80 |
| Comparative Example 5 | 0.55 | 0.95 | 80 |

As apparent from FIG. 9 and Table 7, the secondary batteries of Examples 6 and 7 were superior as compared with the secondary batteries of Comparative Examples 4 and 5 regarding the utilization of nickel hydroxide and charge/discharge cycle life. It is suggested by these results that in order to improve the utilization of nickel hydroxide, the positive electrode is required to contain a β type cobalt hydroxide exhibiting a value of less than 0.40° in the half-width of a peak in the (001) plane thereof as measured by X-ray powder diffraction (2θ).

EXAMPLE 8

A nickel hydrogen secondary battery similar to that of Example 6 was prepared by following the same procedures as explained in Example 6 except that nickel hydroxide particles exhibiting a value of 1.10° in the half-width of a peak in the (101) plane thereof as measured by X-ray powder diffraction (2θ) was substituted for the nickel hydroxide particles of the positive electrode employed in Example 6.

EXAMPLE 9

A nickel hydrogen secondary battery similar to that of Example 6 was prepared by following the same procedures as explained in Example 6 except that nickel hydroxide particles exhibiting a value of 0.65° in the half-width of a peak in the (101) plane thereof as measured by X-ray powder diffraction (2θ) was substituted for the nickel hydroxide particles of the positive electrode employed in Example 6.

Ten pieces of secondary batteries were picked up from each of Examples 8 and 9. After being aged under the same conditions as mentioned above, these batteries were subjected to the initial charging and the initial capacity there of confirmed as mentioned above. Subsequently, the initial utilization was calculated from the initial capacity thus obtained, the results being shown in FIG. 10. This utilization shown in FIG. 10 represents an average value of the measured values obtained from 10 pieces of the batteries. FIG. 10 also shows the results obtained from Example 6.

Ten pieces of secondary batteries were picked up from each of Examples 8 and 9. After being aged under the same conditions as mentioned above, these batteries were subjected to the initial charging and the initial capacity thereof was confirmed as mentioned above. Subsequently, the capacity retention ratio (%) after 400 cycles was calculated under the same conditions as mentioned above, the results being shown in Table 8. The capacity retention ratio shown in Table 8 represents an average value of the measured values obtained from 10 pieces of the batteries of each example. Table 8 also shows the results obtained from Example 6.

TABLE 8

|  | Half-width of Co(OH)$_2$ (°) | Half-width of Ni(OH)$_2$ (°) | Capacity retention ratio during the cycle (%) |
| --- | --- | --- | --- |
| Example 6 | 0.25 | 0.95 | 83 |
| Example 8 | 0.25 | 1.10 | 83 |
| Example 9 | 0.25 | 0.65 | 81 |

As seen from the Table 8 and FIG. 10, the secondary batteries according to Examples 6 and 8 were higher in the utilization of nickel hydroxide and the capacity retention ratio during the charge/discharge cycle as compared with the battery according to Example 9.

EXAMPLE 10

A nickel hydrogen secondary battery similar to that of Example 6 was prepared by following the same procedures as explained in Example 6 except that an alkaline electrolyte made of mixture of 6.0M KOH aqueous solution, 0.5M LiOH aqueous solution and 2.0M NaOH aqueous solution was substituted for the alkaline electrolyte employed in Example 6.

EXAMPLE 11

A nickel hydrogen secondary battery similar to that of Example 6 was prepared by following the same procedures as explained in Example 6 except that an alkaline electrolyte made of mixture of 4.5M KOH aqueous solution, 1.0M LiOH aqueous solution and 3.0M NaOH aqueous solution was substituted for the alkaline electrolyte employed in Example 6.

EXAMPLE 12

A nickel hydrogen secondary battery similar to that of Example 6 was prepared by following the same procedures as explained in Example 6 except that an alkaline electrolyte made of mixture of 3.0M KOH aqueous solution, 0.5M LiOH aqueous solution and 5.0M NaOH aqueous solution was substituted for the alkaline electrolyte employed in Example 6.

EXAMPLE 13

A nickel hydrogen secondary battery similar to that of Example 6 was prepared by following the same procedures as explained in Example 6 except that an alkaline electrolyte made of mixture of 2.5M KOH aqueous solution, 1.0M LiOH aqueous solution and 5.0M NaOH aqueous solution was substituted for the alkaline electrolyte employed in Example 6.

Ten pieces of secondary batteries were picked up from each of Examples 10 to 13. After being aged under the same conditions as mentioned above, these batteries were subjected to the initial charging and the initial capacity thereof was confirmed as mentioned above. Subsequently, the initial utilization was calculated from the initial capacity thus obtained, the results being shown in Table 9. This utilization shown in Table 9 represents an average value of the measured values obtained from 10 pieces of the batteries. Table 9 also shows the results obtained from Example 6.

Thereafter, the secondary batteries of Examples 10 to 13 were stored at 65° C. for one month in a discharging state. These batteries was subjected to three times of charge/discharge cycle and allowed to measure the discharge capacity, each charge/discharge cycle consisting a charging in an atmosphere of 25° C. with a current of 0.1 CmA and a discharging with a current of 1.0 CmA until the terminal voltage becomes 1.0V. The recovery ratio of the battery {(recovery capacity/the initial capacity)×100} was calculated from the recovery capacity obtained from the charge/discharge cycle, the results being shown in the following Table 9. The results being shown in the following Table 9. This recovery ratio shown in Table 9 represents an average value of the measured values obtained from 10 pieces of the batteries of each example. Table 9 also shows the results obtained from Example 6.

Ten pieces of secondary batteries were picked up from each of Examples 10 to 13. After being aged under the same conditions as mentioned above, these batteries were subjected to the initial charging and the initial capacity thereof was confirmed as mentioned above. Subsequently, the capacity retention ratio (%) after 400 cycles was calculated under the same conditions as mentioned above, the results being shown in Table 9. The capacity retention ratio shown in Table 9 represents an average value of the measured values obtained from 10 pieces of the batteries of each example. Table 9 also shows the results obtained from Example 6.

Ten pieces of secondary batteries were picked up from each of Examples 6, 10 to 13. After being aged under the same conditions as mentioned above, these batteries were subjected to the initial charging as mentioned above. Subsequently, each secondary battery was confirmed of standard capacity in the normal temperature (25° C.) charging wherein the secondary battery was subjected to a charge/discharge cycle: $-\Delta V$ control (a cut-off voltage of 10 mV) charging with 1 C at 25° C., and discharging with 1 C, 1V cut at 25° C. Thereafter, each secondary battery was confirmed of the capacity in the 60° C. charging wherein the secondary battery was subjected to a charge/discharge cycle: $-\Delta V$ control (a cut-off voltage of 10 mV) charging with 1 C at 60° C., and discharging with 1 C, 1V cut at 25° C. Then, the ratio of capacity at 60° C. to the standard capacity at the normal temperature (25° C.) was calculated to measure the charging efficiency (%). The results of this measurement are shown in Table 9. The charging efficiency shown in Table 9 represents an average value of the measured values obtained from 10 pieces of the batteries of each example.

Ten pieces of secondary batteries were picked up from each of Examples 6, 10 to 13. After being aged under the same conditions as mentioned above, these batteries were subjected to the initial charging as mentioned above. Then, each of the secondary batteries was confirmed of standard capacity in the normal temperature (25° C.) charging wherein the secondary battery was subjected to a charge/discharge cycle: $-\Delta V$ control (a cut-off voltage of 10 mV) charging with 1 C at 25° C., and discharging with 1 C, 1V cut at 25° C. Thereafter, each secondary battery was further confirmed of the retention capacity after a storage under high temperature conditions. That is, 1 C, $-\Delta V$ control (a cut-off voltage of 10 mV) charging at 25° C., a two-week storage at 45° C., followed by 1 C, 1V cut discharge at 25° C. to measure the discharge capacity. Then, the ratio of self-discharge (%) was calculated by dividing the value of difference between the standard capacity at the normal temperature (25° C.) and the retention capacity by the value of aforementioned standard capacity. The results of this measurement are shown in the following Table 9.

TABLE 9

| | Composition of alkaline electrolyte | | | | | Capacity retention ratio | High temperature charging efficiency | High temperature self-discharge |
| --- | --- | --- | --- | --- | --- | --- | --- | --- |
| | KOH (M) | LiOH (M) | NaOH (M) | Utilization (%) | Capacity recovery ratio (%) | during the cycle (%) | (%) | ratio (%) |
| Example 6 | 8.5 | — | — | 107 | 87.7 | 83 | 21 | 31 |
| Example 10 | 6.0 | 2.0 | 0.5 | 107 | 90.6 | 93 | 47 | 26 |
| Example 11 | 4.5 | 3.0 | 1.0 | 107 | 92.5 | 92 | 73 | 24 |

TABLE 9-continued

| | Composition of alkaline electrolyte | | | Utilization (%) | Capacity recovery ratio (%) | Capacity retention ratio during the cycle (%) | High temperature charging efficiency (%) | High temperature self-discharge ratio (%) |
|---|---|---|---|---|---|---|---|---|
| | KOH (M) | LiOH (M) | NaOH (M) | | | | | |
| Example 12 | 3.0 | 5.0 | 0.5 | 107 | 92.1 | 88 | 74 | 23 |
| Example 13 | 2.5 | 5.0 | 1.0 | 107 | 93.6 | 90 | 86 | 20 |

As seen from the Table 9, the secondary batteries according to Examples 6, 10 to 13 were high in the utilization of nickel hydroxide, the capacity recovery ratio and the capacity retention ratio during the charge/discharge cycle. Furthermore, the secondary batteries according to Examples 10 to 13 which comprises an alkaline electrolyte of the aforementioned specific composition (a composition containing 2.0 to 6.0M potassium hydroxide, 2.0 to 5.0M sodium hydroxide and 0.5 to 1.5M lithium hydroxide) were found superior in charging efficiency of the positive electrode at high temperatures as compared with the secondary battery of Example 6. In particular, among the batteries of Examples 10 to 13, the batteries of Examples 12 and 13 which included an alkaline electrolyte containing sodium hydroxide as a main component were found lower in self-discharge ratio when they were stored at a high temperature and hence superior in storage property as compared with the batteries of Examples 10 and 11.

EXAMPLE 14

A nickel hydrogen secondary battery similar to that of Example 6 was prepared by following the same procedures as explained in Example 6 except that a positive electrode as explained below was substituted for the positive electrode employed in Example 6.

Namely, nickel powder 0.5 $\mu$m in average diameter was fed from a hopper onto a belt conveyer made of a high rigid material, and allowed to pass through a doctor blade disposed downstream in the transferring direction of the belt conveyer thereby to form a nickel powder layer of a predetermined thickness on the surface of the belt conveyer. Then, the metallic powder layer on the belt conveyer was compressed by a pair of rolls, i.e. an embossed roll having a large number of protrusions and disposed over the belt conveyer and a counter roll disposed beneath the belt conveyer, whereby forming a green compact sheet having a large number of pores corresponding to the protrusions of the embossed roll. Subsequently, the green compact sheet was transferred together with the belt conveyer to a sintering furnace, in which the green compact sheet was sintered in an argon gas atmosphere and at a temperature of 1,000° C. to form a sintered nickel sheet, i.e. a two-dimensional substrate. This two-dimensional substrate was found to be 30 $\mu$m in thickness, 2 mm×2 mm in rectangular pore dimension, and 60% in opening ratio.

Then, a sponge-like three-dimensional substrate which was made of nickel was superimposed on the opposed surfaces of this two-dimensional substrate to prepare a conductive substrate. The three-dimensional substrate employed in this case was 0.8 mm in thickness, 98% in porosity and 100 g/m² in weight per unit area.

Ten pieces of secondary batteries were picked up from Example 14. After being aged under the same conditions as mentioned above, these batteries were subjected to the initial charging and the initial capacity thereof was confirmed as mentioned above. Subsequently, the initial utilization was calculated from the initial capacity thus obtained, the results being shown in Table 10. This utilization shown in Table 10 represents an average value of the measured values obtained from 10 pieces of the batteries. Table 10 also shows the results obtained from Example 6.

Ten pieces of secondary batteries were picked up from Example 14. After being aged under the same conditions as mentioned above, these batteries were subjected to the initial charging and the initial capacity thereof was confirmed as mentioned above. Subsequently, the capacity retention ratio (%) after 400 cycles was calculated under the same conditions as mentioned above, the results being shown in Table 10. The capacity retention ratio shown in Table 10 represents an average value of the measured values obtained from 10 pieces of the batteries of each example. Table 10 also shows the results obtained from Example 6.

TABLE 10

| | Utilization (%) | Capacity retention ratio during the cycle (%) |
|---|---|---|
| Example 6 | 107 | 83 |
| Example 14 | 110 | 85 |

As seen from the Table 10, the secondary battery according to Example 14 was superior in the utilization of nickel hydroxide and in charge/discharge cycle life as compared with the secondary battery of Example 6. This can be attributed to the fact that a laminated structure comprising a two-dimensional substrate and two three-dimensional substrates each being superimposed on the opposed surfaces of the two-dimensional substrate was employed as a conductive substrate of the positive electrode, the two-dimensional substrate having a thickness of 60 $\mu$m or less and a large number of pores and obtained by molding metal powder by means of a powder rolling method.

EXAMPLE 15

To 90% by weight of nickel hydroxide particles exhibiting a value of 0.8° in the half-width of a peak in the (101) plane thereof as measured by X-ray powder diffraction (2θ) were added 10% by weight of cobalt monoxide particles as a conductive agent, 0.2 part by weight of carboxymethyl cellulose, 1.0 parts by weight of polytetrafluoroethylene suspension (specific weight: 1.5, solid matters 60%) and 30 parts by weight of pure water, and the resultant mixture was kneaded to obtain a paste. Then, the paste thus obtained was filled in a nickel-plated metallic porous body having a weight per unit area of 300 g/m² and a thickness of 1.7 mm. After being dried, the metallic porous body was rolled to prepare a paste type positive electrode having a capacity of 2,800 mAh.

The cobalt monoxide particles employed in this example were 0.3° in the half-width of a peak in the (200) plane thereof as measured by X-ray powder diffraction (2θ) and 2.0 μm in average particle diameter. By the way, the X-ray powder diffraction was performed using Cu-Kα ray as an X-ray source and under the conditions of 40 kV in tube voltage, 30 mA in tube current, and 2.00°/min. in scanning speed. On the other hand, the average particle diameter of cobalt hydroxide particles was measured by measuring at first the particle size distribution by means of known laser method and then obtaining a value at an accumulation of 50%.

0.35 g of the above cobalt monoxide was added to 50 ml of a 6M aqueous solution of potassium hydroxide at 25° C., and, after being left to stand for 30 minutes, the concentration of cobalt (II) ions in the solution was measured by the aforementioned method, finding the concentration of cobalt (II) ions as being 8 mg/l. Further, when the content of dicobalt trioxide was measured by means of potassium permanganate back titration as prescribed in JIS M 8233.4, the content of dicobalt trioxide was found 6% by weight.

A separator which was similar to that employed in Example 6 was disposed between the positive electrode prepared as mentioned above and the negative electrode which was similar to that employed in Example 6, and the resultant composite was spirally wound to prepare an electrode group. This electrode group was housed in a cylindrical bottomed case and then an alkaline electrolyte consisting of a 8.5M KOH aqueous solution was also introduced into the case, the resultant case being subsequently sealed, thus assembling a nickel hydrogen secondary battery having a nominal capacity of 2,800 mAh.

EXAMPLE 16

A nickel hydrogen secondary battery similar to that of Example 15 was prepared by following the same procedures as explained in Example 15 except that cobalt monoxide particles exhibiting a value of 0.4° in the half-width of a peak in the (200) plane thereof as measured by X-ray powder diffraction (2θ) was substituted for the cobalt monoxide particles of the positive electrode employed in Example 15.

EXAMPLE 17

A nickel hydrogen secondary battery similar to that of Example 15 was prepared by following the same procedures as explained in Example 15 except that cobalt monoxide particles exhibiting a value of 0.5° in the half-width of a peak in the (200) plane thereof as measured by X-ray powder diffraction (2θ) was substituted for the cobalt monoxide particles of the positive electrode employed in Example 15.

Comparative Example 6

A nickel hydrogen secondary battery similar to that of Example 15 was prepared by following the same procedures as explained in Example 15 except that cobalt monoxide particles exhibiting a value of 0.57° in the half-width of a peak in the (200) plane thereof as measured by X-ray powder diffraction (2θ) was substituted for the cobalt monoxide particles of the positive electrode employed in Example 15.

The nickel hydrogen secondary batteries prepared in Examples 15 to 17 and in Comparative Example 6 were subjected to an aging at a temperature of 25° C. for 24 hours, and then to the initial charging by charging these batteries to a depth of 200% with 0.2C at a temperature of 25° C. Subsequently, a discharging of these batteries was performed with 0.2C and 1.0V cut-off. Thereafter, these batteries were subjected to nine cycles of charge/discharge wherein each battery was charged to a depth of 200% with 0.2C at 25° C. and then discharged with 0.2C and 1.0V cut-off. At this ninth cycle exhibiting a sufficiently stabilized discharge capacity, the discharge capacity (initial capacity) was measured and the utilization of nickel hydroxide was measured, the results being shown in FIG. 11.

After the confirmation of the initial utilization as explained above, the secondary batteries of Examples 15 to 17 and Comparative Example 6 was subjected to 400 cycles of charge/discharge at 25° C.: charging with 1 C, −ΔV and discharging with 1 C, 1V cut so as to measure a capacity retention ratio (%) after 400 cycles in relative to the initial capacity. The results being shown in Table 11.

TABLE 11

|  | Half-width of CoO (°) | Half-width of Ni(OH)$_2$ (°) | Capacity retention ratio during the cycle (%) |
|---|---|---|---|
| Example 15 | 0.30 | 0.80 | 83 |
| Example 16 | 0.40 | 0.80 | 80 |
| Example 17 | 0.50 | 0.80 | 78 |
| Comparative Example 6 | 0.57 | 0.80 | 61 |

As apparent from FIG. 11 and Table 11, the secondary batteries of Examples 15 to 17, which comprises a positive electrode containing cobalt monoxide exhibiting a value of 0.50° or less in the half-width of a peak in the (200) plane thereof as measured by X-ray powder diffraction (2θ), were superior in utilization of nickel hydroxide and in capacity retention ratio during the charge/discharge cycle. By contrast, the secondary battery of Comparative Example 6, which comprises a positive electrode containing cobalt monoxide exhibiting a value of more than 0.50° in the half-width was inferior in utilization and in capacity retention ratio as compared the secondary batteries of Examples 15 to 17.

EXAMPLE 18

A nickel hydrogen secondary battery similar to that of Example 17 was prepared by following the same procedures as explained in Example 17 except that nickel hydroxide particles having a half-width of 1.0° of the peak in the (101) plane was substituted for the nickel hydroxide particles of the positive electrode employed in Example 17.

EXAMPLE 19

A nickel hydrogen secondary battery similar to that of Example 17 was prepared by following the same procedures as explained in Example 17 except that nickel hydroxide particles having a half-width of 0.5° of the peak in the (101) plane was substituted for the nickel hydroxide particles of the positive electrode employed in Example 17.

The nickel hydrogen secondary batteries prepared in Examples 18 and 19 were subjected to an aging, the initial discharging and discharging under the same conditions as mentioned above. Then, the charge/discharge cycle was repeated nine times, thus sufficiently stabilizing the discharge capacity, and then the discharge capacity (the initial capacity) at the ninth cycle as well as the utilization of the nickel hydroxide were measured, the results being shown in FIG. 12. FIG. 12 also shows the results of Example 17.

Thereafter, the capacity retention ratio at 400th cycle in relative to the initial capacity was measured in the same manner as explained above, the results being shown in Table 12 below. Table 12 also shows the results of Example 17.

TABLE 12

|  | Half-width of CoO (°) | Half-width of Ni(OH)$_2$ (°) | Capacity retention ratio during the cycle (%) |
|---|---|---|---|
| Example 17 | 0.50 | 0.80 | 78 |
| Example 18 | 0.50 | 1.00 | 82 |
| Example 19 | 0.50 | 0.50 | 52 |

As apparent from FIG. 12 and Table 12, the secondary batteries of Examples 17 and 18 were superior in utilization of nickel hydroxide and, in capacity retention ratio during the charge/discharge cycle as compared with the secondary battery of Example 19.

Therefore, it will be understood from FIGS. 11 and 12 and Tables 11 and 12 that, in order to further improve the utilization ratio of nickel hydroxide and the capacity retention ratio, it is required to employ a positive electrode containing nickel hydroxide having a half-width of 0.8° or more a peak in the (101) plane as measured by X-ray powder diffraction (2θ) using Cu-Kα ray as an X-ray source and cobalt monoxide having a half-width of 0.50° or less of a peak in the (200) plane as measured by X-ray powder diffraction (2θ).

EXAMPLE 20

A nickel hydrogen secondary battery similar to that of Example 15 was prepared by following the same e procedures as explained in Example 15 except that a positive electrode containing cobalt monoxide particles to be explained below was substituted for the positive electrode employed in Example 15.

Namely, cobalt monoxide particles exhibiting 0.3° in the half-width of a peak in the (200) plane thereof as measured by X-ray powder diffraction (2θ) using Cu-Kα ray as an X-ray source and having an average particle diameter of 2.0 µm were prepared. Then, 0.35 g of the cobalt monoxide particles was added to 50 ml of a 6M aqueous solution of potassium hydroxide at 25° C., and, after being left to stand for 30 minutes, the concentration of cobalt (II) ions in the solution was measured by the aforementioned method, finding the concentration of cobalt (II) ions as being 3 mg/l.

EXAMPLE 21

A nickel hydrogen secondary battery similar to that of Example 15 was prepared by following the same procedures as explained in Example 15 except that a positive electrode containing cobalt monoxide particles to be explained below was substituted for the positive electrode employed in Example 15.

Namely, cobalt monoxide particles exhibiting 0.3° in the half-width of a peak in the (200) plane thereof as measured by X-ray powder diffraction (2θ) using Cu-Kα ray as an X-ray source and having an average particle diameter of 2.0 µm were prepared. Then, the solubility of the cobalt monoxide in the aqueous solution of potassium hydroxide (the concentration of cobalt (II) ions) was measured in the same manner as explained above, finding the concentration of cobalt (II) ions as being 4 mg/l.

EXAMPLE 22

A nickel hydrogen secondary battery similar to that of Example 15 was prepared by following the same procedures as explained in Example 15 except that a positive electrode containing cobalt monoxide particles to be explained below was substituted for the positive electrode employed in Example 15.

Namely, cobalt monoxide particles exhibiting 0.3° in the half-width of a peak in the (200) plane thereof as measured by X-ray powder diffraction (2θ) using Cu-Kα ray as an X-ray source and having an average particle diameter of 2.0 µm were prepared. Then, the solubility of the cobalt monoxide in the aqueous solution of potassium hydroxide (the concentration of cobalt (II) ions) was measured in the same manner as explained above, finding the concentration of cobalt (II) ions as being 7 mg/l.

EXAMPLE 23

A nickel hydrogen secondary battery similar to that of Example 15 was prepared by following the same procedures as explained in Example 15 except that a positive electrode containing cobalt monoxide particles to be explained below was substituted for the positive electrode employed in Example 15.

Namely, cobalt monoxide particles exhibiting 0.3° in the half-width of a peak in the (200) plane thereof as measured by X-ray powder diffraction (2θ) using Cu-Kα ray as an X-ray source and having an average particle diameter of 2.0 µm were prepared. Then, the solubility of the cobalt monoxide in the aqueous solution of potassium hydroxide (the concentration of cobalt (II) ions) was measured in the same manner as explained above, finding the concentration of cobalt (II) ions as being 12 mg/l.

The nickel hydrogen secondary batteries prepared in Examples 20 to 23 were subjected to an aging, the initial discharging and discharging under the same conditions as mentioned above. Then, the charge/discharge cycle was repeated nine times, thus sufficiently stabilizing the discharge capacity, and then the discharge capacity (the initial capacity) at the ninth cycle as well as the utilization of the nickel hydroxide were measured, the results being shown in FIG. 13.

Thereafter, the capacity retention ratio at 400th cycle in relative to the initial capacity was measured in the same manner as explained above, the results being shown in Table 13 below.

TABLE 13

|  | Features of CoO | | Capacity |
|---|---|---|---|
|  | Half-width (°) | Co (II) ion concentration (mg/l) | retention ratio during the cycle (%) |
| Example 20 | 0.30 | 3 | 73 |
| Example 21 | 0.30 | 4 | 80 |
| Example 22 | 0.30 | 7 | 84 |
| Example 23 | 0.30 | 12 | 89 |

Figure 13:
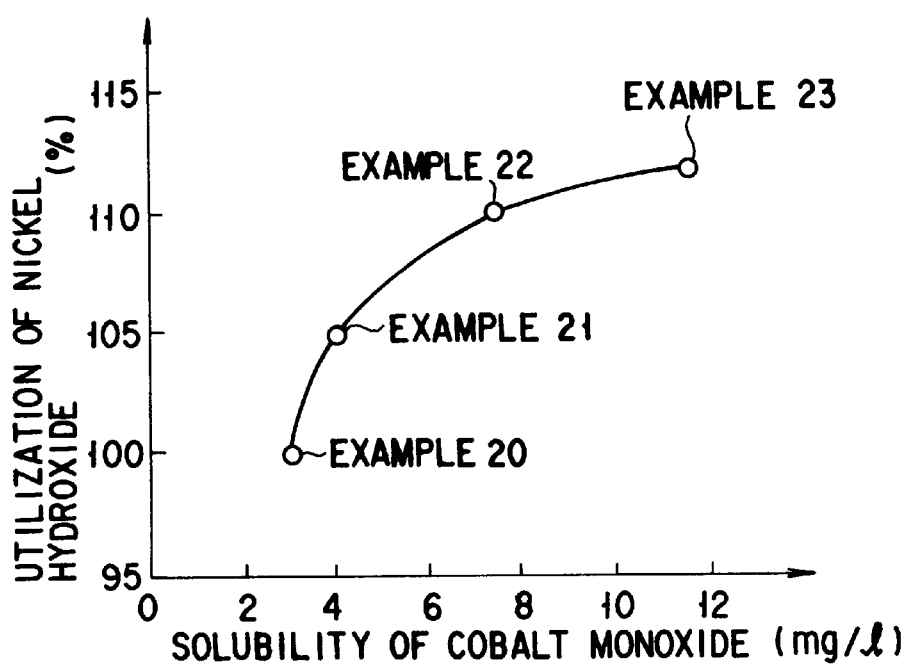
FIG. 13 is a graph showing the relationship between the solubility of the cobalt monoxide and the utilization of nickel hydroxide in Examples 20 to 23.

As apparent from FIG. 13 and Table 13, the secondary batteries of Examples 21 to 23, which comprises a paste type positive electrode containing cobalt monoxide particles having a cobalt (II) ion concentration of 4 mg/l or more as measured when 0.35 g of the cobalt monoxide particles was added to a 6M aqueous solution of potassium hydroxide at 25° C. and left to stand for 30 minutes, were superior in utilization of nickel hydroxide and in capacity retention ratio during the charge/discharge cycle. By contrast, the secondary battery of Example 20, which comprises a positive electrode containing cobalt monoxide having a cobalt (II) ion concentration of less than 4 mg/l, was inferior in utilization and in capacity retention ratio as compared the secondary batteries of Examples 21 to 23.

EXAMPLE 24

A nickel hydrogen secondary battery similar to that of Example 15 was prepared by following the same procedures as explained in Example 15 except that a positive electrode containing cobalt monoxide particles to be explained below was substituted for the positive electrode employed in Example 15.

Namely, cobalt monoxide particles exhibiting 0.3° in the half-width of a peak in the (200) plane thereof as measured by X-ray powder diffraction (2θ) using Cu-Kα ray as an X-ray source and having an average particle diameter of 2.0 μm were prepared. When the content of dicobalt trioxide in the cobalt monoxide particles was measured by means of potassium permanganate back titration as prescribed in JIS M 8233.4, the content of dicobalt trioxide was found 2.5% by weight.

EXAMPLE 25

A nickel hydrogen secondary battery similar to that of Example 15 was prepared by following the same procedures as explained in Example 15 except that a positive electrode containing cobalt monoxide particles to be explained below was substituted for the positive electrode employed in Example 15.

Namely, cobalt monoxide particles exhibiting 0.3° in the half-width of a peak in the (200) plane thereof as measured by X-ray powder diffraction (2θ) using Cu-Kα ray as an X-ray source and having an average particle diameter of 2.0 μm were prepared. When the content of dicobalt trioxide in the cobalt monoxide particles was measured by means of potassium permanganate back titration in the same manner as explained in Example 24, the content of dicobalt trioxide was found 5% by weight.

EXAMPLE 26

A nickel hydrogen secondary battery similar to that of Example 15 was prepared by following the same procedures as explained in Example 15 except that a positive electrode containing cobalt monoxide particles to be explained below was substituted for the positive electrode employed in Example 15.

Namely, cobalt monoxide particles exhibiting 0.3° in the half-width of a peak in the (200) plane thereof as measured by X-ray powder diffraction (2θ) using Cu-Kα ray as an X-ray source and having an average particle diameter of 2.0 μm were prepared. When the content of dicobalt trioxide in the cobalt monoxide particles was measured by means of potassium permanganate back titration in the same manner as explained in Example 24, the content of dicobalt trioxide was found 12% by weight.

EXAMPLE 27

A nickel hydrogen secondary battery similar to that of Example 15 was prepared by following the same procedures as explained in Example 15 except that a positive electrode containing cobalt monoxide particles to be explained below was substituted for the positive electrode employed in Example 15.

Namely, cobalt monoxide particles exhibiting 0.3° in the half-width of a peak in the (200) plane thereof as measured by X-ray powder diffraction (2θ) using Cu-Kα ray as an X-ray source and having an average particle diameter of 2.0 μm were prepared. When the content of dicobalt trioxide in the cobalt monoxide particles was measured by means of potassium permanganate back titration in the same manner as explained in Example 24, the content of dicobalt trioxide was found 13.5% by weight.

The nickel hydrogen secondary batteries prepared in Examples 24 to 27 were subjected to an aging, the initial discharging and discharging under the same conditions as mentioned above. Then, the charge/discharge cycle was repeated nine times, thus sufficiently stabilizing the discharge capacity, and then the discharge capacity (the initial capacity) at the ninth cycle as well as the utilization of the nickel hydroxide were measured, the results being shown in FIG. 14.

Thereafter, the capacity retention ratio at 400th cycle in relative to the initial capacity was measured in the same manner as explained above, the results being shown in Table 14 below.

TABLE 14

|  | Features of CoO | | Capacity |
| --- | --- | --- | --- |
|  | Half-width (°) | Content of $Co_2O_3$ (weight %) | retention ratio during the cycle (%) |
| Example 24 | 0.30 | 2.5 | 87 |
| Example 25 | 0.30 | 5 | 83 |
| Example 26 | 0.30 | 12 | 77 |
| Example 27 | 0.30 | 13.5 | 68 |

Figure 14:
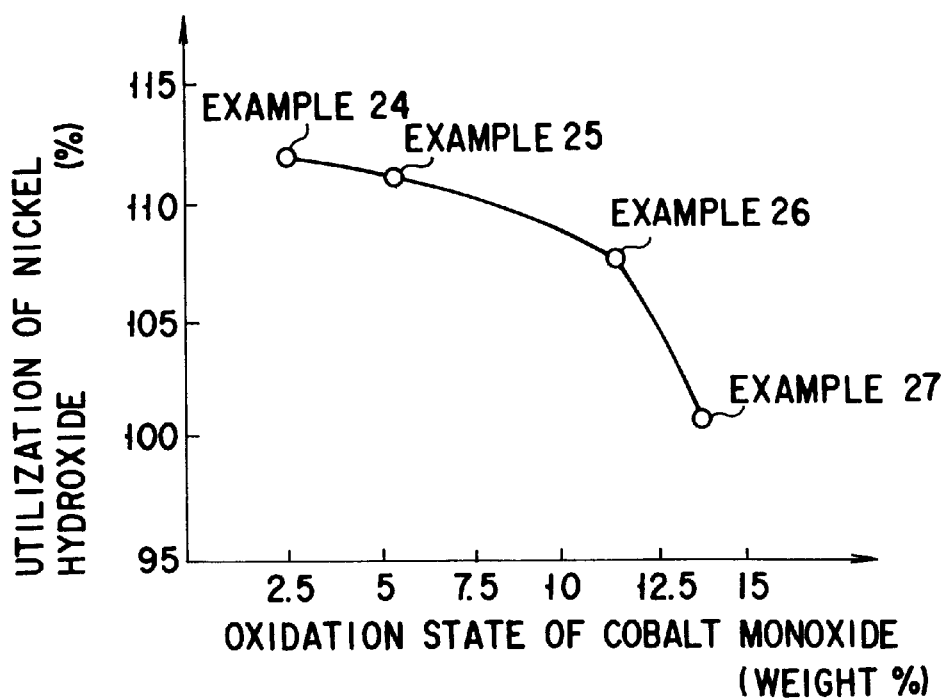
FIG. 14 is a graph showing the relationship between the content of dicobalt trioxide in the cobalt monoxide particle as measured by means of potassium permanganate back titration and the utilization of nickel hydroxide in Examples 24 to 27.

As apparent from FIG. 14 and Table 14, the secondary batteries of Examples 24 to 26, which comprises a paste type positive electrode containing cobalt monoxide particles having a specific half-width and not more than 12% by weight in content of 3 valent cobalt compounds as measured by means of potassium permanganate back titration, were superior in utilization of nickel hydroxide and in capacity retention ratio during the charge/discharge cycle as compared with the battery of Example 27 where the content of the 3 valent cobalt compounds exceeded over 12% by weight.

EXAMPLE 28

A nickel hydrogen secondary battery similar to that of Example 17 was prepared by following the same procedures as explained in Example 17 except that an alkaline electrolyte made of mixture of 6.0M KOH aqueous solution, 0.5M LiOH aqueous solution and 2.0M NaOH aqueous solution was substituted for the alkaline electrolyte employed in Example 17.

EXAMPLE 29

A nickel hydrogen secondary battery similar to that of Example 17 was prepared by following the same procedures as explained in Example 17 except that an alkaline electrolyte made of mixture of 4.5M KOH aqueous solution, 1.0M LiOH aqueous solution and 3.0M NaOH aqueous solution was substituted for the alkaline electrolyte employed in Example 17.

EXAMPLE 30

A nickel hydrogen secondary battery similar to that of Example 17 was prepared by following the same procedures as explained in Example 17 except that an alkaline electrolyte made of mixture of 3.0M KOH aqueous solution, 0.5M LiOH aqueous solution and 5.0M NaOH aqueous solution was substituted for the alkaline electrolyte employed in Example 17.

EXAMPLE 31

A nickel hydrogen secondary battery similar to that of Example 17 was prepared by following the same procedures as explained in Example 17 except that an alkaline electrolyte made of mixture of 2.5M KOH aqueous solution, 1.0M LiOH aqueous solution and 5.0M NaOH aqueous solution was substituted for the alkaline electrolyte employed in Example 17.

The nickel hydrogen secondary batteries prepared in Examples 28 to 31 were subjected to an aging, the initial discharging and discharging under the same conditions as mentioned above. Then, the charge/discharge cycle was repeated nine times, thus sufficiently stabilizing the discharge capacity, and then the discharge capacity (the initial capacity) at the ninth cycle as well as the utilization of the nickel hydroxide were measured, the results being shown in Table 15.

After the confirmation of the initial utilization as explained above, the secondary batteries of Examples 17 and 28 to 31 were stored at 65° C. for one month in a discharging state. These batteries was subjected to three times of charge/discharge cycle and allowed to measure the discharge capacity, each charge/discharge cycle consisting a charging in an atmosphere of 25° C. with a current of 1.0 CmA and a discharging with a current of 1.0 CmA until the terminal voltage becomes 1.0V. The recovery ratio of the battery {(recovery capacity/the initial capacity)×100} was calculated from the recovery capacity obtained from the charge/discharge cycle. The results being shown in the following Table 15.

The nickel hydrogen secondary batteries prepared in Examples 28 to 31 were subjected to an aging, the initial charging and discharging under the same conditions as mentioned above. Then, the charge/discharge cycle was repeated nine times, thus sufficiently stabilizing the discharge capacity, and then the discharge capacity (the initial capacity) at the ninth cycle was measured. Thereafter, the capacity retention ratio at 400th cycle in relative to the initial capacity was measured in the same manner as explained above, the results being shown in Table 15 below. Table 15 also shows the results of Example 17.

The secondary batteries prepared in Examples 17, 28 to 31 were subjected to the aging, initial charging and discharging under the same conditions as mentioned above. Subsequently, each secondary battery was confirmed of standard capacity in the normal temperature (25° C.) charging wherein the secondary battery was subjected to a charge/discharge cycle: $-\Delta V$ control (a cut-off voltage of 10 mV) charging with 1 C at 25° C., and discharging with 1 C, 1V cut at 25° C. Thereafter, each secondary battery was confirmed of the capacity in the 60° C. charging wherein the secondary battery was subjected to a charge/discharge cycle: $-\Delta V$ control (a cut-off voltage of 10 mV) charging with 1 C at 60° C., and discharging with 1 C, 1V cut at 25° C. Then, the ratio of capacity at 60° C. to the standard capacity at the normal temperature (25° C.) was calculated to measure the charging efficiency (%). The results of this measurement are shown in Table 15.

The secondary batteries prepared in Examples 17, 28 to 31 were subjected to the aging, initial charging and discharging under the same conditions as mentioned above. Thereafter, each of the secondary batteries was confirmed of standard capacity in the normal temperature (25° C.) charging wherein the secondary battery was subjected to a charge/discharge cycle: $-\Delta V$ control (a cut-off voltage of 10 mV) charging with 1 C at 25° C., and discharging with 1 C, 1V cut at 25° C. Then, each secondary battery was further confirmed of the retention capacity after a storage under high temperature conditions wherein the secondary battery was subjected to 1 C, $-\Delta V$ control (a cut-off voltage of 10 mV) charging at 25° C., a two-week storage at 45° C., followed by 1 C, 1V cut discharge at 25° C. Then, the ratio of self-the large (%) was calculated by dividing the value of difference between the standard capacity at the normal temperature (25° C.) and the retention capacity by the value of aforementioned standard capacity. The results of this measurement are shown in the following Table 15.

TABLE 15

| | Composition of alkaline electrolyte | | | | Capacity recovery ratio (%) | Capacity retention ratio during the cycle (%) | High temperature charging efficiency (%) | High temperature self-discharge ratio (%) |
| --- | --- | --- | --- | --- | --- | --- | --- | --- |
| | KOH (M) | LiOH (M) | NaOH (M) | Utilization (%) | | | | |
| Example 17 | 8 | — | — | 105 | 84.3 | 78 | 23 | 32 |
| Example 28 | 6.0 | 2.0 | 0.5 | 106 | 89.1 | 91 | 45 | 26 |
| Example 29 | 4.5 | 3.0 | 1.0 | 106 | 90.9 | 90 | 71 | 24 |
| Example 30 | 3.0 | 5.0 | 0.5 | 106 | 90.5 | 86 | 72 | 23 |
| Example 31 | 2.5 | 5.0 | 1.0 | 106 | 92.3 | 88 | 83 | 20 |

As seen from the Table 15, the secondary batteries according to Table 17, 28 to 31 were high in the utilization of nickel hydroxide, the capacity recovery ratio and the capacity retention ratio during the charge/discharge cycle. Furthermore, the secondary batteries according to Examples 28 to 31 which comprises an alkaline electrolyte of the aforementioned specific composition (a composition containing 2.0 to 6.0M potassium hydroxide, 2.0 to 5.0M sodium hydroxide and 0.5 to 1.5M lithium hydroxide) were found superior in charging efficiency of the positive electrode at high temperatures as compared with the secondary battery of Example 17. In particular, among the batteries of Examples 28 to 31, the batteries of Examples 30 and 31 which comprises an alkaline electrolyte containing sodium hydroxide as a main component were found lower in self-discharge ratio when they were stored at a high temperature and hence superior in storage property as compared with the batteries of Examples 28 and 29.

EXAMPLE 32

A nickel hydrogen secondary battery similar to that of Example 17 was prepared by following the same procedures as explained in Example 17 except that a positive electrode as explained below was substituted for the positive electrode employed in Example 17.

Namely, nickel powder 0.5 μm in average diameter was fed from a hopper onto a belt conveyer made of a high rigid material, and allowed to pass through a doctor blade disposed downstream in the transferring direction of the belt conveyer thereby to form a nickel powder layer of a predetermined thickness on the surface of the belt conveyer. Then, the metallic powder layer on the belt conveyer was compressed by a pair of rolls, i.e. An embossed roll having a large number of protrusions and disposed over the belt conveyer and a counter roll disposed beneath the belt conveyer, whereby forming a green compact sheet having a large number of pores corresponding to the protrusions of the embossed roll. Subsequently, the green compact sheet was transferred together with the belt conveyer to a sintering furnace, in which the green compact sheet was sintered in an argon gas atmosphere and at a temperature of 1,000° C. to form a sintered nickel sheet, i.e. a two-dimensional substrate. This two-dimensional substrate was found to be 30 μm in thickness, 2 mm×2 mm in rectangular pore dimension, and 60% in opening ratio.

Then, a sponge-like three-dimensional substrate which was made of nickel was superimposed on the opposed surfaces of this two-dimensional substrate to prepare a conductive substrate. The three-dimensional substrate employed in this case was 0.8 mm in thickness, 98% in porosity and 100 g/m$^2$ in weight per unit area.

The nickel hydrogen secondary battery prepared in Example 32 was subjected to an aging, the initial discharging and discharging under the same conditions as mentioned above. Then, the charge/discharge cycle was repeated nine times, thus sufficiently stabilizing the discharge capacity, and then the discharge capacity (the initial capacity) at the ninth cycle as well as the utilization of the nickel hydroxide were measured, the results being shown in FIG. 16.

Thereafter, the capacity retention ratio at 400th cycle in relative to the initial capacity was measured in the same manner as explained above, the results being shown in Table 16 below. Table 16 also shows the results of the Example 17.

TABLE 16

|  | Utilization (%) | Capacity retention ratio during the cycle (%) |
|---|---|---|
| Example 17 | 105 | 78 |
| Example 32 | 110 | 84 |

As seen from the Table 16, the secondary battery according to Example 32 was superior in the utilization of nickel hydroxide and in charge/discharge cycle life as compared with the secondary battery of Example 17. This can be attributed to the fact that a laminated structure comprising a two-dimensional substrate and two three-dimensional substrates each being superimposed on the opposed surfaces of the two-dimensional substrate was employed as a conductive substrate of the positive electrode, the two-dimensional substrate having a thickness of 60 μm or less and a large number of pores and obtained by molding metal powder by means of a powder rolling method.

EXAMPLE 33

Preparation of positive electrode

First of all, to a mixed powder consisting of 90 parts by weight of nickel hydroxide powder exhibiting a value of 0.8° in the half-width of a peak in the (101) plane thereof as measured by X-ray powder diffraction (2θ) and 10 parts by weight of cobalt monoxide as a conductivity assistant were added 0.2 part by weight of carboxymethyl cellulose, 1.0 part by weight of polytetrafluoroethylene (specific weight: 1.5, solid matters 60%) to obtain a mixture, to which 30 parts by weight of water was further added and the resultant mixture was kneaded to prepare a paste. Then, this paste was filled in a nickel-plated fibrous substrate (a conductive substrate) having a porosity of 95% and a thickness of 1.7 mm. Then, after being dried, the fibrous substrate was press-molded by making use of a roller press to manufacture a positive electrode wherein the mixture containing nickel hydroxide particles and cobalt monoxide particles was held by the conductive substrate. By the way, the X-ray powder diffraction was performed using Cu-Kα ray as an X-ray source and under the conditions of 40kV in tube voltage, 30 mA in tube current, and 2.00° /min. in scanning speed.

Preparation of negative electrode

To 95 parts by weight of hydrogen-absorbing alloy powder having the composition of $LaNi_{4.0}Co_{0.4}Mn_{0.3}Al_{0.3}$ were added 3 parts by weight of polytetrafluoroethylene, 1 part by weight of carbon black powder, 1 part by weight of carboxymethyl cellulose and 50 parts by weight of water to obtain a mixture, which was then mixed to prepare a paste. This paste was then filled into a nickel net and, after being dried, press-molded to manufacture a negative electrode comprising a hydrogen-absorbing alloy.

Then, a separator formed of polypropylene nonwoven fabric was disposed between the negative electrode and the positive electrode, and the resultant composite was spirally wound to prepare an electrode group. This electrode group was housed in a cylindrical bottomed case together with an alkaline electrolyte consisting of 8.5M KOH aqueous solution, thereby assembling a cylindrical nickel hydrogen secondary battery having a structure shown in FIG. 1 and a size of 4/3 A (logical capacity: 2,800 mAh).

Initial charging

The battery thus obtained was charged to a depth of 150% with 0.1 C over 15 hours in an atmosphere of 20° C., and then discharged with 0.2C until the voltage was lowered down to 1.0V. Subsequently, the same charge/discharge cycle as mentioned above was repeated 5 times at room temperature.

EXAMPLE 34

A cylindrical nickel hydrogen secondary battery was prepared by following the same procedures as explained in Example 33 except that the initial charging was performed in this case as follows. Namely, the battery was charged to a depth of 150% with 0.1 C over 15 hours in an atmosphere of 40° C., and then discharged with 0.2C until the voltage was lowered down to 1.0V. Subsequently, the same charge/discharge cycle as mentioned above was repeated 5 times at room temperature.

EXAMPLE 35

A cylindrical nickel hydrogen secondary battery was prepared by following the same procedures as explained in Example 33 except that the initial charging was performed in this case as follows. Namely, the battery was charged to a depth of 150% with 0.1 C over 15 hours in an atmosphere of 80° C., and then discharged with 0.2C until the voltage was lowered down to 1.0V. Subsequently, the same charge/discharge cycle as mentioned above was repeated 5 times at room temperature.

EXAMPLE 36

A cylindrical nickel hydrogen secondary battery was prepared by following the same procedures as explained in Example 33 except that an alkaline electrolyte made of mixture of 8.0M KOH aqueous solution and 0.5M LiOH aqueous solution was substituted for the alkaline electrolyte employed in Example 31.

EXAMPLE 37

A cylindrical nickel hydrogen secondary battery was prepared by following the same procedures as explained in Example 33 except that an alkaline electrolyte made of mixture of 8.0M KOH aqueous solution and 0.5M LiOH aqueous solution was substituted for the alkaline electrolyte employed in Example 33. Then, this battery was subjected to the following initial charging. Namely, the battery was charged to a depth of 150% with 0.1 C over 15 hours in an atmosphere of 40° C., and then discharged with 0.2C until the voltage was lowered down to 1.0V. Subsequently, the same charge/discharge cycle as mentioned above was repeated 5 times at room temperature thereby to manufacture the cylindrical nickel hydrogen secondary battery.

EXAMPLE 38

A cylindrical nickel hydrogen secondary battery was prepared by following the same procedures as explained in Example 33 except that an alkaline electrolyte made of mixture of 8.0M KOH aqueous solution and 0.5M LiOH aqueous solution was substituted for the alkaline electrolyte employed in Example 33. Then, this battery was subjected to the following initial charging. Namely, the battery was charged to a depth of 150% with 0.1 C over 15 hours in an atmosphere of 80° C., and then discharged with 0.2C until the voltage was lowered down to 1.0V. Subsequently, the same charge/discharge cycle as mentioned above was repeated 5 times at room temperature thereby to manufacture the cylindrical nickel hydrogen secondary battery.

EXAMPLE 39

A cylindrical nickel hydrogen secondary battery was prepared by following the same procedures as explained in Example 33 except that the initial charging was performed in this case as follows. Namely, the battery was charged to a depth of 150% with 0.5C over 3 hours in an atmosphere of 40° C., and then discharged with 0.2C until the voltage was lowered down to 1.0V. Subsequently, the same charge/discharge cycle as mentioned above was repeated 5 times at room temperature.

EXAMPLE 40

A cylindrical nickel hydrogen secondary battery was prepared by following the same procedures as explained in Example 33 except that an alkaline electrolyte made of mixture of 8.0M KOH aqueous solution and 0.5M LiOH aqueous solution was substituted for the alkaline electrolyte employed in Example 33. Then, this battery was subjected to the following initial charging. Namely, the battery was charged to a depth of 150% with 0.5C over 3 hours in an atmosphere of 40° C., and then discharged with 0.2C until the voltage was lowered down to 1.0V. Subsequently, the same charge/discharge cycle as mentioned above was repeated 5 times at room temperature thereby to manufacture the cylindrical nickel hydrogen secondary battery.

EXAMPLE 41

A cylindrical nickel hydrogen secondary battery was prepared by following the same procedures as explained in Example 33 except that the initial charging was performed in this case as follows. Namely, the battery was charged to a depth of 150% with 0.1 C over 15 hours in an atmosphere of 90° C., and then discharged with 0.2C until the voltage was lowered down to 1.0V. Subsequently, the same charge/discharge cycle as mentioned above was repeated 5 times at room temperature.

EXAMPLE 42

First of all, the same kind of nickel hydroxide particles as employed in Example 33 were immersed in an aqueous solution of cobalt sulfate having a specific gravity of 1.3, which was then stirred to sufficiently impregnate the fine pores of the nickel hydroxide with cobalt ions. Then the nickel hydroxide particles was separated once from the aqueous solution of cobalt sulfate by means of filtration. The nickel hydroxide impregnated in its fine pores with the aqueous solution of cobalt sulfate was dripped into an aqueous solution of sodium hydroxide being convected in advance, thereby allowing a cobalt hydroxide film to be formed on the surfaces of the nickel hydroxide particles, thus manufacturing composite nickel hydroxide particles. The quantity of the cobalt hydroxide film was found to be 3% by weight (calculated as metallic cobalt) based on the weight of the nickel hydroxide particles covered with the cobalt hydroxide film.

To 90 parts by weight of composite nickel hydroxide particles were added 0.2 part by weight of carboxymethyl cellulose and 1.0 parts by weight of polytetrafluoroethylene to prepare a mixture, to which 30 parts by weight of water was added and kneaded to obtain a paste. This paste was then filled into a nickel-plated fibrous substrate and, after being dried, press-molded to manufacture a positive electrode wherein the paste containing nickel hydroxide particles covered on their surfaces with the cobalt hydroxide layer was held by a conductive substrate.

Then, a separator similar to that employed in Example 33 was disposed between the positive electrode and the negative electrode of the same construction as employed in Example 33, and the resultant composite was spirally wound to prepare an electrode group. This electrode group was housed in a cylindrical bottomed case together with an alkaline electrolyte consisting of 8.5M KOH aqueous solution, thereby assembling a cylindrical nickel hydrogen secondary battery having a structure shown in FIG. 1 and a size of 4/3A (logical capacity: 2,800 mAh).

Initial charging

The battery thus obtained was charged to a depth of 150% with 0.1 C over 15 hours in an atmosphere of 90° C., and then discharged with 0.2C until the voltage was lowered down to 1.0V. Subsequently, the same charge/discharge cycle as mentioned above was repeated 5 times at room temperature.

Comparative Example 7

A cylindrical nickel hydrogen secondary battery was prepared by following the same procedures as explained in Example 33 except that the initial charging was performed in this case as follows. Namely, the battery was charged to a depth of 150% with 0.5C over 3 hours in an atmosphere of 20° C., and then discharged with 0.2C until the voltage was lowered down to 1.0V. Subsequently, the same charge/discharge cycle as mentioned above was repeated 5 times at room temperature.

Comparative Example 8

A cylindrical nickel hydrogen secondary battery was prepared by following the same procedures as explained in Example 33 except that the initial charging was performed in this case as follows. Namely, the battery was charged to a depth of 150% with 1.0C over 1.5 hours in an atmosphere of 20° C., and then discharged with 0.2C until the voltage was lowered down to 1.0V. Subsequently, the same charge/discharge cycle as mentioned above was repeated 5 times at room temperature.

Comparative Example 9

A cylindrical nickel hydrogen secondary battery was prepared by following the same procedures as explained in Example 33 except that the initial charging was performed in this case as follows. Namely, the battery was charged to a depth of 150% with 2.0C over 0.75 hours in an atmosphere of 20° C., and then discharged with 0.2C until the voltage was lowered down to 1.0V. Subsequently, the same charge/discharge cycle as mentioned above was repeated 5 times at room temperature.

Three pieces of secondary batteries were picked up from each of Examples 33 to 42 and Comparative Examples 7 to 9. Then, first one of three pieces of secondary batteries was dismantled to measure the diameter of the pores in the positive electrode by making use of a mercury-penetrating method type pore distribution measuring apparatus (Autopore 9200, Shimazu Seisakusho), thereby investigating the diametric distribution of the pores, average diameter of the pores and porosity of the positive electrode, the results being shown in the following Table 17. Further, from the diametric distribution of the pores and porosity of the positive electrode thus measured, the ratio of pores having a diameter ranging from 0.0001 $\mu$m to 0.01 $\mu$m to the total volume of voids in the positive electrode was calculated, the results being shown in the following Table 17. In Table 17, the pores whose diametric distribution was within the range of 0.0001 $\mu$m to 10 $\mu$m was indicated by a mark: ○, while the ratio of pores having a diameter of 0.0001 $\mu$m to 10 $\mu$m to all the pores was less than 80% was indicated by a mark: x. Furthermore, when the ratio of pores to the total volume of voids in the positive electrode was not less than 50%, it was indicated by a mark: ○, while when the ratio of pores to the total volume of voids in the positive electrode was less than 50%, it was indicated by a mark: x.

The second one of three pieces of secondary batteries from each of Examples 33 to 42 and Comparative Examples 7 to 9 was charged at first with a current of 0.1 CmA for 16 hours and then discharged with a current of 1.0 CmA until the terminal voltage thereof fell down to 1.0V to measure a discharge retention time, from which the initial capacity was calculated and the initial utilization was calculated. The results of these measurements are shown in the following Table 18.

Thereafter, these secondary batteries was stored in a discharging state at 65° C. for one month. Then, the recovery capacity of these secondary batteries was measured by repeating the charge/discharge cycle three times and measuring the discharge capacity, each charge/discharge cycle consisting a sequence of a charging with a current of 0.1 CmA for 16 hours and a discharging with a current of 1.0 CmA until the terminal voltage becomes 1.0V. The recovery ratio of each battery {(recovery capacity/the initial capacity) ×100} was calculated from the recovery capacity, the results being shown in Table 18.

The last one of three pieces of secondary batteries from each of Examples 33 to 42 and Comparative Examples 7 to 9 was subjected to a repetition of charge/discharge cycle, each charge/discharge cycle consisting a sequence of a charging with a current of 0.1 CmA for 16 hours and a discharging with a current of 1.0 CmA until the terminal voltage becomes 1.0V. After 400 times of charge/discharge cycles, the capacity retention ratio (%) in relative to the discharge capacity at the first cycle was measured, the results being shown in Table 18.

TABLE 17

| | Composition of electrolyte | Initial charging temperature (deg. C.) | Charging rate (C) |
|---|---|---|---|
| Example 33 | 8.5M-KOH | 20 | 0.1 |
| Example 34 | 8.5M-KOH | 40 | 0.1 |
| Example 35 | 8.5M-KOH | 80 | 0.1 |
| Example 36 | 8M-KOH + 0.5M-LiOH | 20 | 0.1 |
| Example 37 | 8M-KOH + 0.5M-LiOH | 40 | 0.1 |
| Example 38 | 8M-KOH + 0.5M-LiOH | 80 | 0.1 |
| Example 39 | 8.5M-KOH | 40 | 0.5 |
| Example 40 | 8M-KOH + 0.5M-LiOH | 40 | 0.5 |
| Example 41 | 8.5M-KOH | 90 | 0.1 |
| Example 42 | 8.5M-KOH | 90 | 0.1 |
| Comparative Example 7 | 8.5M-KOH | 20 | 0.5 |
| Comparative Example 8 | 8.5M-KOH | 20 | 1.0 |
| Comparative Example 9 | 8.5M-KOH | 20 | 2.0 |

| | Diametral distribution of pores in positive electrode | | | | Porosity of positive electrode (%) |
|---|---|---|---|---|---|
| | 0.0001 to 10 $\mu$m | Average diameter ($\mu$m) | Ratio of pores of 0.01 $\mu$m or less | Ratio of pores is 50% or more | |
| Example 33 | ○ | 0.035 | 40.0 | x | 36.7 |
| Example 34 | ○ | 0.029 | 51.0 | ○ | 37.0 |
| Example 35 | ○ | 0.027 | 52.3 | ○ | 44.0 |
| Example 36 | ○ | 0.033 | 42.5 | x | 35.9 |
| Example 37 | ○ | 0.028 | 52.0 | ○ | 40.0 |
| Example 38 | ○ | 0.027 | 55.0 | ○ | 43.2 |
| Example 39 | ○ | 0.035 | 52.0 | ○ | 40.2 |
| Example 40 | ○ | 0.035 | 53.7 | ○ | 41.3 |
| Example 41 | ○ | 0.027 | 54.0 | ○ | 45.0 |
| Example 42 | ○ | 0.027 | 56.5 | ○ | 43.0 |
| Comparative Example 7 | x | 0.038 | 38.5 | x | 35.5 |
| Comparative Example 8 | x | 0.040 | 37.0 | x | 35.9 |
| Comparative Example 9 | x | 0.042 | 37.0 | x | 36.0 |

TABLE 18

| | Initial utilization (%) | Capacity recovery ratio (%) | Capacity retention ratio during the cycle (%) |
|---|---|---|---|
| Example 33 | 107 | 87.7 | 85 |
| Example 34 | 107 | 94.1 | 86 |
| Example 35 | 107 | 94.8 | 86 |

TABLE 18-continued

|  | Initial utilization (%) | Capacity recovery ratio (%) | Capacity retention ratio during the cycle (%) |
|---|---|---|---|
| Example 36 | 107 | 89.9 | 84 |
| Example 37 | 107 | 95.1 | 84 |
| Example 38 | 107 | 95.8 | 87 |
| Example 39 | 107 | 85.4 | 85 |
| Example 40 | 107 | 86.8 | 83 |
| Example 41 | 107 | 94.2 | 88 |
| Example 42 | 108 | 94.5 | 89 |
| Comparative Example 7 | 107 | 70.6 | 85 |
| Comparative Example 8 | 107 | 65.5 | 83 |
| Comparative Example 9 | 107 | 63.9 | 80 |

As apparent from Tables 17 and 18, the secondary batteries of Examples 33 to 42, which comprises a positive electrode having pores ranging from 0.0001 to 10 $\mu$m in diameter indicated a higher recovery ratio after being left in a high temperature as compared with the secondary batteries of Comparative Examples 7 and 8 whose diametral distribution in the positive electrode fell out of the aforementioned range. In particular, (1) the secondary batteries of Examples 34, 35, 37 and 38 which comprises a positive electrode having pores 0.030 $\mu$m or less in average diameter; and (2) the secondary battery of Example 42 which was provided with a paste type positive electrode containing nickel hydroxide particle covered on its surface with a cobalt hydroxide layer which was formed by means of precipitation method indicated a prominently high capacity recovery ratio after a high temperature storage. Further, as compared with the secondary batteries of Examples 33 to 35 which comprises an alkaline electrolyte comprising KOH, the secondary batteries (Examples 34 and 35) comprises a positive electrode having a diametral distribution where pores having a diameter of 0.01 $\mu$m or less occupied not less than 50% of the total void volume indicated more excellent recovery ratio. This tendency also admitted in the secondary batteries where the electrolyte was formed of LiOH and KOH.

Confirmation of cobalt compound existing in positive electrode

The confirmation of cobalt compound existing in the positive electrodes of Examples 33 to 41 and Comparative Examples 7 to 9 was performed as follows. Namely, a test cell was assembled in the same manner as in Example 33 except that cobalt monoxide powder was substituted for nickel hydroxide powder. Then, the resultant cell was subjected to the initial charging under the same conditions as in Example 33. Then, this cell was dismantled to perform an X-ray powder diffraction measurement on the positive electrode. The X-ray powder diffraction pattern thus obtained indicated a peak of CoOOH, whereby finding the existence of CoOOH in the positive electrodes of the secondary batteries of Example 33. On the other hand, when the assembling of test cell, the initial charging and the X-ray powder diffraction were performed on each of the batteries of Examples 34 to 41 in the same manner as explained above, the peaks of CoOOH were found in the X-ray powder diffraction patterns obtained from the test cells of Examples 34 to 41, whereby finding the existence of CoOOH in the positive electrodes of the secondary batteries of Examples 34 to 41. Further, the X-ray powder diffraction pattern obtained from the test cells of Examples 35, 38 and 41 indicated a peak of CoOOH as well as a peak of $Co_3O_4$, whereby finding the existence of CoOOH and $Co_3O_4$ in the positive electrodes of the secondary batteries of Examples 35, 38 and 41. On the other hand, when the assembling of test cell, the initial charging and the X-ray powder diffraction were performed on each of the batteries of Comparative Examples 7 to 9 in the same manner as explained above, the peaks of CoOOH and $Co(OH)_2$ were found in the X-ray powder diffraction patterns obtained from the test cells of Comparative Examples 7 to 9, whereby finding the existence of CoOOH and $Co(OH)_2$ in the positive electrodes of the secondary batteries of Comparative Examples 7 to 9.

The confirmation of cobalt compound existing in the positive electrode of Example 42 was also performed as follows. Namely, a test cell was assembled in the same manner as in Example 42 except that cobalt hydroxide powder was substituted for the composite nickel hydroxide powder. Then, the resultant cell was subjected to the initial charging under the same conditions as in Example 42. Then, this cell was dismantled to perform an X-ray powder diffraction measurement on the positive electrode. The X-ray powder diffraction pattern thus obtained indicated a peak of CoOOH as well as a peak of $Co_3O_4$, whereby finding the existence of CoOOH and $Co_3O_4$ in the positive electrodes of the secondary battery of Example 42.

Accordingly, it can be understood from Tables 17 and 18 and from the results of the X-ray powder diffraction measurement performed on the positive electrode that the batteries of Examples 33 to 42, each comprises a positive electrode having a structure where a material containing a conductive cobalt compound such as cobalt hydroxide and nickel hydroxide was held by a conductive substrate, the positive electrode also having pores, all of the pores each having a diameter with a range of 0.0001 to 10 $\mu$m, were capable of improving the capacity recovery ratio after a high temperature storage as compared with the secondary batteries of Comparative Examples 7 to 9 where the diameter of pores in the positive electrode fell outside the aforementioned range.

EXAMPLE 43

A nickel hydrogen secondary battery similar to that of Example 35 was prepared by following the same procedures as explained in Example 35 except that an alkaline electrolyte made of mixture of 6.0M KOH aqueous solution, 0.5M LiOH aqueous solution and 2.0M NaOH aqueous solution was substituted for the alkaline electrolyte employed in Example 35.

EXAMPLE 44

A nickel hydrogen secondary battery similar to that of Example 35 was prepared by following the same procedures as explained in Example 35 except that an alkaline electrolyte made of mixture of 4.5M KOH aqueous solution, 1.0M LiOH aqueous solution and 3.0M NaOH aqueous solution was substituted for the alkaline electrolyte employed in Example 35.

EXAMPLE 45.

A nickel hydrogen secondary battery similar to that of Example 35 was prepared by following the same procedures as explained in Example 35 except that an alkaline electrolyte made of mixture of 3.0M KOH aqueous solution, 0.5M LiOH aqueous solution and 5.0M NaOH aqueous solution was substituted for the alkaline electrolyte employed in Example 35.

EXAMPLE 46

A nickel hydrogen secondary battery similar to that of Example 35 was prepared by following the same procedures as explained in Example 35 except that an alkaline electrolyte made of mixture of 2.5M KOH aqueous solution, 1.0M LiOH aqueous solution and 5.0M NaOH aqueous solution was substituted for the alkaline electrolyte employed in Example 35.

Five pieces of secondary batteries were picked up from each of Examples 43 to 46, and subjected to the initial charging under the same conditions as in Example 35. Then, the first one of five pieces of secondary batteries was dismantled to measure the diameter of the pores in the positive electrode by making use of the mercury-penetrating method type pore distribution measuring apparatus, thereby investigating the diametric distribution of the pores, average diameter of the pores and porosity of the positive electrode, the results being shown in the following Table 19. Further, from the diametric distribution and porosity thus measured, the ratio of pores having a diameter ranging from 0.0001 µm to 0.01 µm to the total volume of voids in the positive electrode was calculated, the results being shown in the following Table 19.

The second one of five pieces of secondary batteries from each of Examples 43 to 46 was measured in the same manner as explained above to obtain the initial utilization. The results are shown in the following Table 20.

were confirmed of standard capacity in the normal temperature (25° C.) charging wherein the secondary battery was subjected to a charge/discharge cycle: –ΔV control (a cut-off voltage of 10 mV) charging with 1 C at 25° C., and discharging with 1 C, 1V cut at 25° C. Then, each secondary battery was further confirmed of the retention capacity after a storage under high temperature conditions wherein the secondary battery was subjected to 1 C, –ΔV control (a cut-off voltage of 10 mV) charging at 25° C., a two-week storage at 45° C., followed by 1 C, 1V cut discharge at 25° C. Then, the ratio of self-discharge (%) was calculated by dividing the value of difference between the standard capacity and the retention capacity by the value of aforementioned standard capacity. The results of this measurement are shown in the following Table 20.

Confirmation of cobalt compound existing in positive electrode

When the confirmation of cobalt compound existing in the positive electrodes of Examples 43 to 46 was performed in the same manner as explained above, the existence of CoOOH in the positive electrodes of the secondary batteries of Examples 43 to 46 was admitted.

TABLE 19

| | Composition of electrolyte | | | Diametral distribution of pores in positive electrode | | | | Porosity of positive electrode (%) |
|---|---|---|---|---|---|---|---|---|
| | KON (M) | NaOH (M) | LiOH (M) | 0.0001 to 10 µm | Average diameter (µm) | Ratio of pores of 0.01 µm or less (%) | Ratio of pores is 50% or more | |
| Example 35 | 8.5 | — | — | ○ | 0.027 | 52.3 | ○ | 44.0 |
| Example 43 | 6.0 | 2.0 | 0.5 | ○ | 0.026 | 53.1 | ○ | 44.0 |
| Example 44 | 4.5 | 3.0 | 1.0 | ○ | 0.025 | 53.9 | ○ | 45.0 |
| Example 45 | 3.0 | 5.0 | 0.5 | ○ | 0.026 | 52.9 | ○ | 44.3 |
| Example 46 | 2.5 | 5.0 | 1.0 | ○ | 0.026 | 52.5 | ○ | 44.8 |

Thereafter, the capacity recovery ratio of these secondary batteries was calculated after one month storage in a discharging state at 65° C., the results being shown in Table 20.

The capacity retention ratio (%) after 400th charge/discharge cycle in relative to the discharge capacity of the first charge/discharge cycle of the third one of five secondary batteries from each of Examples 43 to 46 was calculated in the same manner as illustrated above, the results being shown in Table 20 below. Table 20 also shows the results of Example 35.

The fourth one of five secondary batteries from each of Examples 43 to 46 and the secondary battery of Example 35 was confirmed of standard capacity in the normal temperature (25° C.) Charging. Namely, each secondary battery was subjected to 1 C, –ΔV control (a cut-off voltage of 10 mV) charging at 25° C. Then, each secondary battery was discharged with 1 C, 1V cut at 25° C. to measure the discharge capacity. Thereafter, each secondary battery was confirmed of the capacity in 60° C. discharging wherein each secondary battery was subjected to a charge/discharge cycle: –ΔV control (a cut-off voltage of 10 mV) charging with 1 C at 60° C., and discharging with 1 C, 1V cut at 25° C. Then, the ratio of capacity at 60° C. to the standard capacity at the normal temperature (25° C.) was calculated to measure the charging efficiency (%). The results are shown in Table 20.

The last one of five secondary batteries from each of Examples 43 to 46 and the secondary battery of Example 35

TABLE 20

| | Utilization (%) | Capacity recovery ratio (%) | Capacity retention ratio during the cycle (%) | High temperature charging efficiency (%) | High temperature self-discharge ratio (%) |
|---|---|---|---|---|---|
| Example 35 | 107 | 94.8 | 86 | 21 | 31 |
| Example 43 | 107 | 90.6 | 95 | 47 | 26 |
| Example 44 | 107 | 92.5 | 94 | 73 | 24 |
| Example 45 | 107 | 92.1 | 90 | 74 | 23 |
| Example 46 | 107 | 93.6 | 92 | 86 | 20 |

As seen from the Tables 19 and 20 as well as from the results of the X-ray powder diffraction, the secondary batteries according to Examples 35, 43 to 46 were high in the utilization of nickel hydroxide, the capacity recovery ratio and the capacity retention ratio during the charge/discharge cycle. Furthermore, the secondary batteries according to Examples 43 to 46 which comprises an alkaline electrolyte of the aforementioned specific composition (a composition containing 2.0 to 6.0M potassium hydroxide, 2.0 to 5.0M sodium hydroxide and 0.5 to 1.5M lithium hydroxide) were found superior in charging efficiency of the positive electrode at high temperatures as compared with the secondary battery of Example 35. In particular, among the batteries of Examples 43 to 46, the batteries of Examples 45 and 46 which comprises an alkaline electrolyte containing sodium hydroxide as a main component were found lower in self-discharge ratio when they were stored at a high temperature and hence superior in storage property as compared with the batteries of Examples 43 and 44.

The aforementioned initial activation (initial charging) in Examples 33 to 46 was performed for simultaneously effecting the formation of the conductive matrix of cobalt and the charging of $Ni(OH)_2$ active material. Accordingly, if importance is to be placed on the formation of cobalt conductive matrix, the charging may be performed in the same rate and the same atmosphere only to form the cobalt conductive matrix, and the subsequent charging may be performed in an optional conditions.

According to Examples 33 to 46, the alkaline secondary battery comprising an positive electrode having pores of specific pore size according to this invention was obtained by effecting a specific initial activation (the initial charging) of the battery. However, it is possible to attain the aforementioned excellent effects in the secondary battery of this invention without relying on such a manufacturing method.

As explained above, it is possible according to this invention to provide an alkaline secondary in battery and a method for manufacturing an alkaline secondary battery, which make it possible to improve the utilization of nickel hydroxide, the charging/discharging cycle and the over-discharge property.

It is possible according to this invention to provide a paste type positive electrode for an alkaline secondary battery and a method for manufacturing an alkaline secondary battery, which make it possible to improve the utilization of nickel hydroxide and the charging/discharging cycle.

Additionally, it is possible according to this invention to provide an alkaline secondary battery which is capable of maintaining a practical capacity retention in a charging/discharging cycle and at the same time capable of improving a charging efficiency at a high temperature condition, thus providing an alkaline secondary battery with high actual capacity (discharge capacity).

Furthermore, it is possible according to this invention to provide an alkaline secondary battery provided with a paste type positive electrode and/or a paste type negative electrode wherein the filling density of paste in the substrate thereof is effectively increased, and the current collecting efficiency thereof is increased in conformity with a lowering of electric resistance and with a high tensile strength, thus making it possible to provide an alkaline secondary battery which is excellent in charge/discharge cycle property.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:
1. An alkaline secondary battery comprising:
   a positive electrode;
   a negative electrode; and
   an alkaline electrolyte;
   wherein said positive electrode comprises a conductive substrate and a mixture held by said conductive substrate, said mixture containing nickel hydroxide and a conductive cobalt compound, said positive electrode has pores, substantially all of said pores each having a diameter with a range of 0.0001 $\mu$m to 10 $\mu$m, and
   50% or more of total void volume of said positive electrode is occupied by pores having a diameter of 0.0001 $\mu$m to 0.01 $\mu$m.
2. The secondary battery according to claim 1, wherein the average diameter of said pores is not more than 0.035 $\mu$m.
3. The secondary battery according to claim 2, wherein said positive electrode has a porosity ranging from 30 to 40%.
4. The secondary battery according to claim 1, wherein said conductive cobalt compound contains cobalt oxyhydroxide (CoOOH).
5. The secondary battery according to claim 1, wherein said nickel hydroxide has a half-width of 0.8° or more of a peak in the (101) plane as measured by X-ray powder diffraction (2θ) using Cu-Kα ray as an X-ray source.
6. The secondary battery according to claim 1, wherein said mixture of the positive electrode contains tricobalt tetraoxide ($Co_3O_4$).
7. The secondary battery according to claim 1, wherein said alkaline electrolyte contains 2.0 to 6.0 mol/ℓ potassium hydroxide, 2.0 to 5.0 mol/ℓ sodium hydroxide, and 0.5 to 1.5 mol/ℓ lithium hydroxide.
8. The secondary battery according to claim 7, wherein said alkaline electrolyte contains sodium hydroxide as a main component.
9. A method of manufacturing an alkaline secondary battery comprising the steps of:
   preparing a secondary battery unit including a positive electrode, a negative electrode and an alkaline electrolyte containing lithium hydroxide of 0.5 mol/ℓ or more, said positive electrode comprising a conductive substrate and a mixture held by said conductive substrate, said mixture containing a cobalt compound and nickel hydroxide; and
   performing an initial charging of said secondary battery unit at a temperature of 40 to 100° C. so as to form pores in said positive electrode, said pores being 0.0001 $\mu$m to 10 $\mu$m in diameter.
10. The method of claim 9, wherein 50% or more of total void volume of said positive electrode is occupied by pores having a diameter of 0.0001 $\mu$m to 0.01 $\mu$m.
11. The method according to claim 9, wherein said nickel hydroxide is present in said mixture in the form of particles, each having a layer containing said cobalt compound and formed on the surface by a precipitation method.
12. A paste positive electrode for an alkaline secondary battery, which comprises a conductive substrate, a cobalt compound and nickel hydroxide:
   wherein said cobalt compound contains β type cobalt hydroxide having a half-width of less than 0.40° of a peak in the (001) plane as measured by X-ray powder diffraction (2θ) using Cu-Kα ray as an X-ray source.
13. The positive electrode according to claim 12, wherein said nickel hydroxide is present in the form of particles, each having a layer containing said cobalt compound and formed on the surface by a precipitation method.

14. The positive electrode according to claim 12, wherein said nickel hydroxide has a half-width 0.8° or more of a peak in the (101) plane as measured by X-ray powder diffraction (2θ) using Cu-Kα ray as an X-ray source.

15. The positive electrode according to claim 12, wherein said conductive substrate comprises a porous two-dimensional substrate having a thickness of 60 μm or less which is obtained by molding metal powder by way of powder rolling method, and two three-dimensional substrates superimposed respectively on the opposed surfaces of said porous two-dimensional substrate.

16. A paste electrode for an alkaline secondary battery, which comprises a conductive substrate, a cobalt compound and nickel hydroxide:

wherein said cobalt compound contains cobalt monoxide having a half-width of 0.50° or less a peak in the (200) plane as measured by X-ray powder diffraction (2θ) using Cu-Kα ray as an X-ray source.

17. The positive electrode according to claim 16, wherein said cobalt monoxide is present in the form of particles, said particles having cobalt (II) ion in a concentration of 4 mg/l or more when 0.35 g of the particles are immersed in 50 ml of a 6M aqueous solution of potassium hydroxide at a temperature of 25° C. and the resultant solution is then left to stand for 30 minutes.

18. The positive electrode according to claim 16, wherein said cobalt monoxide is present in the form of particles, said particles contain 0 to 12% by weight of 3 valent cobalt compounds as measured by a potassium permanganate back titration.

19. The positive electrode according to claim 16, wherein said nickel hydroxide has a half-width of 0.8° or more of a peak in the (101) plane as measured by X-ray powder diffraction (2θ) using Cu-Kα ray as an X-ray source.

20. The positive electrode according to claim 16, wherein said conductive substrate comprises a porous two-dimensional substrate having a thickness of 60 μm or less which is obtained by molding metal powder by way of powder rolling method, and two three-dimensional substrates superimposed respectively on the opposed surfaces of said porous two-dimensional substrate.

21. A method of manufacturing an alkaline secondary battery comprising the steps of;

preparing a secondary battery unit including a positive electrode, a negative electrode and an alkaline electrolyte, said positive electrode comprising a conductive substrate, a cobalt compound and nickel hydroxide; and performing an initial charging of said secondary battery unit at a temperature of 40 to 100° C.;

wherein said cobalt compound contains β type cobalt hydroxide having a half-width of less than 0.40° a peak in the (001) plane as measured by X-ray powder diffraction (2θ) using Cu-Kα ray as an X-ray source.

22. The method according to claim 21, wherein said alkaline electrolyte contains 2.0 to 6.0 mol/ℓ potassium hydroxide, 2.0 to 5.0 mol/ℓ sodium hydroxide, and 0.5 to 1.5 mol/ℓ lithium hydroxide.

23. The method according to claim 22, wherein said alkaline electrolyte contains sodium hydroxide as a main component.

24. A method of manufacturing an alkaline secondary battery comprising the steps of;

preparing a secondary battery unit including a positive electrode, a negative electrode and an alkaline electrolyte, said positive electrode comprising a conductive substrate, a cobalt compound and nickel hydroxide; and performing an activation of said secondary battery unit;

wherein said cobalt compound contains cobalt monoxide having a half-width of 0.50° or less of a peak in the (200) plane as measured by X-ray powder diffraction (2θ) using Cu-Kα ray as an X-ray source.

25. The method according to claim 24, wherein said alkaline electrolyte contains 2.0 to 6.0 mol/ℓ potassium hydroxide, 2.0 to 5.0 mol/ℓ sodium hydroxide, and 0.5 to 1.5 mol/ℓ lithium hydroxide.

26. The method according to claim 25, wherein said alkaline electrolyte contains sodium hydroxide as a main component.

27. An alkaline secondary battery comprising a positive electrode containing nickel hydroxide, a negative electrode and an alkaline electrolyte;

wherein said nickel hydroxide has a half-width of 0.8° or more of a peak in the (101) plane as measured by X-ray powder diffraction (2θ) using Cu-Kα ray as an X-ray source; and said alkaline electrolyte contains 2.0 to 6.0 mol/ℓ potassium hydroxide, 2.0 to 5.0 mol/ℓ sodium hydroxide, and 0.5 to 1.5 mol/ℓ lithium hydroxide.

28. The secondary battery according to claim 27, wherein said alkaline electrolyte contains sodium hydroxide as a main component.

29. The secondary battery according to claim 28, wherein said alkaline electrolyte contains 4.0 to 5.0 mol/ℓ sodium hydroxide, 0.5 to 1.2 mol/ℓ lithium hydroxide, a total concentration of potassium hydroxide, sodium hydroxide and lithium hydroxide being in the range of 7.5 to 9.5 mol/ℓ.

30. An alkaline secondary battery comprising a paste positive electrode comprising a conductive substrate and a mixture held by said conductive substrate and containing an active material, and a paste negative electrode comprising a conductive substrate and a mixture held by said conductive substrate and containing a hydrogen-absorbing alloy;

wherein said conductive substrate of either one or both of positive and negative electrodes comprises a porous two-dimensional substrate having a thickness of 60 μm or less which is obtained by molding metal powder by way of powder rolling method, and two three-dimensional substrates superimposed respectively on the opposed surfaces of said porous two-dimensional substrate.

31. The secondary battery according to claim 30, wherein said three-dimensional substrate is formed of a sponge-shaped metallic porous body or a felt-shaped metallic porous body.

* * * * *